(12) United States Patent
Nakamura et al.

(10) Patent No.: US 8,892,453 B2
(45) Date of Patent: Nov. 18, 2014

(54) APPARATUS, SYSTEM AND METHOD FOR ELECTRONIC TICKET MANAGEMENT AND ELECTRONIC TICKET DISTRIBUTION AUTHENTICATION

(75) Inventors: Masakazu Nakamura, Tokyo (JP); Hironobu Tamai, Chiba (JP); Miyuki Hori, Kanagawa (JP); Seiki Murakami, Chiba (JP)

(73) Assignee: Sony Corporation, Tokyo (JP)

( * ) Notice: Subject to any disclaimer, the term of this patent is extended or adjusted under 35 U.S.C. 154(b) by 920 days.

(21) Appl. No.: 10/700,014

(22) Filed: Nov. 3, 2003

(65) Prior Publication Data

US 2004/0093309 A1    May 13, 2004

Related U.S. Application Data

(62) Division of application No. 10/032,184, filed on Dec. 21, 2001, now Pat. No. 7,555,361.

(30) Foreign Application Priority Data

| Dec. 25, 2000 | (JP) | P2000-392878 |
| Dec. 25, 2000 | (JP) | P2000-392953 |
| Dec. 25, 2000 | (JP) | P2000-393032 |
| Dec. 25, 2000 | (JP) | P2000-393083 |

(51) Int. Cl.
- *G06Q 99/00* (2006.01)
- *G06Q 20/36* (2012.01)
- *G06Q 10/02* (2012.01)
- *G07B 15/00* (2011.01)

(52) U.S. Cl.
CPC ............ *G06Q 10/02* (2013.01); *G06Q 20/367* (2013.01); *G07B 15/00* (2013.01)
USPC ................ 705/5; 705/6; 705/7.11; 705/7.13; 705/26.1

(58) Field of Classification Search
USPC ............ 705/1, 5, 6, 26, 7.11, 7.13, 26.1; 235/381
See application file for complete search history.

(56) References Cited

U.S. PATENT DOCUMENTS

| 3,988,570 A | 10/1976 | Murphy et al. |
| 4,139,764 A | 2/1979 | Petrini et al. |

(Continued)

FOREIGN PATENT DOCUMENTS

| EP | 0969426 A1 | 5/2000 |
| WO | WO 97/18534 A1 | 5/1997 |

OTHER PUBLICATIONS

No author, TicketWeb Deploys First Ticketing Interface Into Raiser's Edge Software, Jan. 18, 2000, Business Wire, dialog copy 2 pages.*

(Continued)

*Primary Examiner* — Akiba Allen
(74) *Attorney, Agent, or Firm* — K&L Gates LLP

(57) ABSTRACT

An electronic ticket management system includes an event organizer for planning an event, an electronic ticket seller for distributing electronic ticket information which authenticates the right to attend the event, an information storage chip for storing the electronic ticket information, and an electronic ticket platform center for managing the distribution of the electronic ticket information. The electronic ticket platform center forms an electronic ticket information master based on event information registered by the event organizer, and relates ticket issuing information registered by the electronic ticket seller to the electronic ticket information master. The electronic ticket platform center also issues the tickets by writing the electronic ticket information into the corresponding information storage chip based on ticket issuing information. A determination as to whether the user is permitted to enter the event venue is made according to the integrity of the event information stored in the information storage chip.

10 Claims, 44 Drawing Sheets

(56) References Cited

U.S. PATENT DOCUMENTS

| | | | |
|---|---|---|---|
| 5,239,480 | A | 8/1993 | Huegel |
| 5,309,355 | A | 5/1994 | Lockwood |
| 5,467,081 | A * | 11/1995 | Drews et al. ............... 340/5.22 |
| 5,502,806 | A | 3/1996 | Mahoney et al. |
| 5,598,477 | A | 1/1997 | Berson |
| 5,721,781 | A | 2/1998 | Deo et al. |
| 5,754,654 | A | 5/1998 | Hiroya et al. |
| 5,930,761 | A | 7/1999 | O'Toole |
| 6,067,532 | A * | 5/2000 | Gebb .............................. 705/37 |
| 6,085,976 | A * | 7/2000 | Sehr ............................. 235/384 |
| 6,148,091 | A | 11/2000 | DiMaria |
| 6,173,209 | B1 | 1/2001 | Laval et al. |
| 6,192,349 | B1 * | 2/2001 | Husemann et al. ............ 705/65 |
| 6,216,227 | B1 * | 4/2001 | Goldstein et al. ............ 713/172 |
| 6,422,463 | B1 | 7/2002 | Flink |
| 6,496,809 | B1 * | 12/2002 | Nakfoor ......................... 705/80 |
| 6,532,345 | B1 | 3/2003 | Gluck |
| 6,659,343 | B2 | 12/2003 | Tanaka |
| 6,721,787 | B1 * | 4/2004 | Hiscock ....................... 709/217 |
| 7,392,226 | B1 * | 6/2008 | Sasaki et al. .................... 705/64 |
| 2002/0188796 | A1 * | 12/2002 | Suzuki ......................... 711/103 |
| 2003/0105641 | A1 * | 6/2003 | Lewis ............................. 705/1 |
| 2005/0001711 | A1 * | 1/2005 | Doughty et al. ............. 340/5.74 |
| 2009/0125429 | A1 * | 5/2009 | Takayama ..................... 705/35 |

OTHER PUBLICATIONS

Katsumi Yoshimura, other three people, Catch "platinum"! Ticket obtaining battle to win in a net, Future type ticket which came up to here, Nikkei netbrain, Nikkei BP, Sep. 8, 2000 vol. 1, No. 6, p. 58-59.

Japanese Office Action dated Oct. 13, 2009, for corresponding Application No. JP 2000-393032.

* cited by examiner

FIG. 11

| # | Area | Field | | Size |
|---|---|---|---|---|
| #0000 | ISSUER AREA | COMPANY CODE | | 1 |
| #0001 | | COMPANY NAME | | 1 |
| #0002 | | MEMBERSHIP CODE | | 1 |
| #0003 | | MEMBERSHIP NAME | | 1 |
| #0004 | | MEMBERSHIP TYPE | | 1 |
| #0005 | EVENT ID AREA | PERFORMANCE ID 1 | FLG | 1 |
| #0006 | | PERFORMANCE ID 2 | FLG | 1 |
| #0007 | | PERFORMANCE ID 3 | FLG | 1 |
| #0008 | | PERFORMANCE ID 4 | FLG | 1 |
| #0009 | | PERFORMANCE ID 5 | FLG | 1 |
| #000A | PERFORMANCE INFORMATION AREA 1 | PERFORMANCE INFORMATION 1 | | 24 |
| : | | PERFORMANCE INFORMATION 1 | | |
| #0022 | PERFORMANCE INFORMATION AREA 2 | PERFORMANCE INFORMATION 2 | | 24 |
| : | | PERFORMANCE INFORMATION 2 | | |
| #003A | PERFORMANCE INFORMATION AREA 3 | PERFORMANCE INFORMATION 3 | | 24 |
| : | | PERFORMANCE INFORMATION 3 | | |
| #0052 | PERFORMANCE INFORMATION AREA 4 | PERFORMANCE INFORMATION 4 | | 24 |
| : | | PERFORMANCE INFORMATION 4 | | |
| #006A | PERFORMANCE INFORMATION AREA 5 | PERFORMANCE INFORMATION 5 | | 24 |
| : | | PERFORMANCE INFORMATION 5 | | |
| : | : | : | | : |
| #0090 | PERFORMANCE INFORMATION AREA 5 MANAGEMENT DATA | READ-ONLY (NON KEY) | | 1 |
| #0091 | | READ/WRITE | | 1 |
| #0092 | PERFORMANCE INFORMATION AREA 4 MANAGEMENT DATA | READ-ONLY (NON KEY) | | 1 |
| #0093 | | READ/WRITE | | 1 |
| #0094 | PERFORMANCE INFORMATION AREA 3 MANAGEMENT DATA | READ-ONLY (NON KEY) | | 1 |
| #0095 | | READ/WRITE | | 1 |
| #0096 | PERFORMANCE INFORMATION AREA 2 MANAGEMENT DATA | READ-ONLY (NON KEY) | | 1 |
| #0097 | | READ/WRITE | | 1 |
| #0098 | PERFORMANCE INFORMATION AREA 1 MANAGEMENT DATA | READ-ONLY (NON KEY) | | 1 |
| #0099 | | READ/WRITE | | 1 |
| #009A | PERFORMANCE ID AREA MANAGEMENT DATA | READ-ONLY (NON KEY) | | 1 |
| #009B | | READ/WRITE | | 1 |
| #009C | QUEUE AREA MANAGEMENT DATA | READ-ONLY (NON KEY) | | 1 |
| #009D | | READ/WRITE (NON KEY) | | 1 |
| #009E | ISSUER AREA MANAGEMENT DATA | READ-ONLY (NON KEY) | | 1 |
| #009F | | READ/WRITE | | 1 |
| #00A0 | AREA 0000 DEFINITION BLOCK | | | |
| #00A1 | SYSTEM DEFINITION BLOCK | | | |
| #00A2 | ISSUE ID BLOCK | | | |
| #00A3 | MANUFACTURE ID BLOCK | | | |

| EVENT ID | FLOOR | SEAT NUMBER | MEMBERSHIP NO. | CUSTOMER NAME | CUSTOMER ATTRIBUTE | DATE OF BIRTH |
|---|---|---|---|---|---|---|
| 00000010 | 2F | A-27 | 00001111 | TARO KAATO | A0 | 1930/10/25 |

- A0 : PHYSICALLY UNIMPAIRED
- B1 : SIGHT-IMPAIRED
- B2 : HEARING-IMPAIRED
- C1 : WHEELCHAIRS
   etc.

APPARATUS, SYSTEM AND METHOD FOR ELECTRONIC TICKET MANAGEMENT AND ELECTRONIC TICKET DISTRIBUTION AUTHENTICATION

The present application is a Divisional of U.S. patent application Ser. No. 10/032,184, filed Dec. 21, 2001 now U.S. Pat. No. 7,555,361, which is based on applications No. 2000-392878 filed on Dec. 25, 2000 in Japan, No. 2000-392953 filed on Dec. 25, 2000 in Japan, No. 2000-393032 filed on Dec. 25, 2000 in Japan, and No. 2000-393083 filed on Dec. 25, 2000 in Japan, the complete disclosure of which are hereby incorporated by reference herein.

BACKGROUND OF THE INVENTION

The present invention relates to an apparatus system and method for electronic ticket management and electronic ticket distribution authentication. More particularly, the invention relates to improved services for the infrastructure of an electronic ticket management system using electronic ticket information which authenticates the right to attend a specific event.

When planning an event or performance, such as a concert, an event organizer decides and creates an event schedule including the performers, the venue, the time and date, etc. The event organizer also determines the allocation of seats at the individual event venues and the prices associated with the seat types. Ticket sales are entrusted to ticket sales agents, such as ticket stores, or fan clubs. Those who wish to participate in or attend an event, purchase paper tickets at a ticket store, and bring the tickets to the event venue to present them to a ticket collector. Then, the right to attend the event is authenticated, and the ticket purchasers are allowed to enter the event venue. Accordingly, hitherto, the right to attend an event is authenticated by paper tickets on which the event information is indicated.

Due to improvements in Internet services or the progress of information storage technology using, for example, integrated circuit (IC) cards, it is now possible to carry electronic ticket information. Paper tickets are being substituted with electronic tickets by storing electronic ticket information in high-security information storage chips, such as IC cards.

However, electronic ticketing systems are currently implemented only in limited performances or in test cases. Even if an electronic ticketing system is employed, an ID number, unique to each information storage chip, is used for determining whether a user is allowed to enter an event venue.

With this authentication method, it is necessary to send data concerning the ID numbers of the sold information storage chips to gate terminals installed in the event venue. Thus, tickets cannot be sold immediately before the event because of the time needed to send the data to the event venue.

In this ticket distribution system, although event organizers and sales agents each have their own systems, a central system, which can be shared between the event organizers and the sales agents, is not yet available. Accordingly, multiple storage of various data concerning events and ticket sales is unavoidable, thereby preventing the efficient use of the ticketing system.

Although an event-venue management system is conventionally provided, this is merely for linking event-venue information with ticket sales information. Thus, there is a demand for a system that monitors the attendee/ticketholder situation in real time or identifies the types of attendees in real time.

SUMMARY OF THE INVENTION

Accordingly, in view of the problems inherent in known electronic ticketing environments, it is an advantage of the present invention to construct an electronic ticketing infrastructure by providing a common platform for electronic ticketing.

In order to achieve the above-described object, according to one aspect of the present invention, an electronic ticket management system is provided that includes: an event organizer apparatus for planning an event; an electronic ticket distribution authentication apparatus for distributing electronic ticket information that authenticates a right to attend the event; an information storage chip for storing the electronic ticket information; and an electronic ticket platform center for managing the distribution of the electronic ticket information. The event organizer apparatus creates event information unique to each of the events, and registers the event information in the electronic ticket platform center. The electronic ticket distribution authentication apparatus receives a request to distribute the electronic ticket information concerning the event from a user of the information storage chip, performs distribution authentication processing for determining whether the electronic ticket information is to be distributed to the user, and registers an authentication result in the electronic ticket platform center as ticket issuing information. The electronic ticket platform center creates an electronic ticket information master based on the event information registered by the event organizer apparatus, relates the ticket issuing information registered by the electronic ticket distribution authentication apparatus to the electronic ticket information master, and performs ticket issuing processing for writing the electronic ticket information into the information storage chip based on the ticket issuing information.

In this specification, "distributing electronic ticket information" means "selling electronic ticket information" or "distributing electronic ticket information free of charge". Therefore, the electronic ticket distribution authentication apparatus sells or distributes electronic ticket information and in general, is a sales agent, a fan club, or a store terminal device installed at a ticket store or a convenience store.

According to another aspect of the present invention, an event organizer apparatus for planning an event is provided. The event organizer apparatus forms event information unique to each of the events, registers the event information in an electronic ticket platform center, and has a right to decide an electronic ticket distribution authentication apparatus for distributing electronic ticket information that authenticates a right to attend the event.

In the aforementioned event organizer apparatus, the event information may include at least one event venue master for storing event venue information such as the location of the event venue and the time and date of the event. The event information may further include a seat master concerning seat information.

The event organizer apparatus may manage a portion of the electronic ticket information allocated to a plurality of the electronic ticket distribution authentication apparatuses. Furthermore, the electronic ticket information may include user information concerning a user of an information storage chip.

According to still another aspect of the present invention, an electronic ticket platform center is provided for managing the distribution of electronic ticket information which authenticates a right to attend an event. The electronic ticket platform center forms an electronic ticket information master based on event information created for each of the events by an event organizer apparatus and relates ticket issuing information formed by an electronic ticket distribution authentication apparatus to the electronic ticket information master. Then, the electronic ticket distribution authentication apparatus distributes the electronic ticket information. The electronic ticket platform center performs ticket issuing processing for writing the electronic ticket information into a predetermined information storage chip based on the ticket issuing information.

In the aforementioned electronic ticket platform center, the event information may include at least an event venue master that stores event venue information such as the location of an event venue and the time and date of the event. The event information may further include a seat master concerning seat information. Furthermore, the ticket issuing processing of the electronic ticket platform center, may be performed via a network.

An electronic ticket distribution store terminal may be provided to perform the ticket issuing processing. Also, the electronic ticket information may include user information concerning a user of the information storage chip.

The aforementioned electronic ticket platform center may have an authentication right to determine whether the electronic ticket information is to be written into the predetermined information storage chip.

According to a further aspect of the present invention, an electronic ticket distribution authentication apparatus is provided for distributing electronic ticket information which authenticates a right to attend an event. The electronic ticket distribution authentication apparatus receives a request to distribute the electronic ticket information concerning the event from a user of an information storage chip and performs distribution authentication processing for determining whether the electronic ticket information is to be distributed to the user. The apparatus then registers an authentication result in an electronic ticket platform center for managing the distribution of the electronic ticket information as ticket issuing information, and instructs the electronic ticket platform center to perform ticket issuing processing for writing the electronic ticket information into the user's information storage chip based on the ticket issuing information.

In the aforementioned electronic ticket distribution authentication apparatus, an event organizer apparatus for planning an event may manage an allocation ratio or portion of the electronic ticket information.

The request to distribute the electronic ticket information from the user may be sent via a network. Alternatively, an electronic ticket information distribution store terminal may be provided, and the request to distribute the electronic ticket information from the user may be sent via the store terminal.

The electronic ticket information may include user information concerning the user of the information storage chip.

According to a yet further aspect of the present invention, an electronic ticket information distribution store terminal is provided for distributing electronic ticket information that authenticates a right to attend an event. The store terminal receives a request to distribute the electronic ticket information concerning the event from a user's information storage chip, transfers the request to an electronic ticket distribution authentication apparatus so as to instruct the electronic ticket distribution authentication apparatus to perform distribution authentication processing for determining whether the electronic ticket information is to be distributed to the user. Then the store terminal receives a ticket issuing request from an electronic ticket platform center for managing the distribution of the electronic ticket information, and writes the electronic ticket information into the information storage chip.

In the aforementioned electronic ticket information distribution store terminal, output means for outputting the electronic ticket information as a paper ticket may be provided.

According to a further aspect of the present invention, an information storage chip is provided for storing electronic ticket information which authenticates a right to attend an event. A user of the information storage chip sends a request to distribute the electronic ticket information concerning the event to an electronic ticket distribution authentication apparatus so as to instruct the apparatus to perform distribution authentication processing for determining whether the electronic ticket information should be distributed to the user. Then, the electronic ticket information is written into the information storage chip, in response to a ticket issuing request sent from an electronic ticket platform center, for managing the distribution of the electronic ticket information.

In the aforementioned information storage chip, the electronic ticket information may include event venue information such as the location of an event venue and the time and date of the event. The electronic ticket information may further include seat information. Furthermore, the electronic ticket information may include user information concerning the user of the information storage chip.

The electronic ticket platform center may perform authentication processing when the electronic ticket information is written into the information storage chip.

The electronic ticket information may be written into the information storage chip via a network. Alternatively, the electronic ticket information may be written into the information storage chip via an electronic ticket information distribution store terminal. The information storage chip may also be integrated into a membership card to be distributed according to a membership registration via the electronic ticket distribution authentication apparatus.

According to a further aspect of the present invention, an electronic ticket management method is provided that employs an event organizer apparatus for planning an event, an electronic ticket distribution authentication apparatus for distributing electronic ticket information which authenticates a right to attend the event, an information storage chip for storing the electronic ticket information, and an electronic ticket platform center for managing the distribution of the electronic ticket information. The electronic ticket management method includes the following steps. Event information is created that is unique to each of the events and registers the event information in the electronic ticket platform center by the event organizer apparatus. Then, a request is received to distribute the electronic ticket information concerning the event from a user of the information storage chip and distribution authentication processing is performed for determining whether the electronic ticket information is to be distributed to the user. The authentication result is registered in the electronic ticket platform center as ticket issuing information by the electronic ticket distribution authentication apparatus and an electronic ticket information master is created based on the event information registered by the event organizer apparatus, relating the ticket issuing information registered by the electronic ticket distribution authentication apparatus to the electronic ticket information master. Then, ticket issuing processing is performed for writing the electronic ticket information into the information storage chip based on the ticket issuing information by the electronic ticket platform center.

In the aforementioned electronic ticket management method, the event organizer apparatus may decide the electronic ticket distribution authentication apparatus for handling the electronic ticket information concerning the event.

The information storage chip may be distributed as a membership card according to a membership registration via the electronic ticket distribution authentication apparatus. Furthermore, a predetermined time lag may be provided between the distribution authentication processing performed by the electronic ticket distribution authentication apparatus and the ticket issuing processing performed by the electronic ticket platform center.

The request to distribute the electronic ticket information from the user may be sent and the ticket issuing processing may be performed by the electronic ticket platform center via a network.

Alternatively, an electronic ticket information distribution store terminal may be provided, and the request to distribute the electronic ticket information from the user may be sent and the ticket issuing processing may be performed by the electronic ticket platform center via the store terminal.

Authentication processing by the electronic ticket platform center may be required when the electronic ticket information is written into the information storage chip.

According to a further aspect of the present invention, an electronic ticket assignment apparatus is provided for controlling a reading/writing operation of electronic ticket information from and into an information storage chip in which a plurality of items of the electronic ticket information are stored. The electronic ticket information is used for authenticating a right to attend an event in correspondence with event information unique to each event. The information storage chip of an assignor sends an assignment request to the electronic ticket assignment apparatus by specifying ID information of the assignee's information storage chip and the electronic ticket information to be assigned. The electronic ticket assignment apparatus performs an assignment operation by writing the electronic ticket information to be assigned into the assignee's information storage chip in response to the assignment request and by deleting the assigned electronic ticket information from the assignor's information storage chip.

In the aforementioned electronic ticket assignment apparatus, the electronic ticket assignment apparatus may include an electronic ticket platform center which authenticates a writing/deleting operation of the electronic ticket information, and a reader/writer for reading and writing the electronic ticket information from and into the information storage chip. The assignment request and the assignment operation may be performed via a network.

The electronic ticket assignment apparatus may also include an information storage chip reader/writer having a right to authenticate a writing/deleting operation of the electronic ticket information. In this manner, a predetermined time lag may be provided between the assignment request and the assignment operation.

According to a further aspect of the present invention, a computer program is provided that functions as the aforementioned electronic ticket assignment apparatus.

According to a further aspect of the present invention, an electronic ticket assignment method is provided that includes the following steps. A plurality of items of electronic ticket information are stored in an information storage chip, where the electronic ticket information is used for authenticating a right to attend an event in correspondence with event information unique to each of the event. Then, an assignment request is sent from the assignor's information storage chip to an electronic ticket assignment apparatus by specifying ID information of the assignee's information storage chip, and the electronic ticket information to be assigned. The electronic ticket assignment apparatus controls a reading/writing operation of the electronic ticket information from and into the information storage chip; and an assignment operation is performed by the electronic ticket assignment apparatus by writing the electronic ticket information to be assigned into the assignee's information storage chip in response to the assignment request. The assigned electronic ticket information is deleted from the assignor's information storage chip.

In the aforementioned electronic ticket assignment method, the electronic ticket assignment apparatus may include an electronic ticket platform center which authenticates a writing/deleting operation of the electronic ticket information, and a reader/writer for reading and writing the electronic ticket information from and into the information storage chip. The assignment request and the assignment operation may be performed via a network.

The electronic ticket assignment apparatus may include an information storage chip reader/writer having a right to authenticate a writing/deleting operation of the electronic ticket information. A predetermined time lag may be provided between the assignment request and the assignment operation.

According to a further aspect of the present invention, there is provided a ticket allocation system that includes a seat information forming unit for forming seat positions of an event venue into seat information as cell data. The system also includes a display unit for displaying the seat information on a screen and a selector unit for selecting the seat information in units of cells on the screen. A ticket allocation unit is also included for performing ticket allocation processing according to a selection result obtained by the selector unit.

In the aforementioned ticket allocation system, the seat information may be classified according to the type of seat, and the selector unit may select the seat information according to the seat type. The seat information may be displayed on the screen so that it is visually distinguishable according to the seat type.

The selection result obtained by the selector unit may be displayed so that it is visually distinguishable. Furthermore, the selector unit may select the seat information in units of a group of cells. The number of cells selected by the selector unit or the number of cells selectable by the selector unit may be displayed on the screen.

According to a further aspect of the present invention, a computer program is provided that functions as the aforementioned ticket allocation system.

According to a further aspect of the present invention, there is provided an electronic ticket management system using an information storage chip for storing electronic ticket information which authenticates a right to attend a specific event. The electronic ticket management system includes an electronic ticket information forming unit for forming event information unique to each of the event, and for forming electronic ticket information in correspondence with the event information. The system further includes an electronic ticket information writer for writing the electronic ticket information into the information storage chip and an electronic ticket information reader installed at an event venue corresponding to the event information for reading the electronic ticket information stored in the information storage chip and for permitting a user of the information storage chip to enter the event venue only when the integrity of the event information stored in the read electronic ticket information is verified.

According to a further aspect of the present invention, an electronic ticket information reader is provided for reading electronic ticket information which authenticates a right to attend a specific event stored in an information storage chip.

The electronic ticket information reader is installed at an event venue, and reads the electronic ticket information stored in the information storage chip and permits a user of the information storage chip to enter the event venue only when the integrity of event information stored in the read electronic ticket information is verified.

According to a further aspect of the present invention, an electronic ticket platform center is provided for managing the distribution of electronic ticket information by using an information storage chip that stores the electronic ticket information which authenticates a right to attend a specific event venue. The electronic ticket platform center includes an electronic ticket information reader installed at an event venue, for reading the electronic ticket information stored in the information storage chip and for permitting a user of the information storage chip to enter the event venue only when the integrity of event information stored in the read electronic ticket information is verified; thereby managing the distribution of the electronic ticket information.

The aforementioned electronic ticket platform center may further include an event-venue management unit installed at the event venue, for managing the electronic ticket information read by the electronic ticket information reader.

According to a further aspect of the present invention, there is provided an electronic ticket management method using an information storage chip for storing electronic ticket information which authenticates a right to attend a specific event. The electronic ticket management method includes the steps of forming event information unique to each of the events by an electronic ticket information forming unit and forming electronic ticket information in correspondence with the event information by the electronic ticket information forming unit. The electronic ticket information is written into the information storage chip by an electronic ticket information writer and the electronic ticket information stored in the information storage chip is real by an electronic ticket information reader installed at an event venue corresponding to the event information. A user of the information storage chip is permitted to enter the event venue only when the integrity of the event information stored in the read electronic ticket information is verified.

In the aforementioned electronic ticket management method, the electronic ticket information forming unit, the electronic ticket information writer, and the electronic ticket information reader may be connected to each other via a network, and the distribution of the electronic ticket information may be managed by an electronic ticket platform center via an electronic ticket information master.

An event venue management unit may be installed at the event venue, and the electronic ticket information read by the electronic ticket information reader may be managed at the event venue by the event venue management unit. Guidance information identifiable by the user may be output based on the read electronic ticket information. Also, electronic ticket information post-processing for computing the electronic ticket information read by the electronic ticket information reader may be performed.

According to the present invention, improved services are provided for the infrastructure of an electronic ticket management system, and a common platform for employing electronic ticketing is provided for the electronic ticket management system. As a result, the labor cost are reduced, resulting in the reduction of the overall cost for ticket processing.

Moreover, a determination as to whether attendees are permitted to enter an event venue is made by event information rather than the ID numbers of the attendees. Accordingly, tickets can be sold immediately before the performance time, and the sales opportunities can be maximized.

Additionally, since information concerning attendees rather than ticket purchasers can be collected at the gate of an event venue, marketing analyses can be conducted based on the attributes of the attendees rather than the attributes of the ticket purchasers.

An overall electronic ticketing flow from the allocation of tickets to the entrance of attendees can be centrally managed by a common platform, thereby improving the efficiency of electronic ticketing.

Additional features and advantages of the present invention are described in, and will be apparent from, the following Detailed Description of the Invention and the figures.

BRIEF DESCRIPTION OF THE FIGURES

FIG. 11 is a table illustrating the data structure of an IC card that is usable in the electronic ticket management system shown in FIG. 1.

FIG. 31 is a schematic diagram illustrating seat information formed into a cell that is usable in the electronic ticket management system shown in FIG. 1.

FIG. 46 is a schematic diagram illustrating the data structure of electronic ticket information that is usable in the electronic ticket management system shown in FIG. 1.

DETAILED DESCRIPTION OF THE INVENTION

Figure 1:
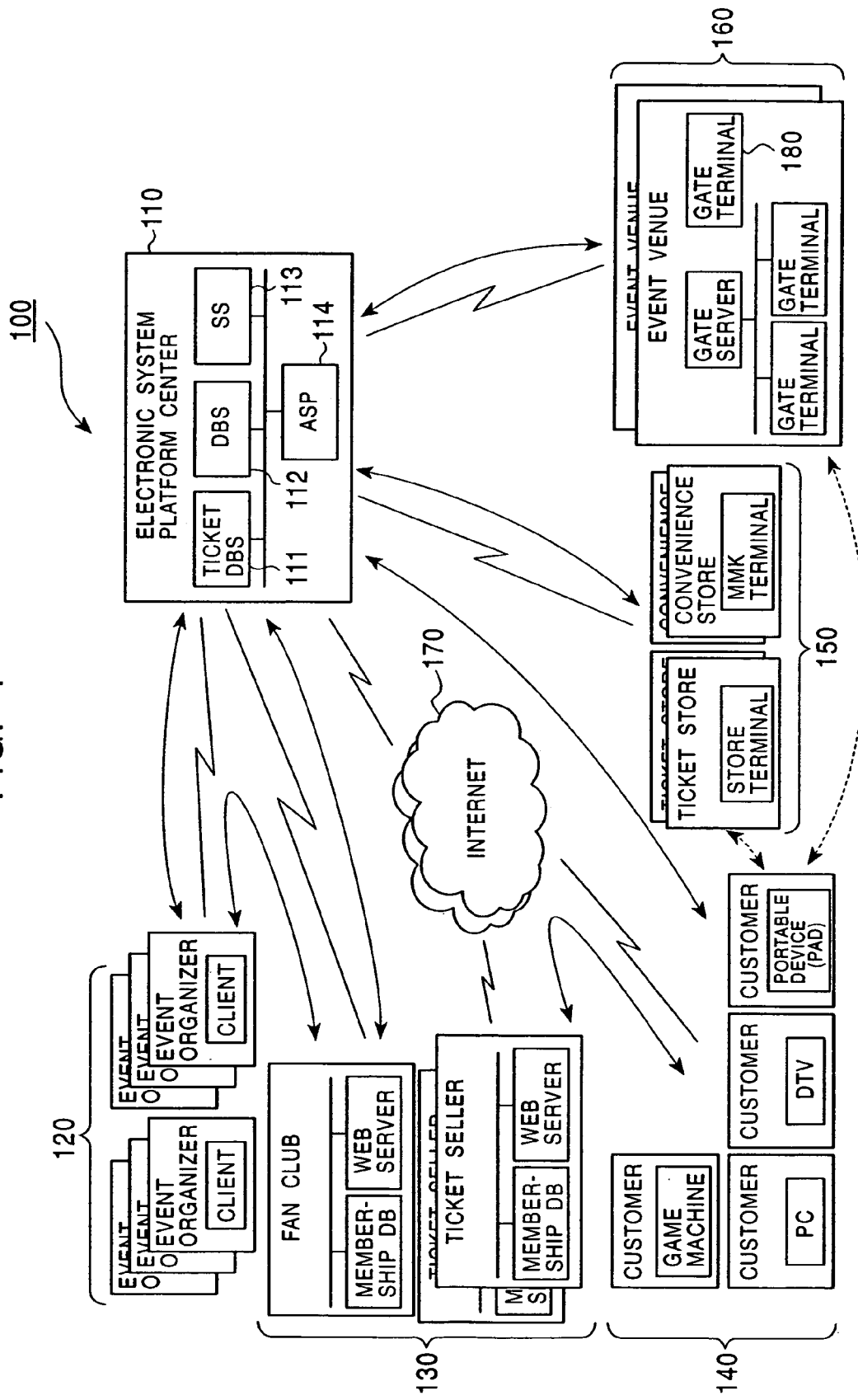
FIG. 1 is a block diagram schematically illustrating the configuration of an electronic ticket management system according to an embodiment of the present invention.

In an electronic ticket management system constructed in accordance with an embodiment of the present invention, a ticket platform center, event organizers, ticket sellers, and event venues are connected together. By using this system, customers who have purchased tickets via ticket sellers can easily enter the event venues. In this system, the event organizers and the ticket sellers, and the ticket sellers and the customers are related to each other in a known manner. However, a novel feature of the electronic ticket management system of this embodiment is the presence of the electronic ticket platform center which controls authentication of electronic tickets and information storage chips, such as IC cards.

With the electronic ticket platform center, the event organizers, the ticket sellers, the event venues, and the customers can be connected to each other in a network, and electronic ticket information is sent and received among these elements. As a result, ticket allocation, ticket issuing, gate control, etc., can be centrally managed.

For the distribution of electronic tickets, the electronic ticket management system of this embodiment provides various functions in various phases. Although details of the functions are given below, an overview of such functions follow.

An electronic ticket allocation system is provided as a distribution system for electronic ticket information between the event organizers and the electronic ticket platform center.

An electronic ticket issuing system is provided as a distribution system for electronic ticket information among the ticket sellers, the customers, and the electronic ticket platform center.

A gate control system is provided as a distribution system for electronic ticket information between the electronic ticket platform center and the event venues.

Other systems are also provided for fulfilling a sales journal issuing function required for a sales portal of the ticket sellers such as a billing processing function, a post-processing function for conducting data analyses, an IC card-issuing function, etc.

The overall configuration of an electronic ticket management system 100 according to this embodiment is described below with reference to FIG. 1.

The electronic ticket management system 100 includes an electronic ticket platform center 110 for managing the distribution of electronic tickets, event organizers 120 for planning and carrying out events, electronic ticket sellers 130, which serve as electronic ticket selling devices for selling electronic ticket information, customers 140 that purchase electronic tickets, store terminals 150 for writing electronic ticket information into information storage chips possessed by the customers 140, event venues 160 at which events are held, and a network 170, such as the Internet, for linking these elements.

The minimal unit for the electronic ticket management system 100 is ultimately an electronic ticket supplier and each customer 140, i.e., each electronic ticket user. In the system configuration shown in FIG. 1, for example, the electronic ticket supplier is represented by the event organizers 120, the electronic ticket sellers 130, the store terminals 150, the electronic ticket platform center 110, and gate terminals 180. However, the present invention is not restricted to this configuration. To form the electronic ticket supplier in the present invention, a plurality of functional blocks may be formed into a single functional block, or a single functional block may be formed into a plurality of functional blocks. It is to be understood that such modifications are also encompassed in the scope of the present invention.

Before providing details of the configurations of the individual functional blocks of the electronic ticket management system 100, the electronic tickets that are distributed in this system are discussed below.

An electronic ticket is digitized ticket information, which is related to information concerning a specific event, and includes electronic ticket information which authenticates the rights to attend the event. Electronic tickets may be distributed via the network 170, such as the Internet, as digital information, or may be stored in information storage chips, such as IC cards, and carried by the customers 140.

Various types of information that can be indicated in regular paper tickets can be stored in electronic tickets, such as the opening time, the performance start time, the performance name, the performers' names, the name of the event venue, the seat number, the entrance gate, the name of the event organizer, the name of the electronic ticket seller, and the contact name.

An information storage chip usable in the electronic ticket management system 100 of this embodiment is a storage device in which electronic ticket information is stored. To prevent electronic ticket information from being stolen, write access should be restricted by using, for example, a special access key for writing the electronic ticket information. However, the electronic ticket information can be read without restricting read access.

Normally, an information storage chip can be mounted on a contact or non-contact IC card. However, the information storage chip of this embodiment is mounted on a portable device for the convenience for the customer 140 to carry the electronic ticket information to the event venue after purchasing the ticket. The portable devices on which the information storage chips are mountable include the above-described IC cards, portable terminals, cellular telephones, and so on.

Figure 10A:
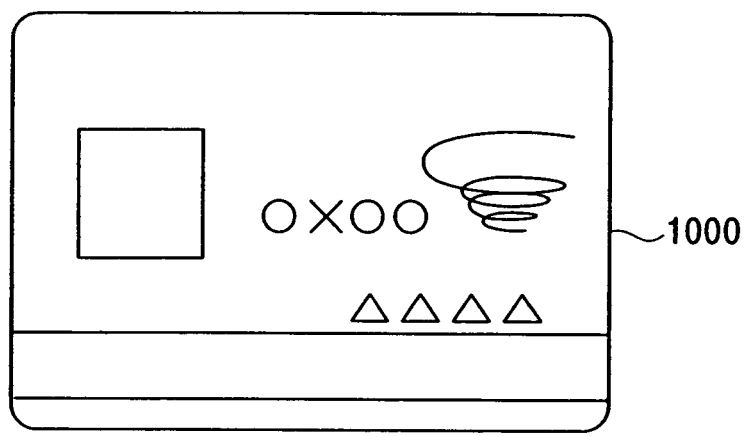
FIGS. 10A and 10B are schematics that illustrate an IC card that is usable in the electronic ticket management system shown in FIG. 1.
Figure 10B:
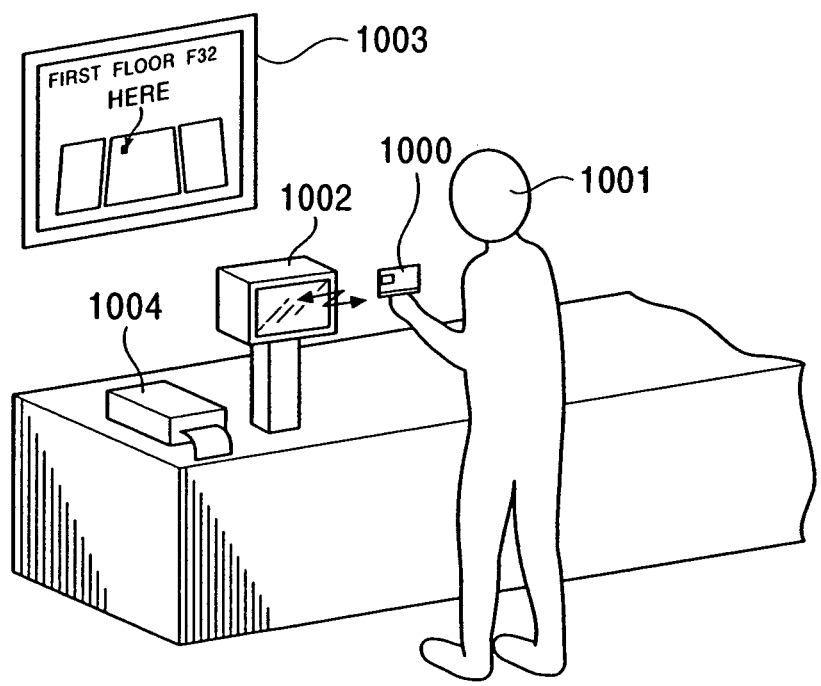

FIG. 10A illustrates a non-contact IC card 1000 as an example of the information storage chip. In the non-contact IC card 1000, a communication function is integrated into an IC chip, which is the information storage chip. As shown in FIG. 10B, a user 1001 of the IC card 1000 brings the IC card 1000 close to an IC card reader 1002 installed at the gate of an event venue, and then, the electronic ticket information is read from the information storage chip. The electronic ticket information is used by a gate terminal device for the management of the event venue. The electronic information can also be displayed on a display device 1003 or printed out on a sheet of paper by a printer 1004 so that the user of the IC card can easily find his/her way to their seat.

FIG. 11 illustrates the data structure of electronic ticket information stored in an information storage chip. The electronic ticket information, as shown in FIG. 11, includes an issuer area for storing the issuer of the electronic ticket, an event ID area, an event information area, and management areas for the individual items of information.

The electronic ticket information used in the electronic ticket management system 100 of this embodiment is configured, as shown in FIG. 11, so that information for a plurality of events can be managed at the same time, and that a plurality of electronic tickets can be managed for each event. With this configuration, a single electronic ticket can be used as a plurality of electronic tickets for a plurality of events. It is also possible to purchase a plurality of electronic tickets and then to distribute or assign an electronic ticket to a third party.

As shown in FIG. 1, a ticket database server (ticket DBS) 111 for managing data concerning electronic tickets, an electronic ticket-operation key server (DBS) 112, a security server (SS) 113 for authenticating/downloading IC cards, and an application server (APS) 114 for receiving Internet portal services are installed in the electronic ticket platform center 110.

The electronic ticket platform center 110 has a function for managing the distribution of electronic ticket information in the electronic ticket management system 100. Particularly in this embodiment, the electronic ticket platform center 110 is formed as a computer, which functions as a web server, so as to provide services to the individual elements of the electronic ticket management system 100, such as the event organizers 120, via the network 170.

Figure 2:
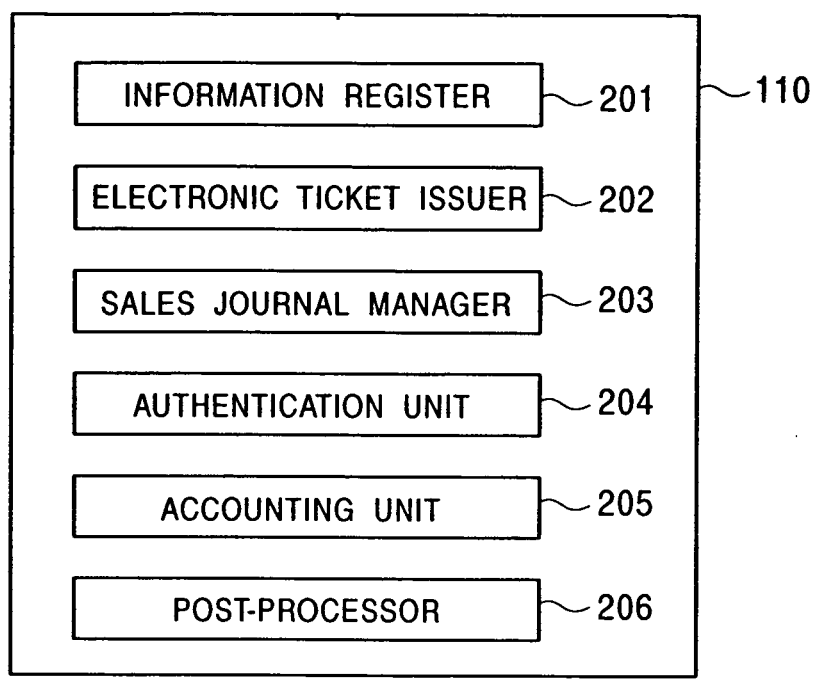
FIG. 2 is a block diagram illustrating the configuration of an electronic ticket platform center that is usable in the electronic ticket management system shown in FIG. 1.

The electronic ticket platform center 110 basically includes, as shown in FIG. 2, an information register 201, an electronic ticket issuer 202, a sales journal manager 203, an authentication unit 204, an accounting unit 205, and a post-processor 206.

Figure 4:
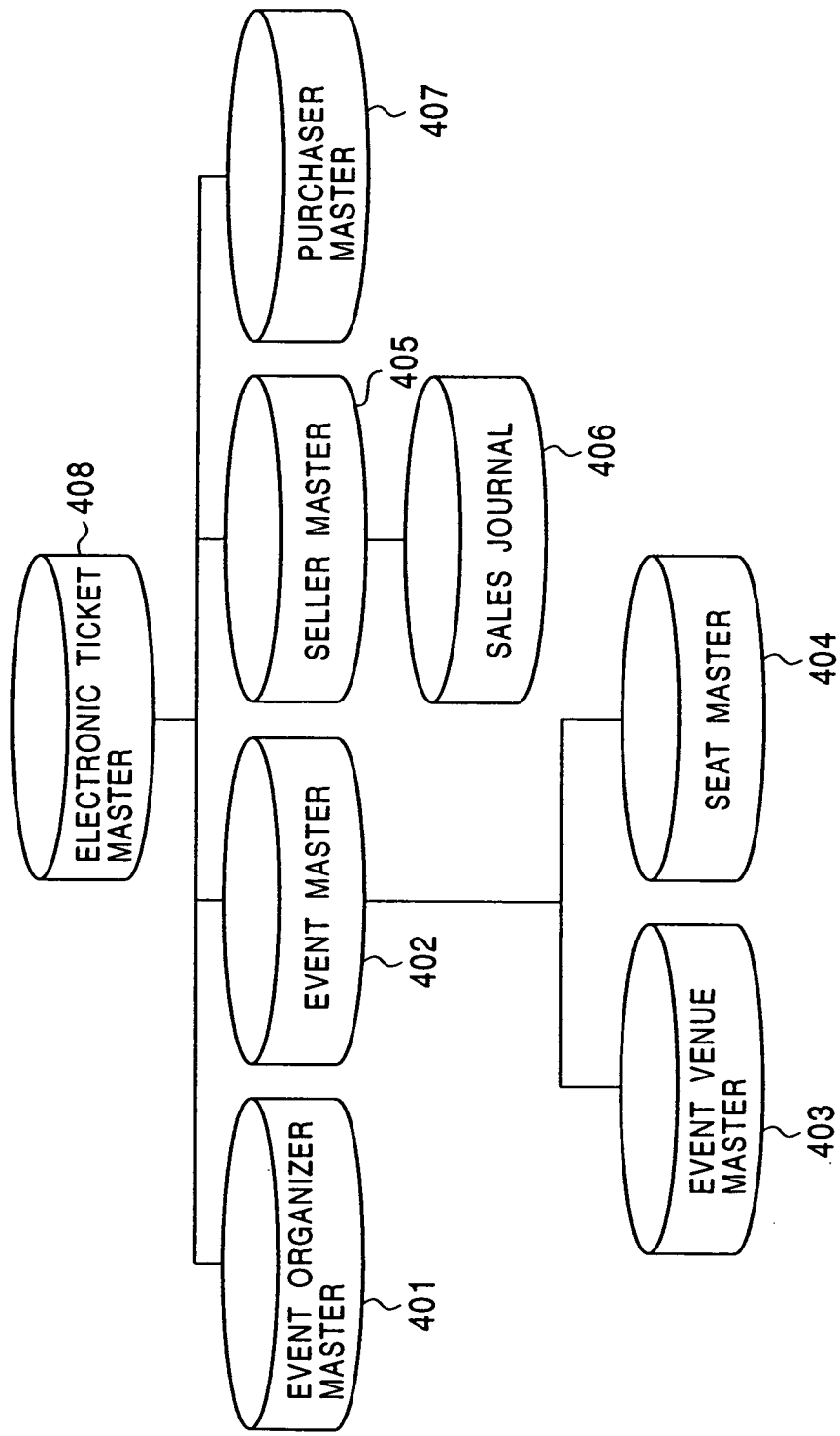
FIG. 4 is a schematic diagram illustrating the masters stored in the electronic ticket management system shown in FIG. 1.

The information register 201 registers various masters required for the electronic ticket management system 100. An example of the masters is shown in FIG. 4.

An event organizer master 401 registers information concerning the event organizers 120 for planning events and allocating tickets. The event organizer master 401 is generated by the electronic ticket platform center 110.

An event master 402 is generated by the event organizer 120, and is registered in the electronic ticket platform center 110. The event master 402 manages various types of information concerning events, and includes an event venue master 403 for managing information of event venues and the time and date when events are held. The event master 402 also includes a seat master 404 for deciding the seat types or seat attributes in event venues.

A seller master 405 is first generated by the event organizer 120, and is then registered in the electronic ticket platform center 110. After planning an event, the event organizer 120 decides the electronic ticket sellers 130 for selling electronic tickets for the corresponding event, and also determines the allocation ratio of the electronic tickets to be distributed to the electronic ticket sellers 130, and then registers the information of the electronic ticket sellers 130 and the allocation ratio in the seller master 405.

A sales journal 406 is a log report on the sales history located in each electronic ticket seller 130 or in each store terminal 150. The sales journal 406 is generated by the electronic ticket seller 130, and is registered in the electronic ticket platform center 110.

A purchaser master 407 stores information concerning purchasers of electronic tickets sold by the electronic ticket sellers 130. The purchaser master 407 is generated by each electronic ticket seller 130, and is registered in the electronic ticket platform center 110.

An electronic ticket master 408 is a central data management master for managing overall electronic ticket information. The electronic ticket master 408 is related to the event organizer master 401, the event master 402, the seller master 405, and the purchaser master 407, and is managed by the electronic ticket platform center 110.

Referring back to FIG. 2, the electronic ticket issuer 202 issues electronic tickets in cooperation with the electronic ticket sellers 130 to the users of the information storage chips in which the electronic ticket information is stored.

Figure 3:
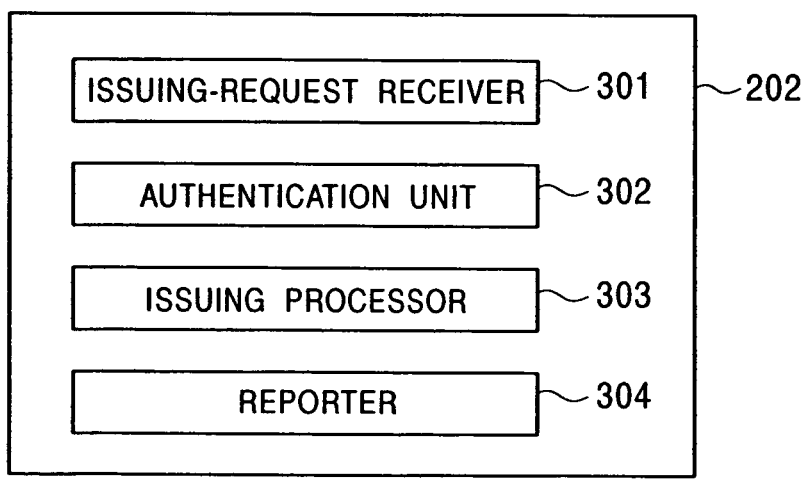
FIG. 3 is a block diagram illustrating the configuration of an electronic ticket issuer of the electronic ticket platform center shown in FIG. 2.

FIG. 3 illustrates the configuration of the electronic ticket issuer 202. The electronic ticket issuer 202 basically includes an issuing-request receiver 301, an authentication unit 302, an issuing processor 303, and a reporter 304. The issuing-request receiver 301 receives an electronic ticket issuing request from the electronic ticket seller 130 or the store terminal 150. In response to the issuing request, the authentication unit 302 performs authentication processing. If authentication has been successfully performed, the issuing processor 303 issues the tickets. An issuing result is reported to a predetermined functional block via the reporter 304. For example, the electronic ticket master 408 is updated.

More specifically, if electronic tickets are sold via the Internet, the electronic ticket issuer 202 allows the user of the information storage chip, sold via the electronic ticket seller 130, to download the corresponding electronic ticket information, thereby performing electronic ticket issuance to the user.

If electronic tickets are sold via the store terminal 150, such as a multimedia kiosk (MMK) terminal installed in a ticket store or a convenience store, the electronic ticket issuer 202 provides the store terminal 150 with the right to sell the electronic tickets, thereby performing issuance processing in the store terminal 156.

The sales journal manager 203 of the electronic ticket platform center 110 manages an electronic ticket sales log reported from the electronic ticket sellers 130. The sales journal 406 is reported to the event organizer 120, and the event organizer 120 refers to the sales journal 406 and performs resale processing if necessary.

The authentication unit 204 receives a request from the electronic ticket seller 130 or the store terminal 150, and permits the customer 140 to download electronic ticket information or permits the stores terminal 150 to write electronic ticket information.

The accounting unit 205 includes functions for centrally performing account processing and bill processing in the electronic ticket management system 100. The electronic ticket fee is first collected from the customers 140 and is sent to the electronic ticket seller 130, and a predetermined fee is then paid to the event organizer 120 and the event venue 160 via the accounting unit 205 of the electronic ticket platform center 110.

The post-processor 206 has a function for performing various types of post-processing in the electronic ticket management system 100. A typical example of post-processing is an analysis of attendee information collected from the gate terminal device of each event venue 160.

Normally, there is not a one-to-one correspondence between the ticket purchaser and the attendee. One person may purchase a plurality of tickets at the same time, or may purchase tickets for others. As a result, there are inconsistencies between the ticket purchasers and the attendees. Ticket sales are frequently performed by Internet shopping. In Internet shopping, it is relatively easy to collect information on ticket purchasers. Considering the inconsistencies between the ticket purchasers and the attendees, however, it is difficult to collect information on the attendees. On the other hand, according to the electronic ticket management system 100 of this embodiment, post-processing of the electronic ticket information is performed by the electronic ticket platform center 110. Therefore, it is possible to obtain useful information for future marketing, such as the relationship between the ticket purchasers and the actual attendees and the relationship between the ticket purchase locations and the attendees.

Unlike known event organizers, the event organizer 120 in this embodiment is a novel feature. The event organizer 120 is defined as a client having functions for planning events, forming event information unique to each event, and registering the event information in the electronic ticket platform center 110. Accordingly, the event organizer 120 is a computer including regular functions, such as a communication function and a browser function, and may also be a household electrical appliance or a portable terminal device provided with the above-described functions.

Figure 5:
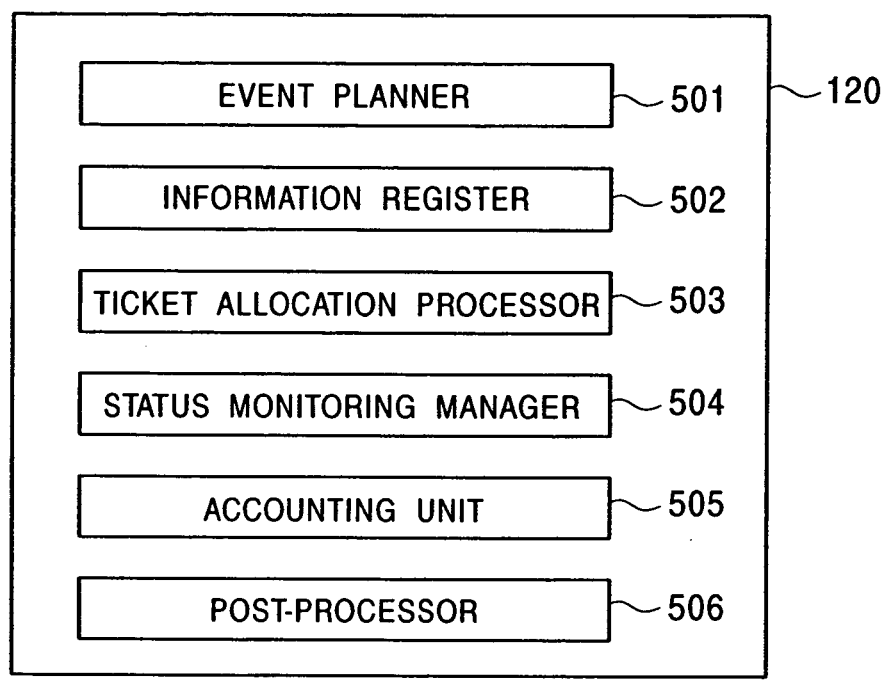
FIG. 5 is a block diagram illustrating the configuration of an event organizer that is usable in the electronic ticket management system shown in FIG. 1.

FIG. 5 illustrates the major functions of the event organizer 120. The event organizer 120 basically includes an event planner 501, an information register 502, a ticket allocation processor 503, a status monitoring manager 504, an accounting unit 505, and a post-processor 506.

The event planner 501 decides details of an event. The details of an event include various types of information concerning an event, such as the performers' names, the name of the event venue, the opening time, the performance time, the performance name, the seat number, the entrance gate, the name of the event organizer, the name of the electronic ticket seller, and a contact number.

The information register 201 of the electronic ticket platform center 110 generates various masters based on the event planned by the event planner 501. The primary information registered in the event organizer 120 includes the seller master 405, the seat master 404, and the event venue master 403. These items of information are sent to the electronic ticket platform center 110 via the network 170 and are managed therein.

The ticket allocation processor 503 decides the electronic ticket sellers 130, and performs ticket allocation by determining the number of electronic tickets to be handled by the individual electronic ticket sellers 130, the seat types, and the seat attributes. A processing result is then sent to the electronic ticket management center 110 as the event master 402 and is managed therein.

Figure 6:
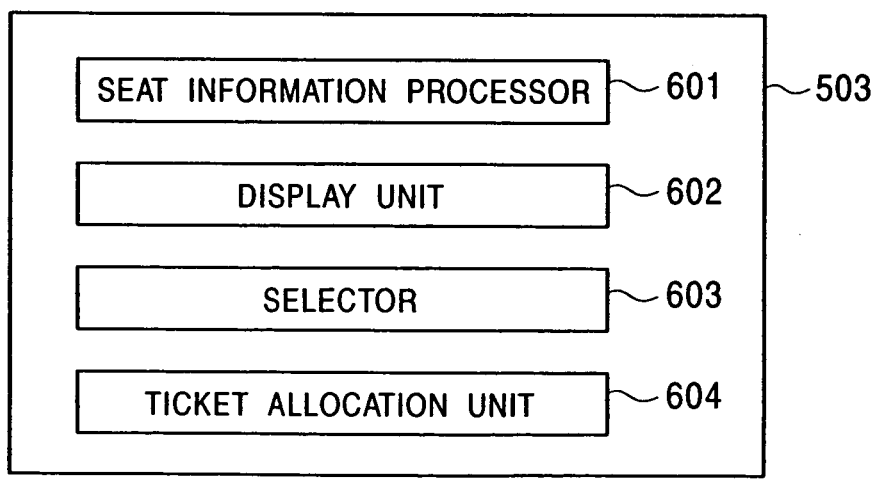
FIG. 6 is a block diagram illustrating the configuration of a ticket allocation processor of the event organizer shown in FIG. 5.

Details of the ticket allocation processor 503 are shown in FIG. 6. The ticket allocation processor 503 is basically formed of a seat information generator 601, a display unit 602, a selector 603, and a ticket allocation unit 604.

The seat information generator 601 processes seat information concerning, for example, the seat types and the seat attributes, sent from the event venue master 403 in such a manner that the information can be displayed using a graphical user interface (GUI). For example, the seats can be displayed in different colors according to the seat types and the seat attributes.

The display unit 602 graphically displays the seat information processed by the seat information generator 601 on, for example, a cathode ray tube (CRT). The operator is then able to easily select tickets by examining the screen.

The selector 603 has a function for allocating the seats selected by the operator to the individual electronic ticket sellers 130. In this operation, to deal with a group of attendees, a plurality of seats can be simultaneously selected as a unit. The selecting operation can be performed by using a dragging function of a mouse or a multi-key function for simultaneously pressing a plurality of keys provided on a keyboard, thereby enhancing the efficiency of the selecting operation.

The ticket allocation unit 604 exports the information concerning the allocation of seats selected by the selector 603 to the electronic ticket platform center 110 and registers the information therein. The electronic ticket platform center 110 then distributes the information sent from the ticket allocation unit 604 to the corresponding electronic ticket sellers 130 so as to entrust the electronic ticket sales to the electronic ticket seller 130.

Referring back to FIG. 5, the status monitoring manager 504 of the event organizer 120 manages a schedule before the event, and also monitors the sales journal 406 reported from the electronic ticket sellers 130 or the store terminal 150, thereby identifying the sales status of the electronic tickets. As a result, if necessary, the electronic tickets are collected from the electronic ticket sellers 130 which are not selling tickets well, and are entrusted to other electronic ticket sellers 130.

The accounting unit 505 performs overall accounting processing concerning the event organizer 120. The accounting processing concerning the event organizer 120 includes payments to the performers for their performance and to the owners of the venues for the use of the event venues. The account processing may also include the collection of a fee for electronic tickets from the electronic ticket platform center 110 or the electronic ticket sellers 130, and payments for management handling fees to the electronic ticket platform center 110 and entrusting fees to the electronic ticket sellers 130. The account processing greatly differs according to the system configuration of the event organizer 120.

The post-processor 506 has a function for computing and analyzing electronic ticket information collected from the electronic ticket platform center 110, the electronic ticket sellers 130, and the gate terminals 180 installed in the event venues 160. An event review can be performed by using an analysis report obtained from the post-processor 506 so as to obtain marketing information for future events.

The electronic ticket seller 130 is a terminal device having the right to sell electronic tickets to the customers 140. Such a terminal device includes a web server which the customers 140 can access via a network, such as the Internet, and a terminal installed in a ticket store which the operator is able to operate while communicating with the customers 140. Accordingly, the electronic ticket sellers 130 may be computers provided with regular functions possessed by clients and servers, such as a communication function and a browser function, or they may be household electrical appliances or portable terminal devices provided with the above-described functions.

Figure 7:
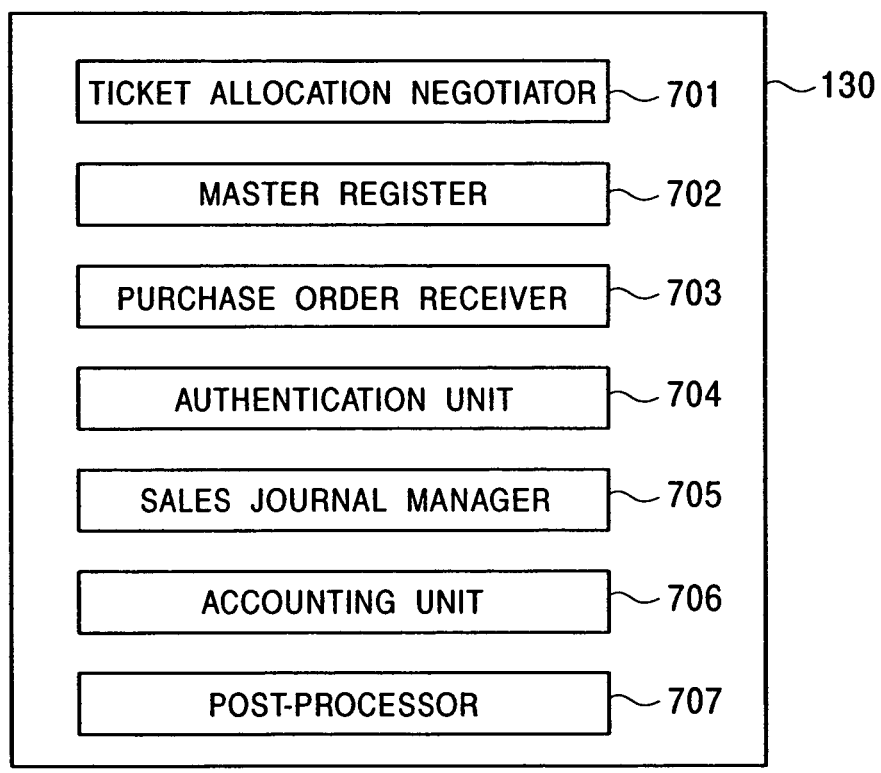
FIG. 7 is a block diagram illustrating the configuration of an electronic ticket seller that is usable in the electronic ticket management system shown in FIG. 1.

FIG. 7 illustrates functional blocks of the electronic ticket seller 130. The electronic ticket seller 130 is formed of a ticket allocation negotiator 701, a master register 702, a purchase order receiver 703, an authentication unit 704, a sales journal manager 705, an accounting unit 706, and a post-processor 707.

If the electronic ticket seller 130 reads and writes electronic ticket information from and into information storage chips, a reader/writer is also required.

If it is necessary to read the content from information storage chips and print it out on a medium, such as paper, an external output unit, such as a printer, is also required.

The ticket allocation negotiator 701 has a function for negotiating the allocation of electronic tickets with the event organizer 120. Generally, event tickets are sold by the event organizers 120 via a plurality of ticket sales agents unless they are directly sold to the members. The electronic ticket seller 130 is a terminal device installed in an electronic ticket sales agent, and negotiates with the event organizer 120 to obtain seats which enable the corresponding ticket sales agent to achieve good sales performance. According to the negotiations, the event organizer 120 decides the electronic ticket sellers 130 and also determines the seat types and the seat attributes of electronic tickets allocated to the individual ticket agents.

The master register 702 of the electronic ticket seller 130 obtains the event information and the electronic ticket information from the electronic ticket platform center 110 and the event organizer 120 so as to generate an electronic ticket seller event master, which serves as basic data for electronic ticket sales. The electronic ticket seller event master is appropriately updated according to the sales history, and is managed by the sales journal manager 705.

The purchase order receiver 703 directly accepts electronic ticket purchase orders from ticket purchasers, such as members, or indirectly accepts electronic ticket purchase orders from the store terminals 150.

The authentication unit 704 checks the purchase order accepted by the purchase order receiver 703 by, for example, checking the credit of a ticket purchaser from a credit card number. If it is determined that the ticket purchaser has sufficient funds for paying for the ticket fee, the authentication unit 704 permits a ticket sale.

The sales journal manager 705 manages the electronic ticket sales performance achieved by the electronic ticket seller 130, and reports the sales journal 406 to the electronic ticket platform center 110 or the event organizer 120 if necessary.

The accounting unit 706 performs the overall account processing concerning the electronic ticket seller 130. The account processing concerning the electronic ticket seller 130 includes the collection of a ticket fee from the ticket purchasers, transfer of the ticket fee collected from the ticket purchasers to the electronic ticket platform center 110 and the event organizer 120, and collection of a sales entrusting fee from the electronic ticket platform center 110 and the event organizer 120. However, as in the account processing performed by the event organizer 120, the account processing performed by the electronic ticket seller 130 substantially differs according to the system configuration.

The post-processor 707 has a function for analyzing the electronic ticket information handled in the electronic ticket seller 130. For example, personal information concerning the age, the occupation, and the gender of the customers 140 who purchase electronic tickets, the number of purchased tickets, and the place at which the tickets are purchased are formed into a database. The database is then linked to information collected from the other blocks of the electronic ticket management system 100. As a result, useful information for planning future events can be obtained.

The configuration of the store terminal 150 is discussed below with reference to FIG. 8. The store terminal 150 has a function for reading and writing data from and into information storage chips managed by the electronic ticket seller 130. The store terminal 150 may be formed as a multimedia kiosk (MMK) terminal installed in, for example, a ticket store or a convenience store.

Figure 8:
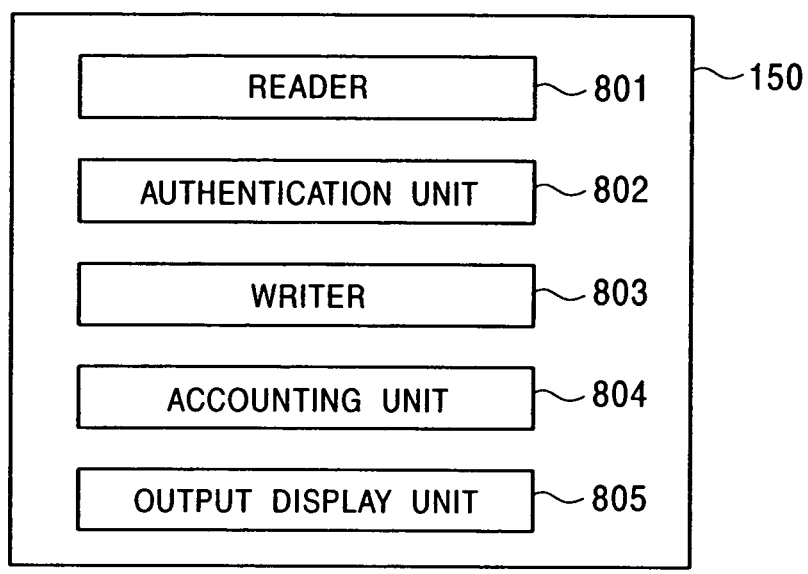
FIG. 8 is a block diagram illustrating the configuration of a store terminal that is usable in the electronic ticket management system shown in FIG. 1.

As shown in FIG. 8, the store terminal 150 is basically formed of a reader 801, an authentication unit 802, a writer 803, an accounting unit 804, and an output display unit 805. Generally, the store terminal 150 is a terminal device operable by a ticket purchaser while observing the screen, such as a multimedia kiosk terminal.

The reader 801 has a function for reading the ID number of the user and the electronic ticket information from the information storage chip. If the information storage device is a contact IC card, a card reader provided with a card entrance slot and a card exit slot is provided. If the information storage device is a non-contact IC card, a card reader is provided. When the user brings the non-contact IC card close to the card reader, electronic ticket information can be read from the non-contact IC card.

The authentication unit 802 has a function for checking the ID number of the user and the electronic ticket information read by the reader 801. For example, to purchase an electronic ticket by using the store terminal 150, the user of the information storage chip first inquires to the electronic ticket seller 130 or the electronic ticket platform center 110 whether he/she is able to purchase the corresponding ticket. If the user receives a response indicating that he/she is allowed to purchase a ticket, the reader 801 checks the credit of the user from the ID number stored in the information storage chip. If it is found that the user has sufficient funds for paying for the ticket, the authentication unit 802 gives a permission to purchase the electronic ticket.

The writer 803 writes new electronic ticket information into the information storage chip of the user who is permitted to buy a ticket by the authentication unit 802. Alternatively, if ticket allocation processing is performed, the writer 803 overwrites the electronic ticket information so that it cannot be reused.

The output display unit 804 displays the status of the processing executed in the store terminal 150 or prints required information on a medium, such as paper, in response to the purchaser's request.

The configuration of the gate terminal 180 installed at the gate of the event venue 160 is described below with reference to FIG. 9.

The basic function of the gate terminal 180 is to read electronic ticket information stored in the information storage chip of the user and to determine whether the user is permitted to enter the event venue 160. In particular, in the authentication method of the electronic ticket management system 100 of this embodiment, authentication is performed by the event ID number preset for each event rather than by the ID number unique to each information storage chip.

That is, according to the electronic ticket management system 100 of this embodiment, the gate terminal 180 permits all the users carrying the information storage chips in which legal event ID numbers are stored to enter the event venue 160 without using the ID numbers unique to the individual storage chips.

The event ID number is included as part of the event information. It is possible to set a plurality of event ID numbers for each event. For example, if it is desired that a particular gate to arena seats be distinguished from another gate to other seats, different ID numbers can be set and stored in the information storage chips.

Figure 9:
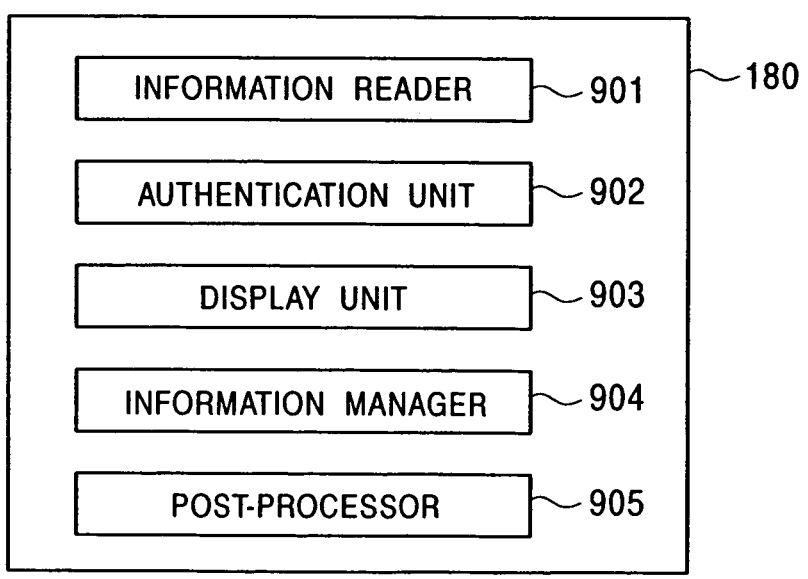
FIG. 9 is a block diagram illustrating the configuration of a gate terminal that is usable in the electronic ticket management system shown in FIG. 1.

Accordingly, in order to fulfil the above-described function, the gate terminal 180 basically includes, as shown in FIG. 9, an information reader 901, an authentication unit 902, a display unit 903, an information manager 904, and a post-processor 905.

The information reader 901 is an information storage chip reader having a function for reading electronic ticket information from the information storage chip carried by the user. An example of the information storage chip integrated in a non-contact IC card is shown in FIGS. 10A and 10B. As shown in FIG. 10B, the user 1001 brings the IC card 1000 close to the information reader 1002 (901) of the portable terminal so as to read the electronic ticket information stored in the information storage chip.

The authentication unit 902 determines whether the user of the information storage chip is permitted to attend the event based on the event information, in particular, the ID number unique to the event, extracted from the electronic ticket information read by the information reader 901. As described above, in the electronic ticket management system 100 of this embodiment, it is determined whether the user of the information storage chip is permitted to enter the event venue 160 simply by using the event information assigned to each event rather than the ID number unique to each information storage chip.

The display unit 903 suitably processes the electronic ticket information read by the information reader 901 so as to provide the processed information to the user 1001. In the example shown in FIG. 10B, the seat number and the seat position in the event venue are displayed to show them to the user 1001 so that the user 1001 can easily find his/her way to the seat. In the example shown in FIG. 10B, the printer 1004 is also provided to print out the electronic ticket information stored in the information storage chip so that the information can be provided to the user 1001.

The information manager 904 manages the electronic ticket information read by the information reader 901. For example, if a predetermined number of attendees have not yet arrived in the event venue 160 immediately before the performance time, the performance can be delayed. In the electronic ticket management system 100, authentication is performed without the need to query the data masters of the electronic ticket platform center 110 about the ID number of the information storage chip. Accordingly, electronic tickets can be sold immediately before the performance. Electronic ticket information sold on the same day as the day of the event is thus managed by the information manger 904.

The post-processor 905 has a function for computing electronic ticket information collected by the gate terminal 180, and sending it to the electronic ticket platform center 110 or the event organizer 120. The electronic ticket information is further sent from the electronic ticket platform center 110 or the event organizer 120 to the electronic ticket sellers 130. As discussed above, ticket purchasers do not necessarily coincide with attendees on a one-to-one ratio. In this sense, the electronic ticket information collected by the gate terminal 180 can be useful information for future marketing data reflecting the actual attendees.

The network 170 is an interactive communication network, such as the Internet connected via a public network, or an intranet connected via a local area network (LAN). Although the network 170 may be a wireless or wired network, a closed network 170, for example, a dedicated line, is preferably used to connect the event organizer 120, the electronic ticket seller 130, and the electronic ticket platform center 110 in view of information security. In contrast, a network 170, such as a public network, may be used to connect the sales portal site of the electronic ticket seller 130 and the customer 140, and between the event venue 160 and the electronic ticket platform center 110.

In the electronic ticket management system 100 of this embodiment, electronic ticket information is distributed via the network 170. However, the present invention is not restricted to this configuration. For example, various masters concerning electronic ticket information may be stored in storage media, such as floppy disks, and be distributed offline.

The individual elements of the electronic ticket management system 100 have been discussed. Details of the operation of the above-configured electronic ticket management system 100 are given below.

The electronic ticket management system 100 of this embodiment can be used as a ticket allocation system, particularly between the event organizer 120 and the electronic ticket platform center 110. In this ticket allocation system, based on an input from the event organizer 120, processing blocks concerning the management of various masters required for generating ticket allocation information and concerning stock input processing by the electronic ticket sellers 130 are provided.

A description is given below of a master registration flow 1200 in the electronic ticket management system 100 of this embodiment with reference to FIG. 12.

In step S1201, the event organizer 120 plans an event and determines details of the event, such as the performers' names, the event name, the event venue name, the opening time, the performance time, the seat number, the name of the event organizer, the names of the electronic ticket sellers, and a contact number. In step S1202, after determining details of the event, the event organizer 120 reserves an event venue.

Then, in step S1203, the event organizer 120 registers information in various masters in order to specify ticket allocation information. More specifically, in step S1203, information is registered in the seller master. In step S1204, information is registered in the seat master. In step S1205, information is registered in the event venue master. Then, in step S1206, the information registered in the seller master is exported to the electronic ticket platform center 110 and is managed therein. In step S1207, the information registered in the seat master is exported to the electronic ticket platform center 110 and is managed therein. In step S1208, the information registered in the event venue master is exported to the electronic ticket platform center 110 and is managed therein. In step S1209, the electronic ticket platform center 110 also registers information in the event organizer master 401. In step S1210, the event organizer master 401 is registered.

After completing the registration of the masters concerning the basic information of the event, in step S1211, the seat allocation pre-processing is performed. The event organizer 120 decides the electronic ticket sellers (fan clubs) 130 which handle the sales of electronic tickets, and also determines the allocation of the seats to the individual electronic ticket sellers 130. In this case, in step S1212, the electronic ticket sellers 130 negotiate with the event organizer 120 to achieve good sales performance.

After performing the seat allocation pre-processing and the negotiations, in step S1213, the event organizer 120 performs the seat allocation processing. More specifically, in step S1214, the event organizer 120 registers the allocation data in the electronic ticket platform center 110 as the event master 402. Then, in step S1215, the electronic ticket platform center 110 creates the electronic ticket master 408 in correspondence with the event master 402. By using this electronic ticket master 408 as basic data, the subsequent processing is performed.

Figure 13:
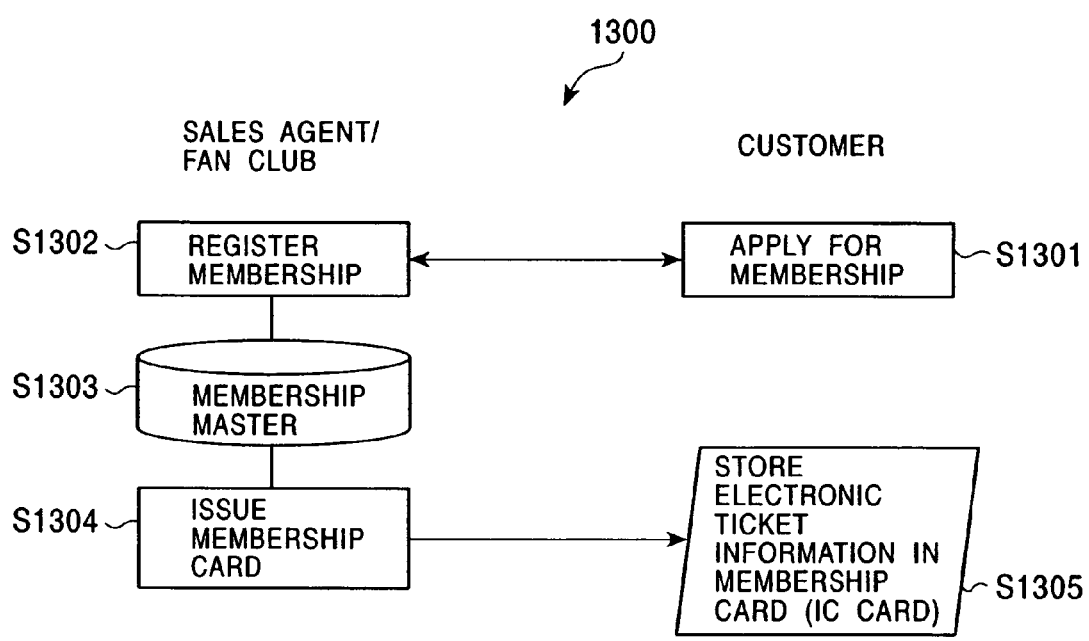
FIG. 13 is a block diagram illustrating a membership-master registration flow system that is usable in the electronic ticket management system shown in FIG. 1.

FIG. 13 illustrates a registration flow system 1300 for a membership master managed by the electronic ticket sellers 130. The membership-master registration flow system 1300 can be implemented as a business model for efficiently selling electronic tickets. In step S1301, the customer 140 applies for membership prior to the electronic ticket sales, and the electronic ticket seller 130 receives the application. Then, in step S1302, the electronic ticket seller 130 conducts a membership registration. In step S1303, the electronic ticket seller 130 then manages the membership information as the membership master. Then, in step S1304, the electronic ticket seller 130 issues an IC card as a membership card. In step S1305, the customer 140 stores electronic ticket information in the information storage chip integrated in the membership card.

According to this business model, prior to the sales or the distribution of electronic tickets, applications for membership are received, and IC cards are issued as membership cards. Then, electronic tickets can be much more efficiently sold than being sold to unspecified customers 140. Additionally, since IC cards are issued as membership cards, it is not necessary for ticket purchasers to obtain information storage chips, thereby promoting the spread of electronic tickets.

Figure 23:
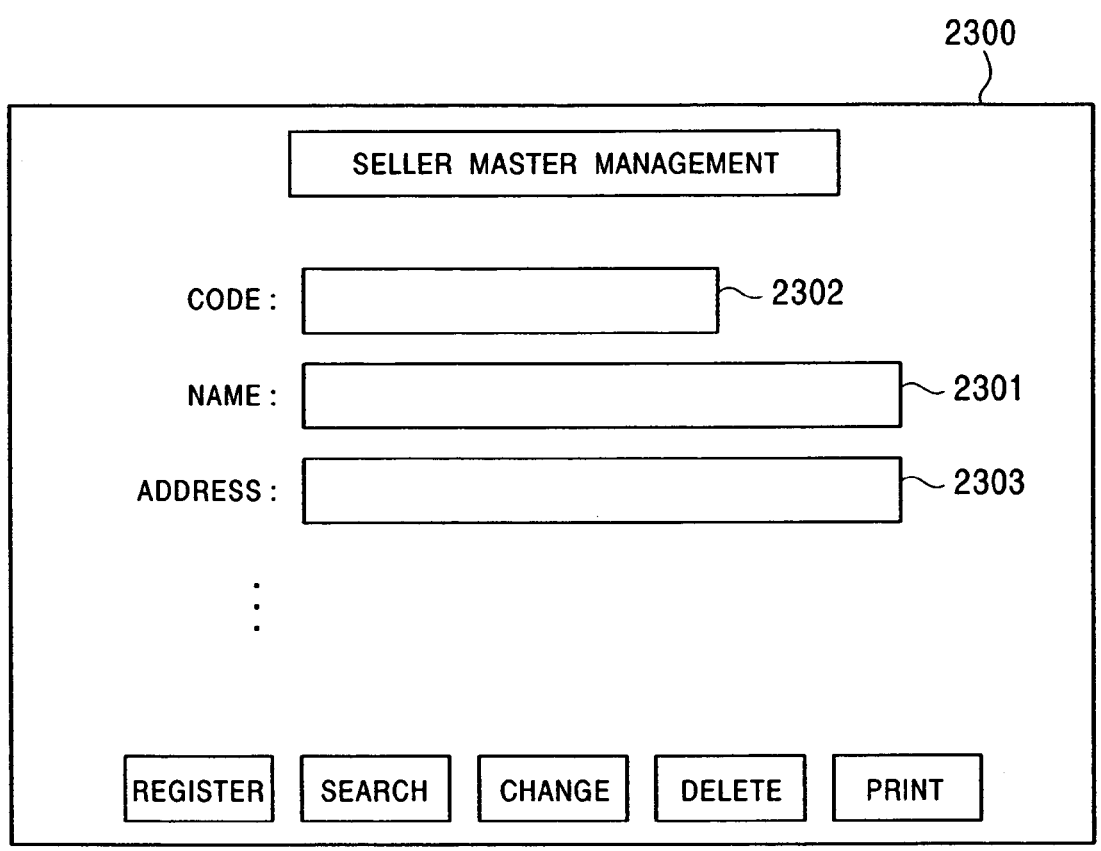
FIG. 23 is a schematic diagram illustrating a seller-master management processing screen that is usable in the electronic ticket management system shown in FIG. 1.

FIG. 23 illustrates an example of a screen for the seller-master management processing performed by the event organizer 120. On a seller-master management processing screen 2300, a name 2301, a code 2302, an address 2303, etc. of the electronic ticket seller 130 or the fan club is registered. The information of the registered items is then sent to the electronic ticket platform center 110 and is registered in the seller master 405.

Figure 24:
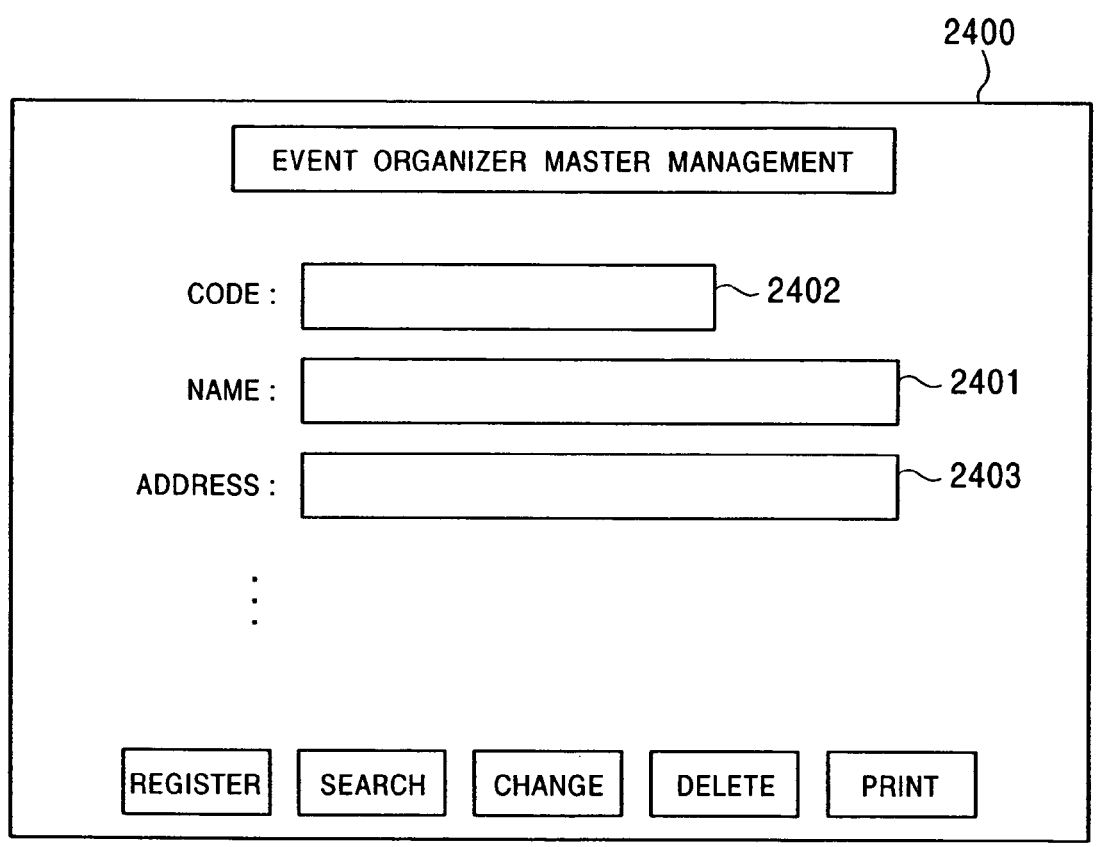
FIG. 24 is a schematic diagram illustrating an event organizer master management processing screen that is usable in the electronic ticket management system shown in FIG. 1.

FIG. 24 illustrates an example of a screen for the event-organizer master management processing performed by the electronic ticket platform center 110. On an event-organizer master management processing screen 2400, a name 2401, a code 2402, and an address 2403, of the event organizer 120 is registered. The information of the registered items is registered in the event organizer master 401 of the electronic ticket platform center 110.

Figure 25:
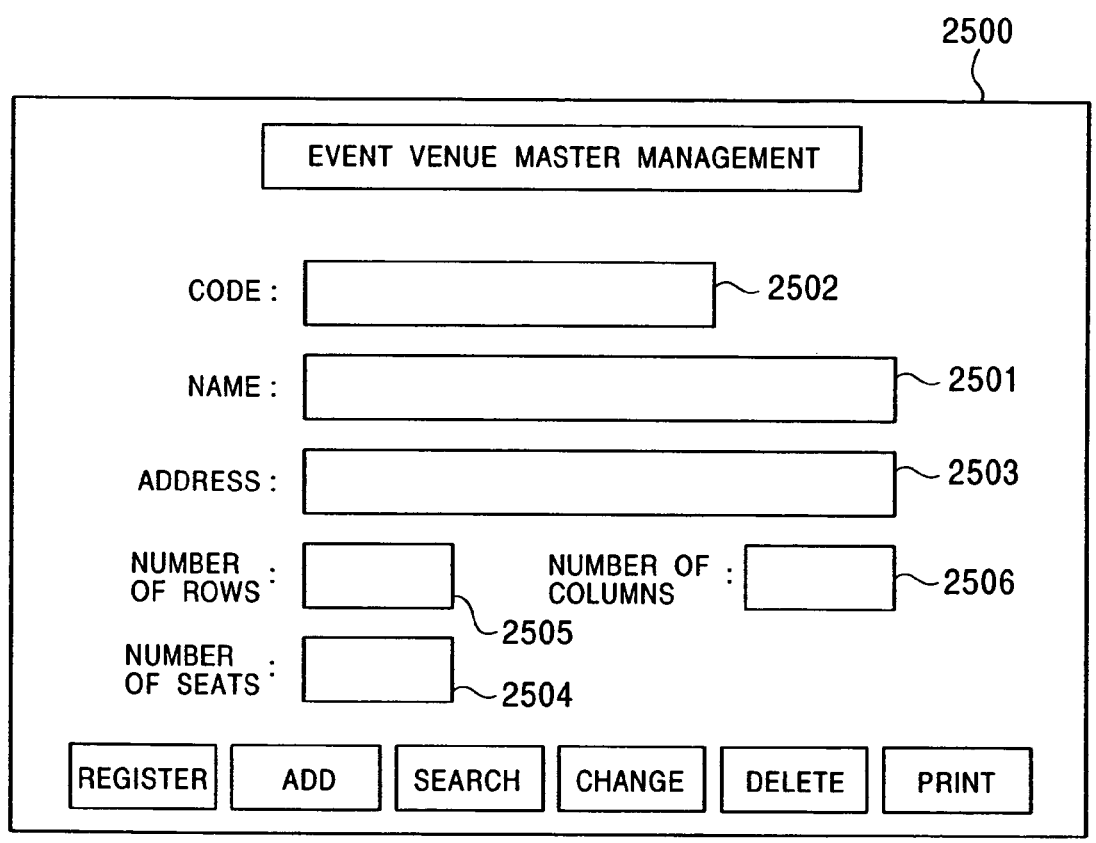
FIG. 25 is a schematic diagram illustrating an event venue master management processing screen that is usable in the electronic ticket management system shown in FIG. 1.

FIG. 25 illustrates an example of an event-venue master management processing screen 2500. After deciding the event venue, the event organizer 120 registers the event venue master 403 which manages links to the event-venue access information, the seat position, the entrance gate, and so on. On the event-venue master management processing screen 2500, as shown in FIG. 25, a name 2501, a code 2502, an address 2503, a number of seats 2504, a number of seat rows 2505, a number of seat columns 2506, is registered.

Figure 26:
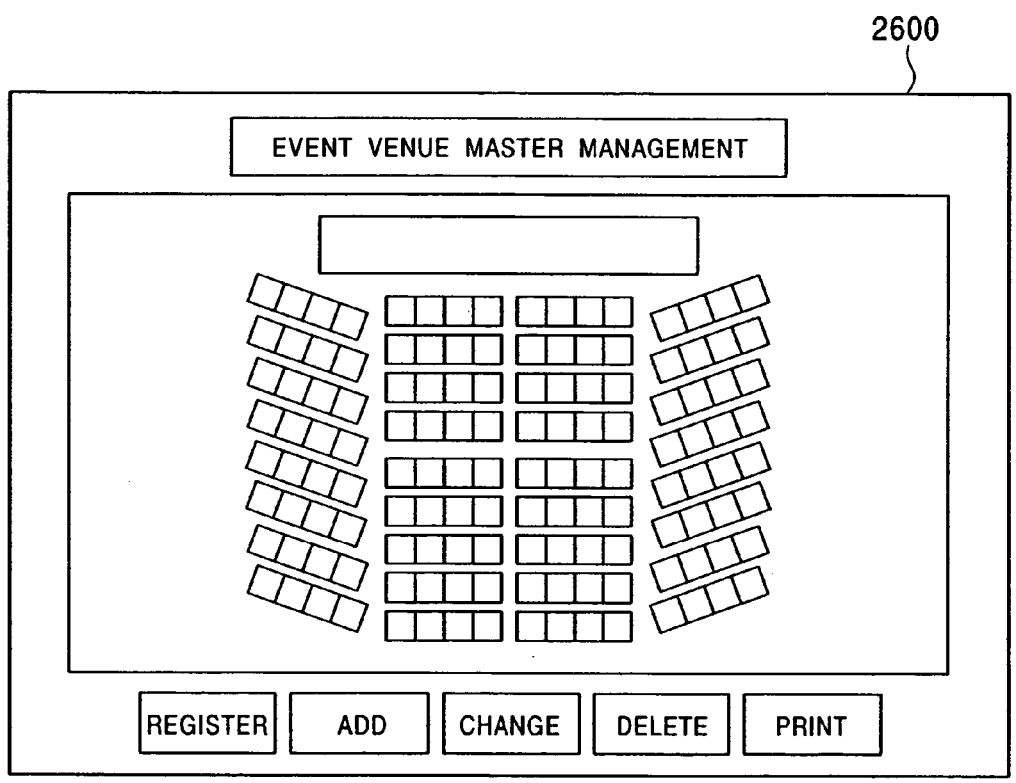
FIG. 26 is a schematic diagram illustrating an event venue image processing screen that is usable in the electronic ticket management system shown in FIG. 1.

The registered event venue master 403 is displayed as a graphical image 2600, as shown in FIG. 26. Even in the same event venue, the layout of seats may substantially differ according to the type of event. Accordingly, the event venue master 403 is configured so that a plurality of seat layouts can be registered for the same event venue.

Figure 27:
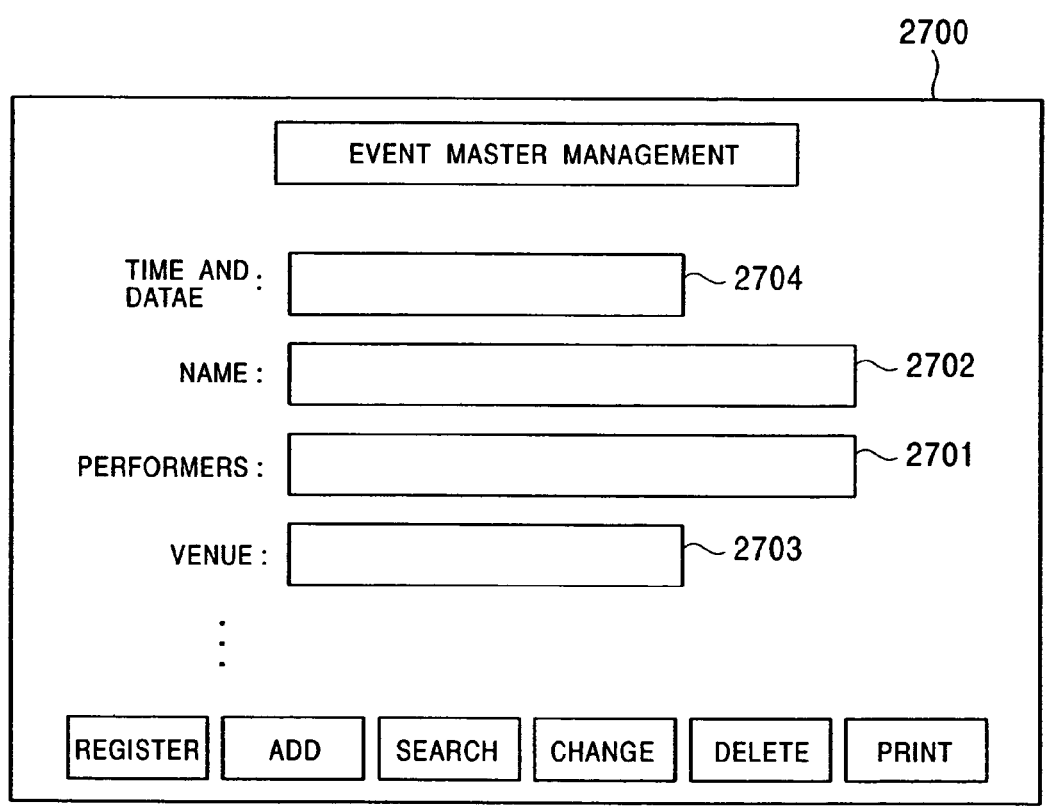
FIG. 27 is a schematic diagram illustrating an event-master processing screen that is usable in the electronic ticket management system shown in FIG. 1.

FIG. 27 illustrates an example of an event-master management processing screen 2700. On this screen 2700, various information concerning the event, for example, performers' names 2701, an event name 2702, an event venue 2703, a time and date 2704, and so on, can be registered as event information. The information input by the event organizer 120 is exported to the electronic ticket platform center 110, and is managed as the event master 402 in correspondence with the electronic ticket master 408.

If a plurality of events are to be held in one event venue, the process is simplified so that the operator does not have to input the same data more than once.

Figure 28:
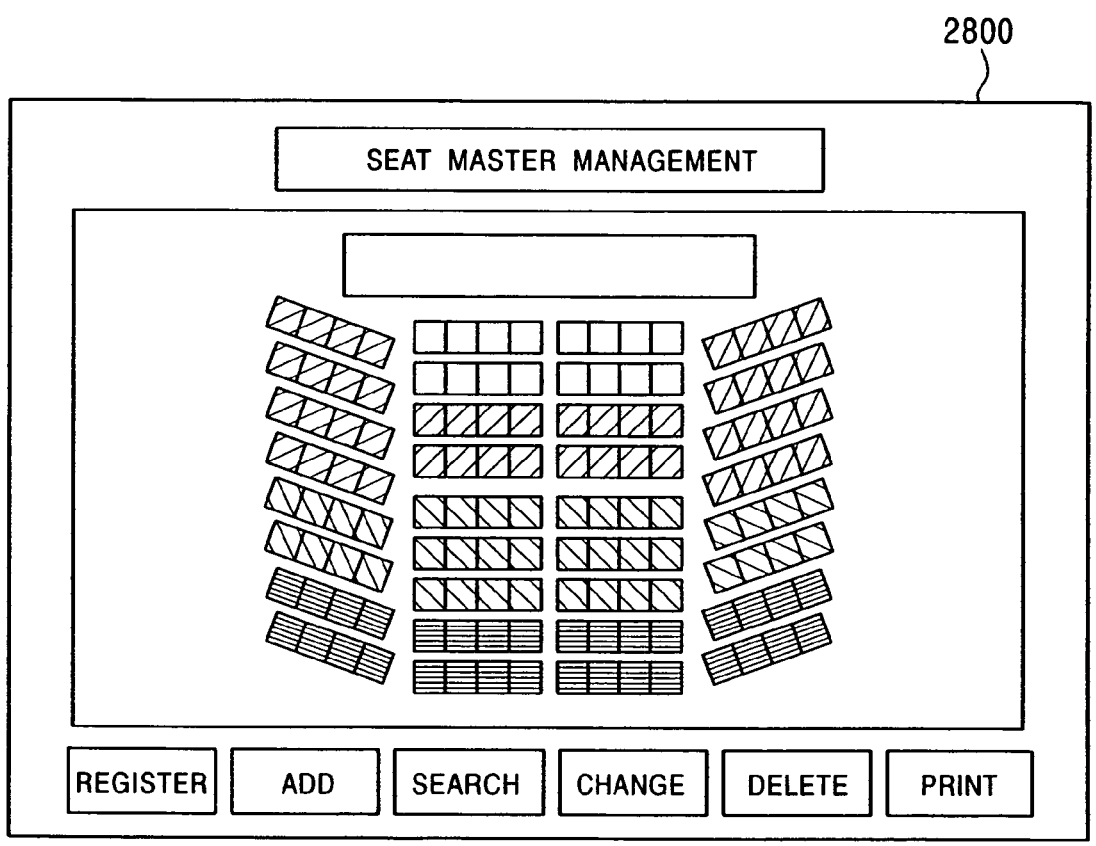
FIG. 28 is a schematic diagram illustrating seat-master management processing screen that is usable in the electronic ticket management system shown in FIG. 1.

FIG. 28 illustrates an example of a seat-master management processing screen 2800. On this screen 2800, the ranges of seats are shown according to the seat types, such as S seats, A seats, and so on, according to a GUI operation. By designating the seat range, the corresponding screen appears so that the operator is able to specify the seat type and the seat attribute.

Details of the ticket allocation processing performed by a GUI operation from the layout of the event venue based on the masters registered as discussed above are given below with reference to FIGS. 29 through 31.

Figure 12:
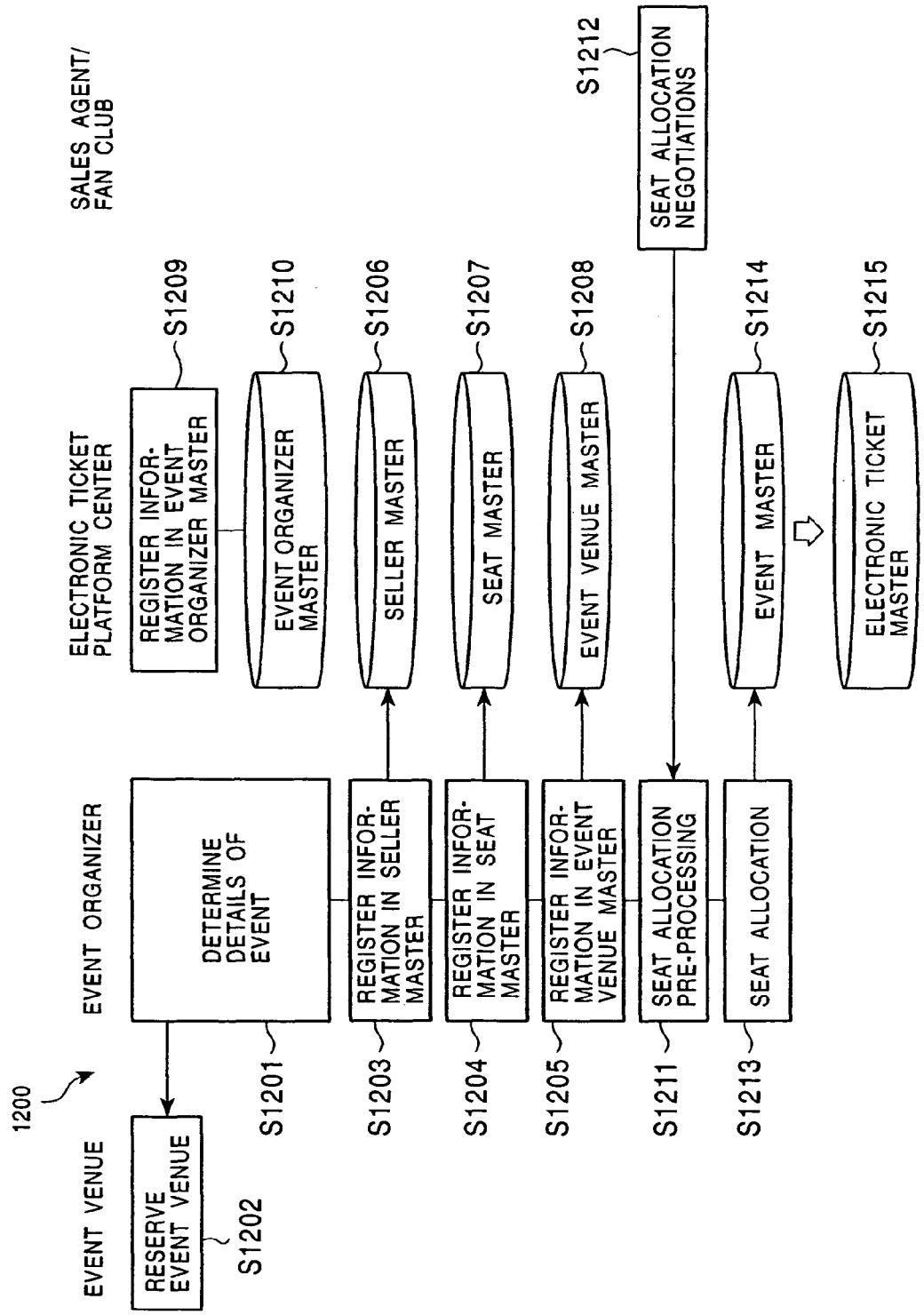
FIG. 12 is a block diagram illustrating a master registration flow system that is usable in the electronic ticket management system shown in FIG. 1.
Figure 14:
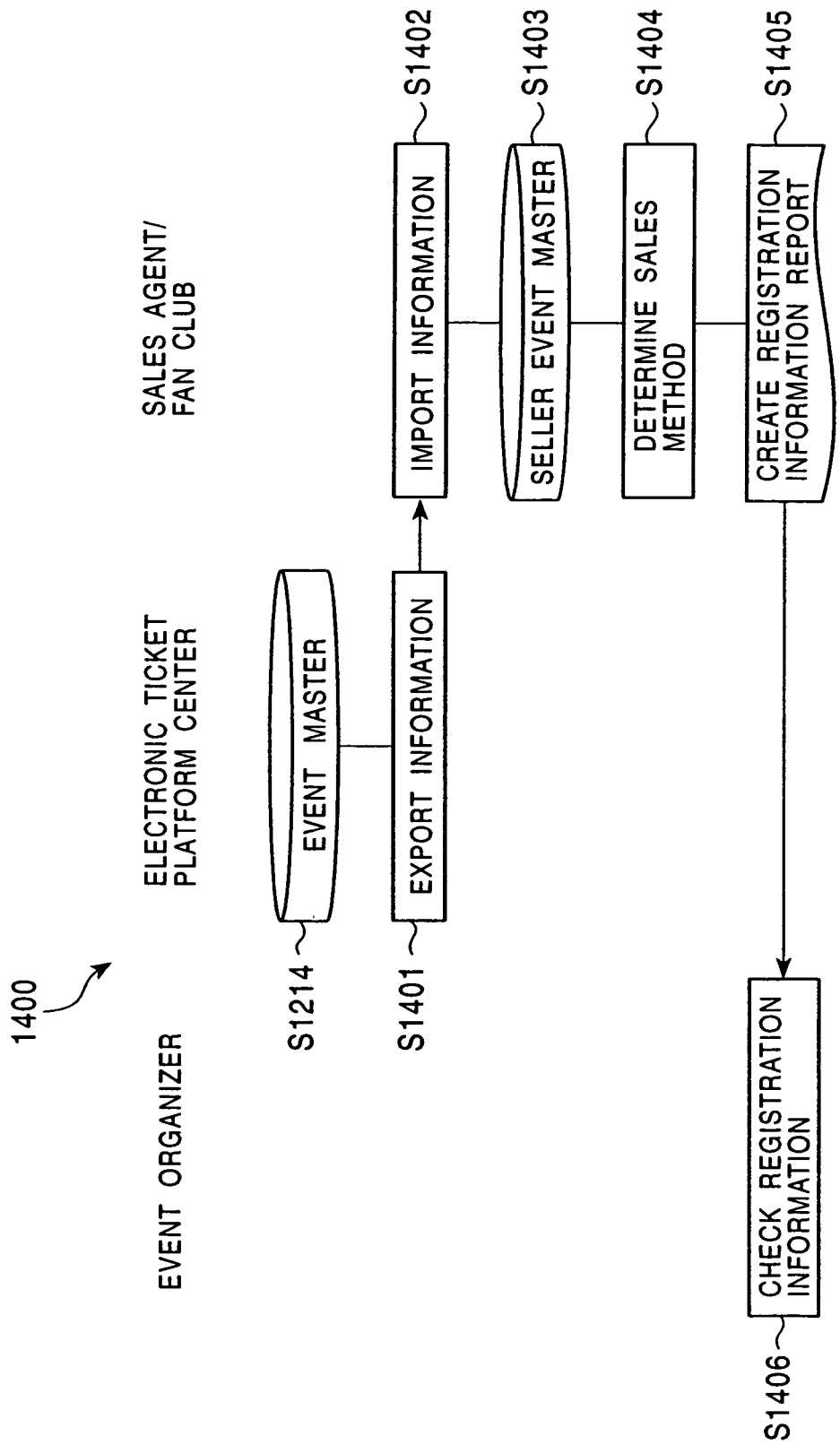
FIG. 14 is a block diagram illustrating a stock information registration processing flow system that is usable in the electronic ticket management system shown in FIG. 1.
Figure 29:
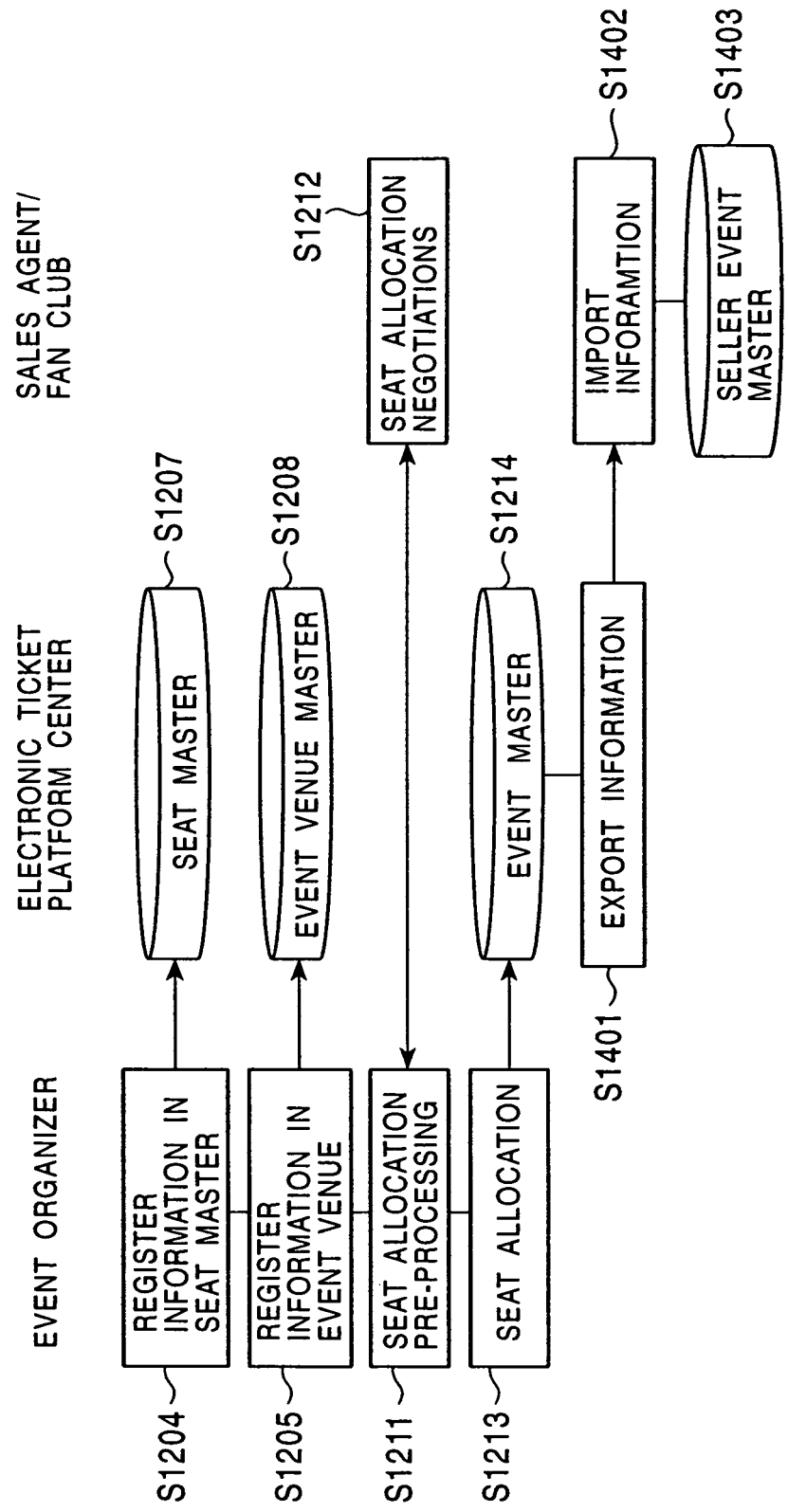
FIG. 29 is a block diagram illustrating a ticket allocation processing flow system that is usable in the electronic ticket management system shown in FIG. 1.

Although the processing flow of FIG. 29 is basically similar to that of FIGS. 12 and 14, the steps required for the allocation processing are basically indicated in FIG. 29. Thus, the blocks having the same configurations and functions are indicated by like step numbers, and an explanation thereof is basically given only once.

According to known allocation processing, tickets are allocated manually by the event organizers 120, and the event information, the ticket allocation information, and the information of the layout of the event venue are separately sent from the event organizer 120 to the individual electronic ticket sellers 130 by means of, for example, a facsimile machine. Then, the electronic ticket sellers 130 manually input the layout information sent from the event organizer 120 into a system managed by the electronic ticket sellers 130.

According to this method, it takes time to generate ticket data, and the information may be input incorrectly, thereby causing errors, such as multiple booking.

In order to avoid such erroneous operations, the ticket allocation information should be checked. The checking operation is also manually performed by the event organizer 120 and the electronic ticket sellers 130. However, this checking operation imposes a heavy burden on both the event organizer 120 and the electronic ticket sellers 130, and it is necessary for both the event organizer 120 and the electronic ticket sellers 130 to individually check the allocation information.

On the other hand, according to the ticket allocation system of an embodiment of the present invention, the event master 402 is generated based on the event organizer 120, the electronic ticket seller 130, the seat type, the seat attribute, and the seat master attached to the event venue layout. Then, tickets are allocated from the event organizer 120 to the electronic ticket sellers 130, i.e., the ticket allocation processing is performed according to a GUI operation. Accordingly, the simplified processing can be performed with high precision.

According to the ticket allocation processing shown in FIG. 29, in step S1204, the event organizer 120 registers information in the seat master. In step S1207, the registered information is exported to the electronic ticket platform center 110 so as to generate the seat master 404. Then, in step S1205, the event organizer 120 registers information in the event venue master. In step S1208, the registered information is also exported to the electronic ticket platform center 110 so as to generate the event venue master 403.

Then, in steps S1211 and S1212, the seat allocation preprocessing and the seat allocation negotiations are performed between the event organizer 120 and the electronic ticket seller 130 based on the seat master 404 and the event venue master 403. Thereafter, in step S1213, the event organizer 120 performs seat allocation processing. In step S1214, the allocation data is then registered in the electronic ticket platform center 110 as the event master 402. In step S1401, the registered event master 402 is exported to the electronic ticket seller 130 as stock information. In step S1402, the electronic ticket seller 130 receives the stock information. Then, in step S1403, the electronic ticket seller 130 converts the imported stock information into a seller event master 405, which can be used as basic data for electronic ticket sales.

The event venue master 403 can be easily created according to a GUI operation from the event venue layout, such as by a combination of a mouse and a keyboard using an editor.

Figure 30:
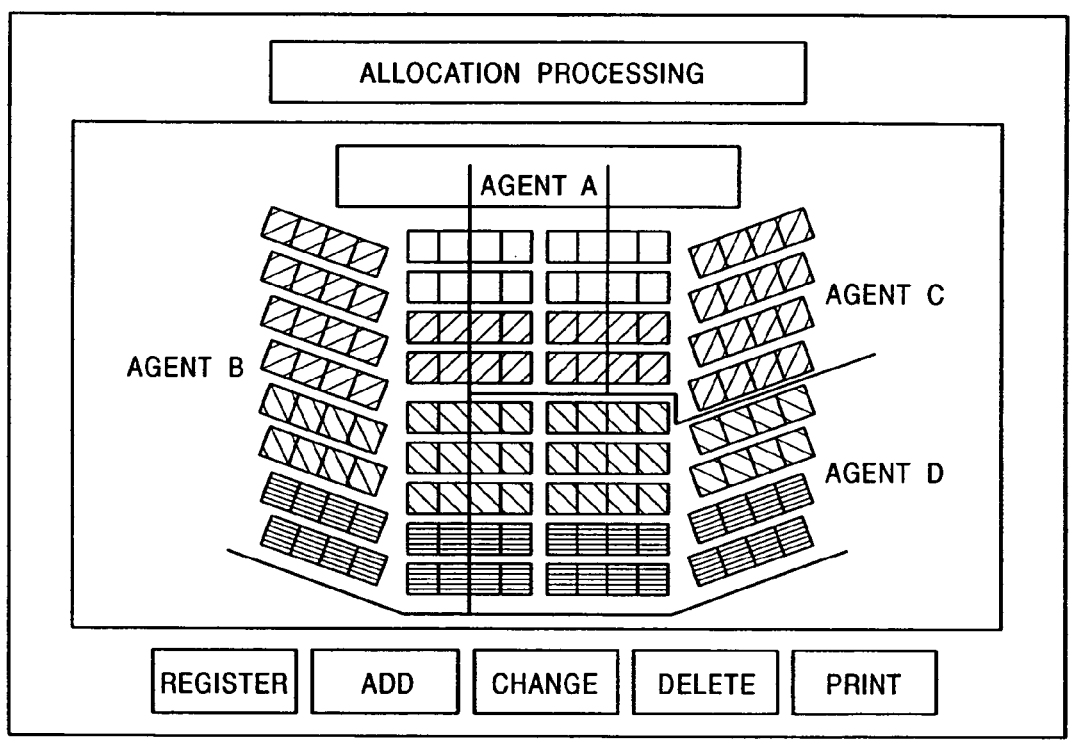
FIG. 30 is a schematic diagram illustrating a ticket allocation processing screen that is usable in the electronic ticket management system shown in FIG. 1.
Figure 31:
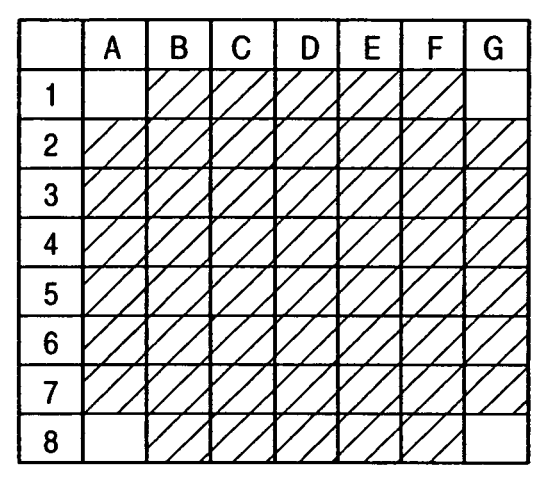

FIG. 30 illustrates an example of a ticket allocation processing screen. The seat information can be stored, as shown in FIG. 31, in the event venue layout. That is, the seat information is represented by a matrix, and the corresponding seat position is identified by the column number and the row number. For example, the hatched portions in FIG. 31 can be represented by a range of B1:F1, A2:G7, and B8:F8.

On the screen shown in FIG. 30, the seat information can be registered as follows.

The operator registers the seat types, such as S seats and A seats, and the seat range by using a mouse or a keyboard according to a GUI operation. Then, by designating the seat range with a mouse or a keyboard, the corresponding screen appears so that the seat type and the seat attribute is easily specified according to the graphical image.

Accordingly, the seat information is configured so that the seat types and the seat ranges can be registered and designated according to a GUI operation. As a result, the event master 402 can be easily generated according to a GUI operation, such as by a combination of a mouse and a keyboard using an editor. In the example shown in FIG. 30, the seat types are graphically distinguished by changing the types of hatched portions. In practice, however, the seat types are indicated in different colors so that they can be visually distinguished more easily.

The allocation of tickets to the individual electronic ticket sellers 130 based on the event master 402 can also be performed easily according to a GUI operation, i.e., a combination of a mouse and a keyboard using an editor. In the example shown in FIG. 30, the allocation of tickets to the individual electronic ticket sellers 130 is indicated by partition lines. In practice, however, the allocated seats are indicated in different colors for the individual electronic ticket sellers 130 so that they can be visually distinguished more easily.

In the allocation processing, seats can be individually allocated. However, most user that purchase a plurality of tickets wish to obtain consecutive number of seats. Accordingly, it is preferable that a plurality of consecutive number of tickets can be automatically allocated.

The allocation processing has been discussed in the context of the registration of seat information. However, in the electronic ticket management system 100, the seats can be easily changed, added, searched, and deleted according to a GUI operation, i.e., a combination of a mouse and a keyboard using an editor.

In the ticket allocation processing of this embodiment, the "registration" is to create a ticket allocation master in the electronic ticket platform center 110 based on the various masters. The "search" is to perform a search operation for the registered information. In performing the search processing, the event organizer 120 is able to search all the items of allocation information, while the electronic ticket seller 130 is able to search only the information concerning the tickets allocated to the electronic ticket seller 130. The "change" is to change the registered information, and only the event organizer 120 is able to change the allocation information. The "deletion" is to delete the registered information, and the only the event organizer 120 is able to delete the allocation information. The "print" is to print the registered information, where the required information can be printed out.

Additionally, if the event venue master 403, the event master 402, and the allocation master are registered so that addresses can be easily designated as described above, they can be converted into a data format of the corresponding electronic ticket seller 130 and be exported without causing errors. In the example shown in FIG. 29, the event master 402 is exported from the electronic ticket platform center 110 to the electronic ticket seller 130 as the stock information, and the electronic ticket seller 130 then creates the corresponding event master 402 from the stock information.

The layout of the event venue can be created by using a graphic application, such as computer aided design (CAD) software. Alternatively, a drawing supplied from the event venue 160 may be read by an image reader, such as a scanner, and the seat information may be automatically registered so that addresses can be designated.

In the above-described embodiment, the seat information is registered according to the cell system. Alternatively, the seat information may be registered according to any system as long as the addresses of the seat information can be designated with, for example, a mouse and a keyboard so that the seat information can be registered, changed, added, searched, and deleted according to a GUI operation. For example, the seat information may be registered according to a relational database management (RDBM) system.

As described above, according to the ticket allocation system of this embodiment, since the allocation processing is digitized, it is not necessary for the individual electronic ticket sellers 130 to input data, resulting in a reduced cost. Since the data is centrally inputted by the event organizer 120, erroneous operations can be reduced, and it is not necessary to check the allocation information of the electronic ticket sellers 130. Additionally, the data can be easily converted according to the data format of the electronic ticket seller 130. The seat information can be registered, changed, added, searched, and deleted according to a GUI operation, and the operability of the ticket allocation is significantly improved.

Figure 32:
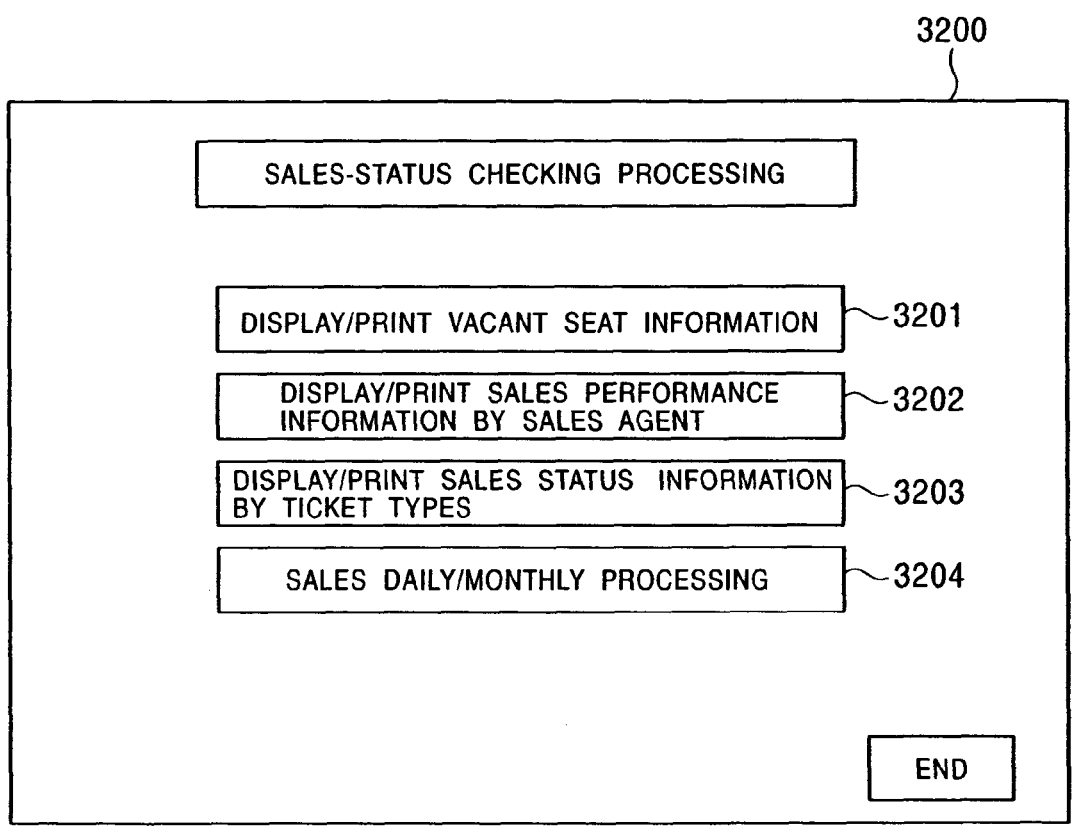
FIG. 32 is a schematic diagram illustrating a sales-status checking processing screen that is usable in the electronic ticket management system shown in FIG. 1.
Figure 33:
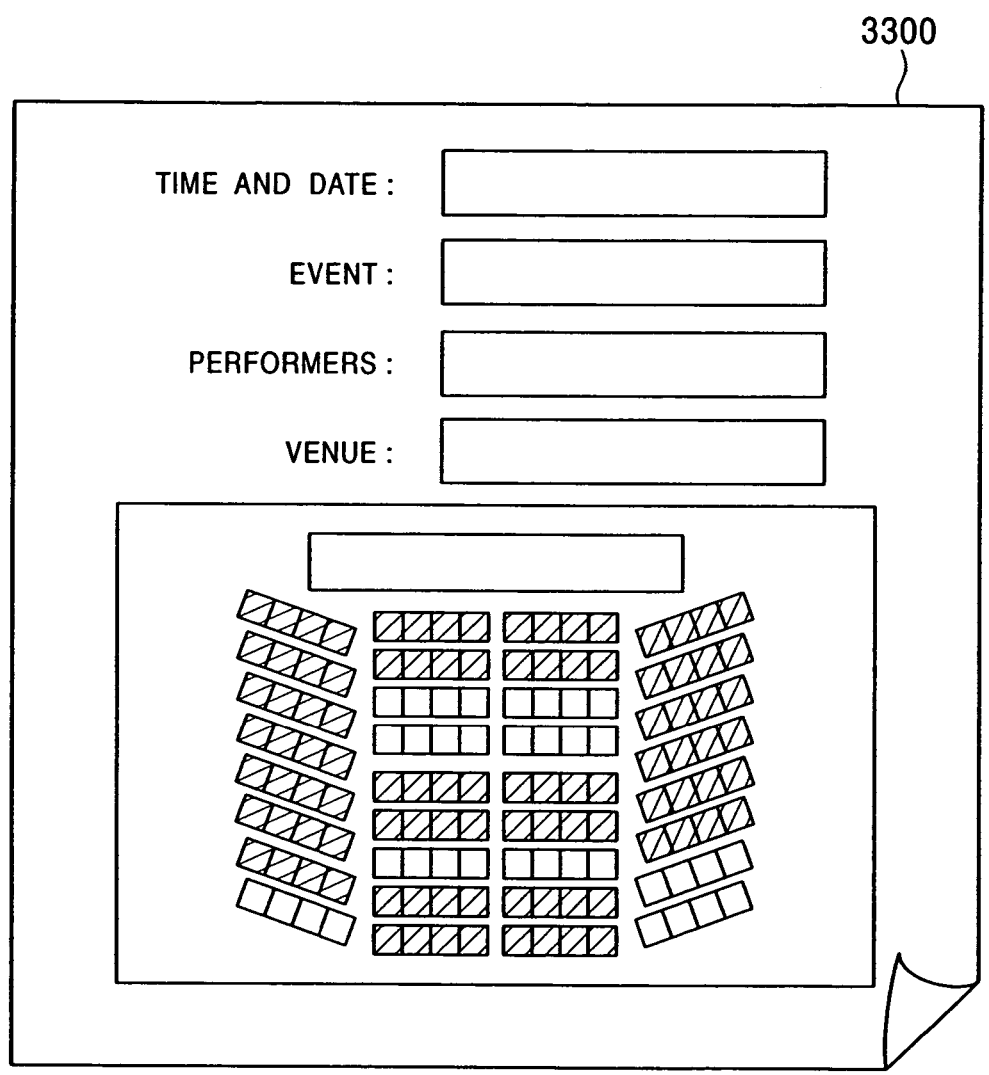
FIG. 33 is a schematic diagram illustrating an output-sheet-image processing screen that is usable in the electronic ticket management system shown in FIG. 1.

FIGS. 32 and 33 illustrate examples of the sales-status checking processing performed by the electronic ticket management system 100 of this embodiment. FIG. 32 illustrates an example of a sales-status checking processing screen 3200, and FIG. 33 illustrates an example of an output sheet image 3300.

In the electronic ticket management system 100 of this embodiment, since the electronic ticket information and the event information are digitized, the sales statuses in the individual electronic ticket sellers 130 can be easily checked.

On the sales-status checking processing screen 3200 shown in FIG. 32, if a vacant-seat information frame 3201 is selected, vacant seat information in the event venue shown in FIG. 33 can be formed. The vacant seat information can be displayed or printed out. In the output sheet image 3300 shown in FIG. 33, sold seats are indicated by hatched portions, and unsold seats are indicated in blank. In practice, however, sold seats and unsold seats are preferably indicated in different colors so that they can be distinguished more easily when viewing the screen.

On the sales-status checking processing screen 3200, if a sales-performance information frame 3202 is selected, a list of sales performances of the individual electronic ticket sellers 130 can be displayed or printed out. Similarly, if a sales-status information frame 3203 is selected, a list of sales performances of the individual ticket types can be displayed or printed out. If a sales-daily/monthly report processing frame 3204 is selected, a list of sales performances of the individual event organizers 120 of the designated day/month can be displayed or printed out.

Figure 34:
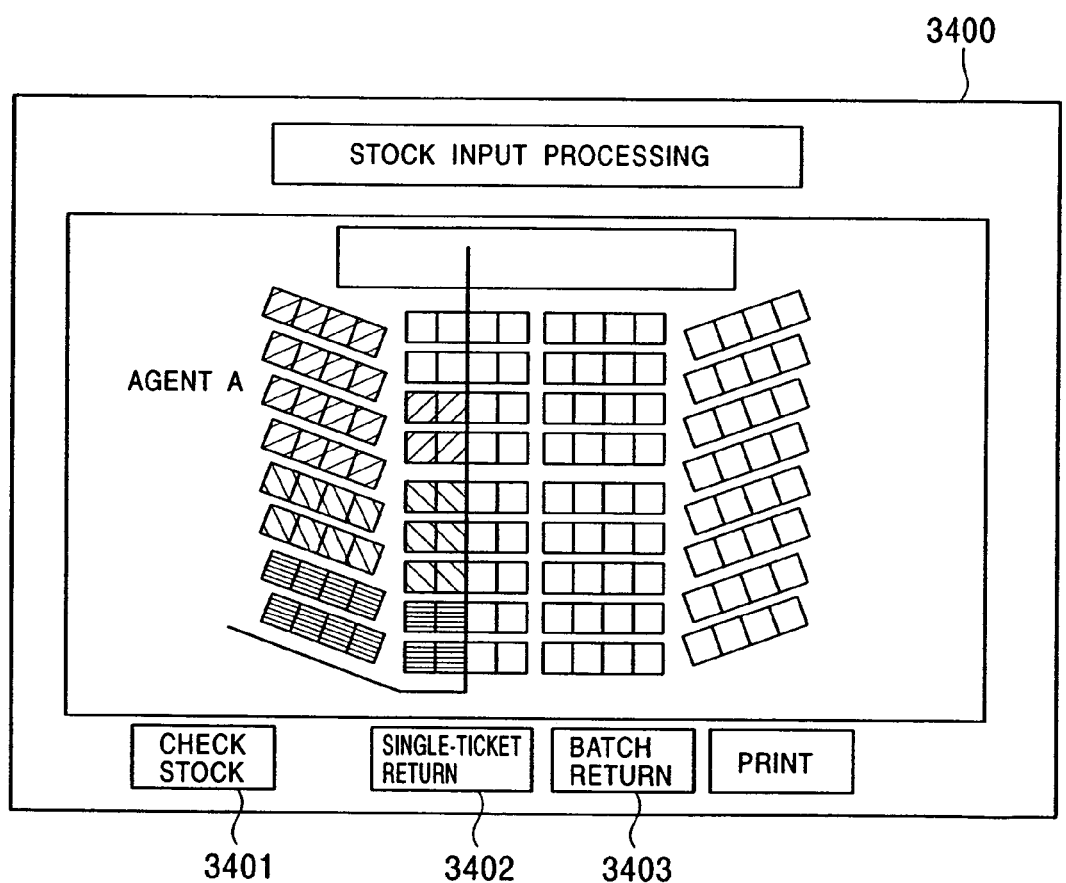
FIG. 34 is a schematic diagram illustrating a stock input processing screen that is usable in the electronic ticket management system shown in FIG. 1.
Figure 35:
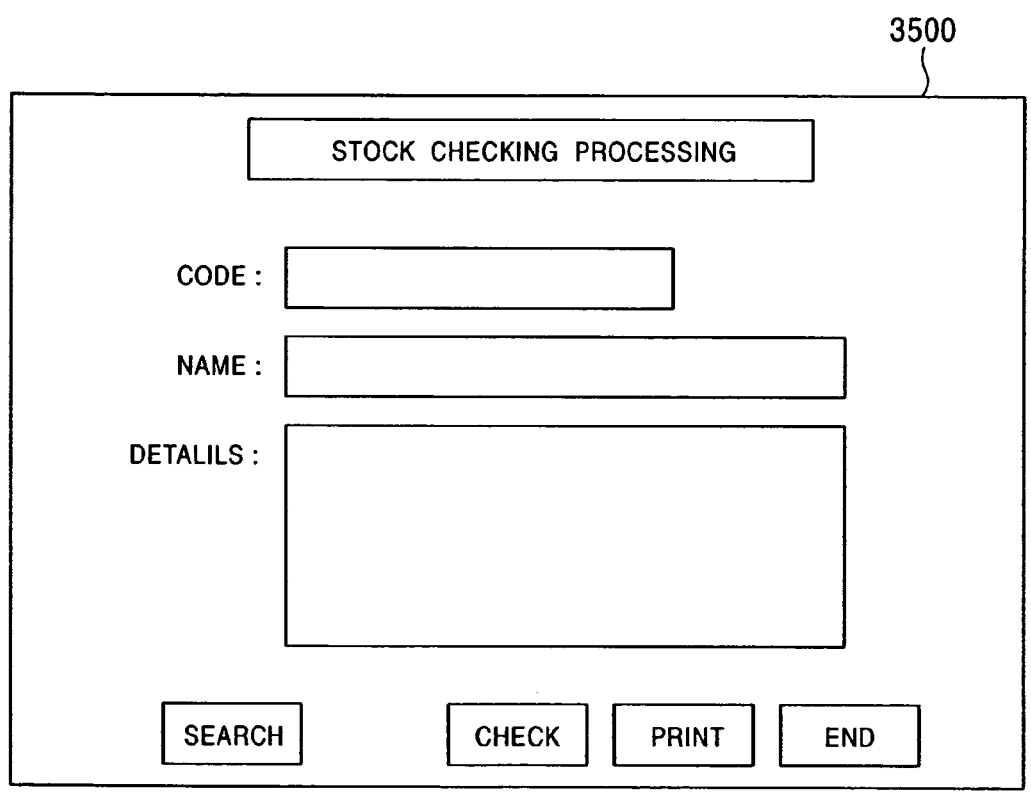
FIG. 35 is a schematic diagram illustrating a stock checking processing screen that is usable in the electronic ticket management system shown in FIG. 1.

A description is now given, with reference to FIGS. 14, 34 and 35, of a stock information registration processing flow system 1400 in the electronic ticket management system 100 of this embodiment.

In FIG. 14, after completing the allocation processing, in step S1214, the event master 402 is formed in the electronic ticket platform center 110. In step S1401, the event master 402 is exported from the electronic ticket platform center 110 to the electronic ticket seller 130 as stock information. Then, in step S1402, the electronic ticket seller 130 imports the stock information. In step S1403, the electronic ticket seller 130 creates a seller event master from the imported stock information. The seller event master is used as basic data for electronic ticket sales.

Then, in step S1404, the electronic ticket seller 130 determines the sales method for the event based on the seller event master. That is, electronic tickets may be sold to memberships, such as fan clubs, as discussed with reference to FIG. 13, or they may be sold to unspecified customers 140. Such sales methods are not directly related to the present invention, and thus, an explanation thereof is omitted.

Subsequently, in step S1405, a registration information report is created. In step S1406, the event organizer 120 checks the registration information report if necessary.

FIG. 34 illustrates an example of a stock information input screen 3400. In FIG. 34, the stock status of agent A, which is one of the electronic ticket sellers 130, is indicated. On this screen 3400, if a stock checking frame 3401 is selected, the screen shown in FIG. 35 appears, and the allocation information received from the electronic ticket platform center 110 or the event organizer 120 can be checked. Also on this screen 3400, export processing or import processing for the stock data can be performed. The stock information exported from the allocation information of the event organizer 120 can also be converted into a data file suitable for the system of the electronic ticket seller 130.

It is also possible to perform ticket return processing on the stock information input screen 3400. Details of the ticket return processing are given below with reference to FIG. 16.

A ticket-issuing processing flow 1500 conducted in the electronic ticket management system 100 of this embodiment is described below with reference to FIG. 15.

The ticket-issuing processing flow 1500 has two routes. One route is to issue electronic tickets using the network 170, such as the Internet. The other route is to issue electronic tickets using the store terminal 150, such as a multimedia kiosk terminal, installed in a convenience store.

The ticket-issuing processing using the network 170 is first discussed below. In step S1501, the customer 140, who wishes to purchase electronic tickets, accesses the sales portal site of the electronic ticket seller 130 via the network 170. Then, in step S1502, the customer 140 starts ticket purchase processing to check the sales status of electronic tickets of the desired event, and sends a ticket purchase request to the sales portal site.

Figure 36:
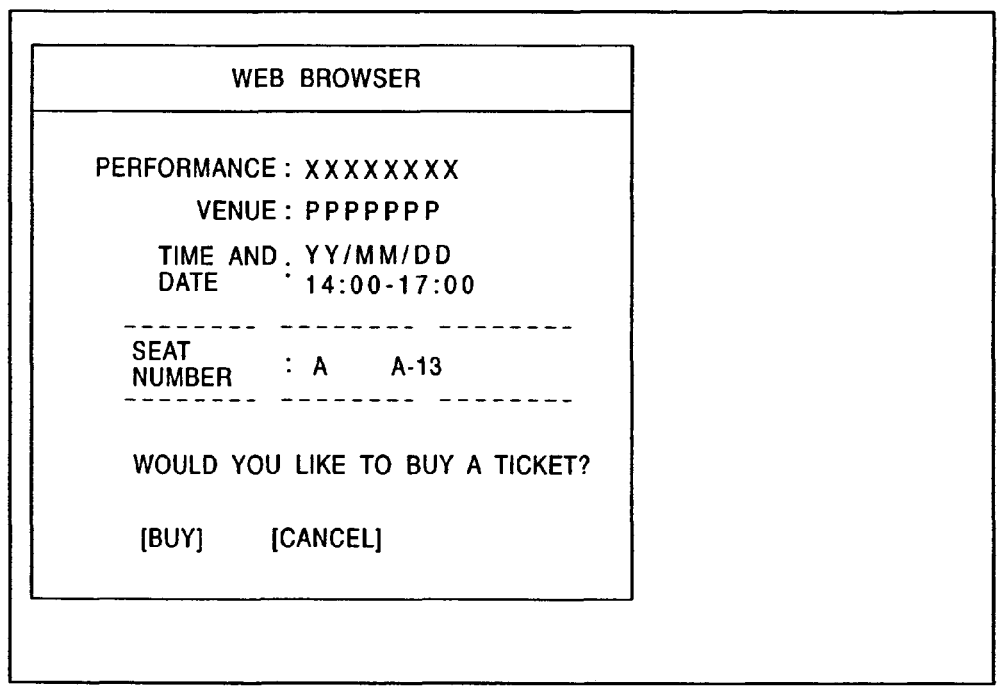
FIG. 36 is a schematic diagram illustrating a sales portal site screen that is usable in the electronic ticket management system shown in FIG. 1.

The sales portal site checks the sales status of the electronic tickets, and also checks the credit of the customer 140. If the customer 140 has sufficient funds for paying the ticket fee, the portal site receives the purchase request. FIG. 36 illustrates an example of the browser screen displayed on a client terminal. After checking event information, such as the name of the performance, the venue, the time and date, and the seat, and the electronic ticket information on the screen, the customer 140 determines whether to purchase the ticket.

Figure 37:
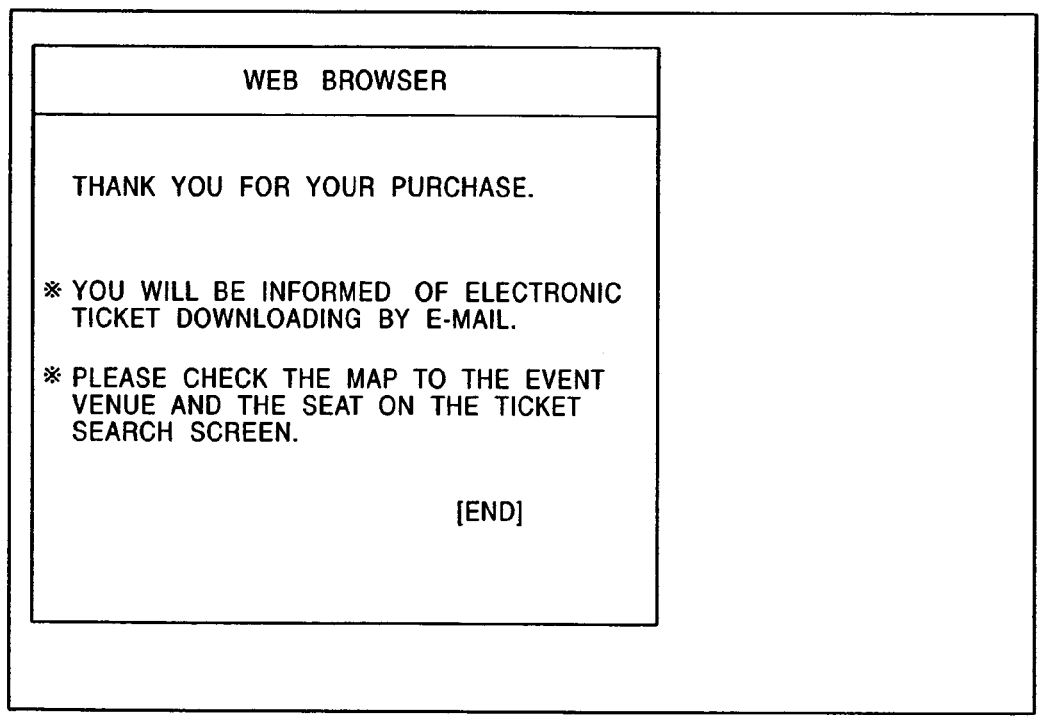
FIG. 37 is a schematic diagram illustrating a purchase confirmation screen that is usable in the electronic ticket management system shown in FIG. 1.

If the customer 140 proceeds with the purchase, a purchase confirmation screen shown in FIG. 37 appears. Also, the event information of the sold electronic ticket and the ID number of the information storage chip are sent to the electronic ticket platform center 110, and the data in the corresponding masters managed in the electronic ticket platform center 110 is updated.

One of the features of the electronic ticket purchase processing according to this embodiment is to provide a time lag between the purchase checking process and the ticket issuing process. In this embodiment, electronic tickets are issued by downloading the electronic ticket information, and, as shown in FIG. 37, there is a time lag between the purchase checking process and the downloading process.

Figure 15:
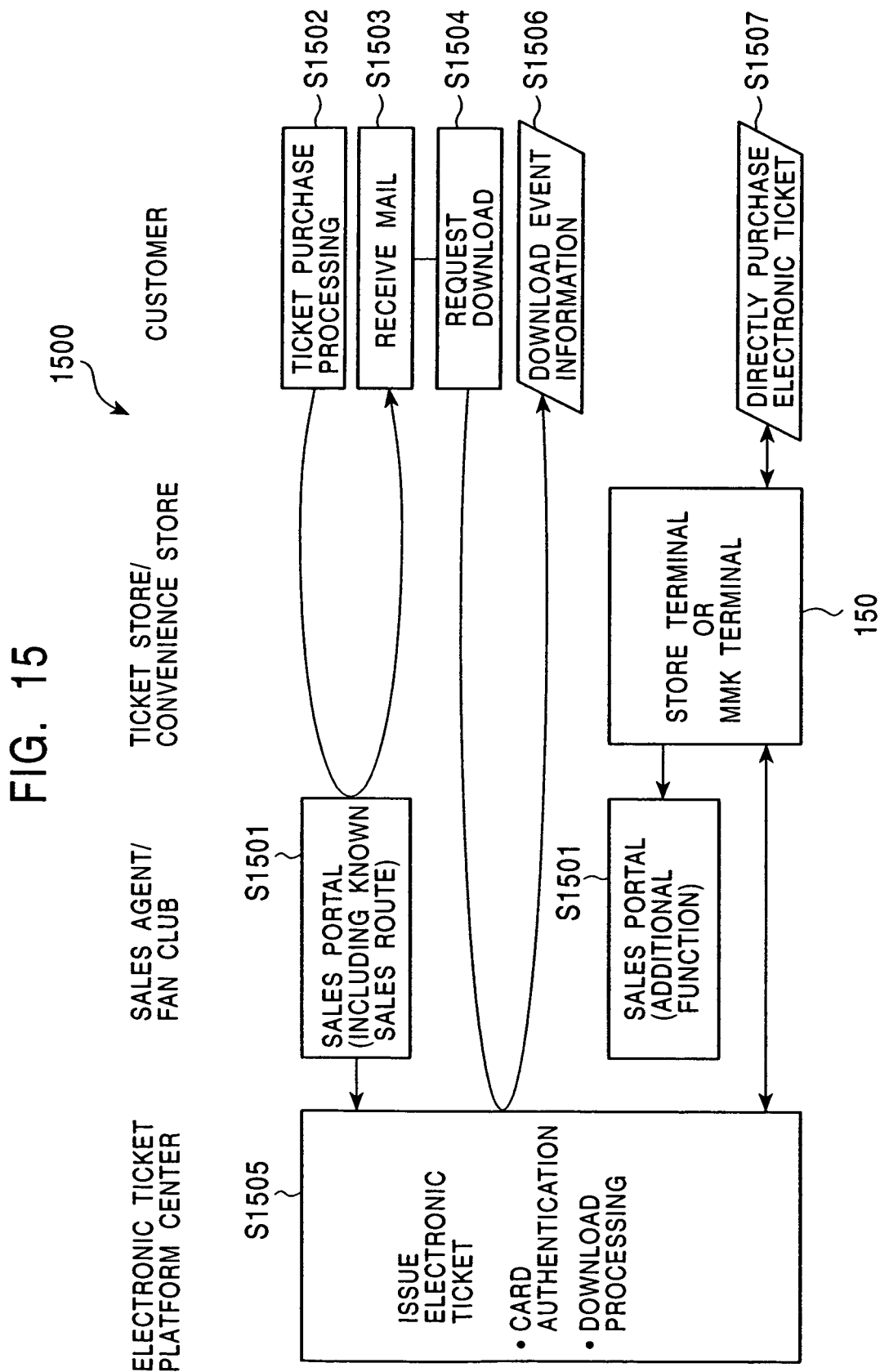
FIG. 15 is a block diagram illustrating a ticket-issuing processing flow system that is usable in the electronic ticket management system shown in FIG. 1.

That is, in step S1503 of FIG. 15, the customer 140 is informed of the address of the download site and the downloading time and date by e-mail with a time lag after performing the ticket purchase process.

Figure 38:
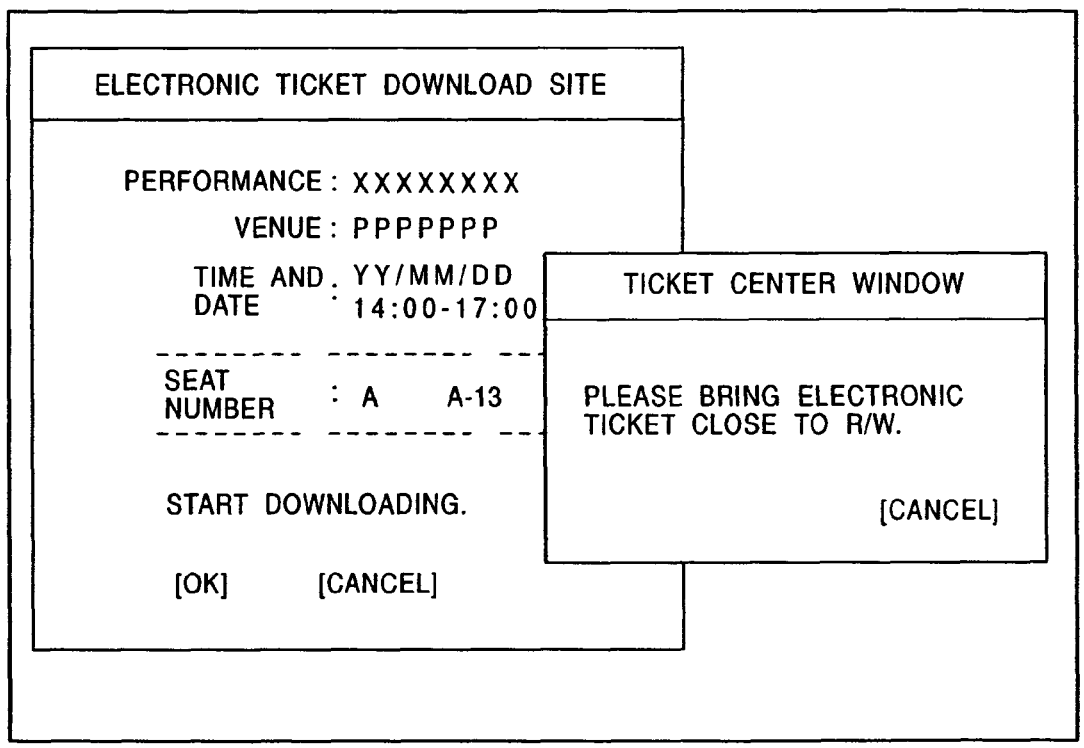
FIG. 38 is a schematic diagram illustrating an event information download processing screen that is usable in the electronic ticket management system shown in FIG. 1.

Thereafter, in step S1504, the customer 140 accesses the download site shown in FIG. 38 at the designated time and date. Then, in step S1505, the electronic ticket platform center 110 issues electronic ticket information after performing card authentication and performing the downloading process. In step S1506, the customer 140 downloads the electronic ticket information, and writes the electronic ticket information into the information storage chip by using an information storage chip writer connected to the client terminal. Finally, in step S1507, the customer 140 obtains the electronic ticket.

When writing the electronic ticket information, it is determined from the ID number of the information storage chip whether the information storage chip loaded in the information storage chip writer belongs to the customer 140. If the information storage chip is authenticated, the event venue access information and event information are written into the information storage chip. The information storage chip then serves as an electronic ticket for the corresponding event.

The information storage chip writer verifies whether the event information has been correctly written into the information storage chip. If the event information has been successfully written, a processing completion message is returned to the sales portal site.

If the event information has not been successfully written for some reason, a message to ask whether the above-described writing processing is retried or canceled, or a related link is provided. Thus, the customer 140 performs predetermined processing according to the guidance.

As discussed above, by providing a time lag between the purchase checking process and the ticket issuing process, it is possible to avoid traffic congestion caused by heavy access to a sales portal site from ticket purchasers. Particularly when selling tickets for a performance of a popular artist, the corresponding portal site may be heavily accessed from many ticket purchasers. Thus, by providing the above-described time lag in the system of this embodiment, this problem does not exist. The credit of the ticket purchaser can be checked by virtue of this time lag, thereby reliably collecting the electronic ticket fee.

In this embodiment, a time lag is provided between the purchase processing and the downloading processing. However, the present invention is not limited to this arrangement, and the electronic ticket information may be downloaded in real time.

According to the other route of the ticket issuing processing, the customer 140 directly purchases electronic tickets by using a multimedia kiosk terminal installed in a convenience store or the store terminal 150 installed in a ticket store. In this case, the customer 140 is able to purchase electronic tickets in real time while checking the sales status of the electronic tickets on the display screen of the store terminal 150.

The store terminal 150 is provided with the ability to write electronic ticket information into information storage chips. The customer 140 is able to directly write the electronic ticket information into an information storage chip in exchange for the payment of a ticket fee. After performing the ticket issuing process, the store terminal 150 informs the sales portal of the electronic ticket seller 130 or the electronic ticket platform center 110 of the electronic ticket information and the ID number of the corresponding information storage chip.

Accordingly, because of the provision of the store terminal 150 equipped with an information storage chip reader and an information storage chip writer, electronic tickets can be utilized even if the client terminal of the customer 140 does not have an information storage chip reader and an information storage chip writer.

Figure 16:
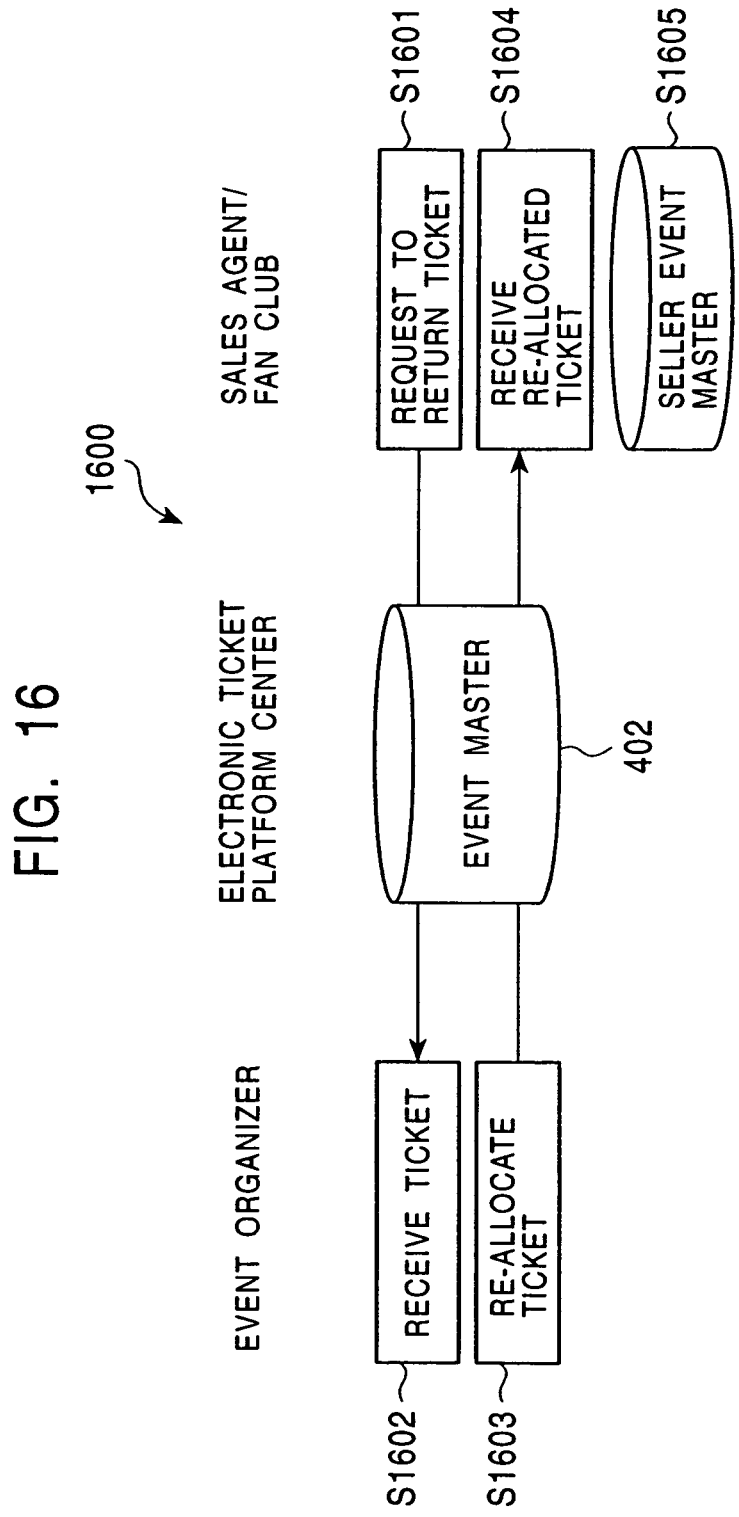
FIG. 16 is a block diagram illustrating a ticket return processing system that is usable in the electronic ticket management system shown in FIG. 1.

A ticket return process 1600 performed in the electronic ticket management system 100 is described below with reference to FIG. 16. The electronic tickets allocated from the event organizer 120 to the electronic ticket sellers 130 may not always be sold out. In this case, the ticket return process 1600 is performed.

In step S1601, the electronic ticket seller 130 makes a request to return tickets. If it is determined in step S1602 that the event organizer 120 accepts the request, the event master 402 managed by the electronic ticket platform center 110 is updated. Then, in step S1603, the event organizer 120 re-allocates the returned tickets, and the event master 402 is updated accordingly. In step S1604, another electronic ticket seller 130 receives the re-allocated tickets, and also updates the seller event master in step S1605.

A specific example of the ticket return process 1600 is discussed below with reference to FIG. 34. On the stock information input screen 3400, if a single-ticket return frame 3402 is selected, a ticket allocated from the event organizer 120 to the electronic ticket seller 130 is released, and can be re-issued by the event organizer 120. As an interface for the single-ticket return process, a GUI related to the event venue image used for allocating the tickets by the event organizer 120 can be used, and the tickets for the individual seats can be returned.

On the stock information input screen 3400, if a batch return frame 3403 is selected, a plurality of tickets can be returned at the same time by checking the unsold tickets on the GUI screen in a manner similar to the single-ticket return process.

Figure 17:
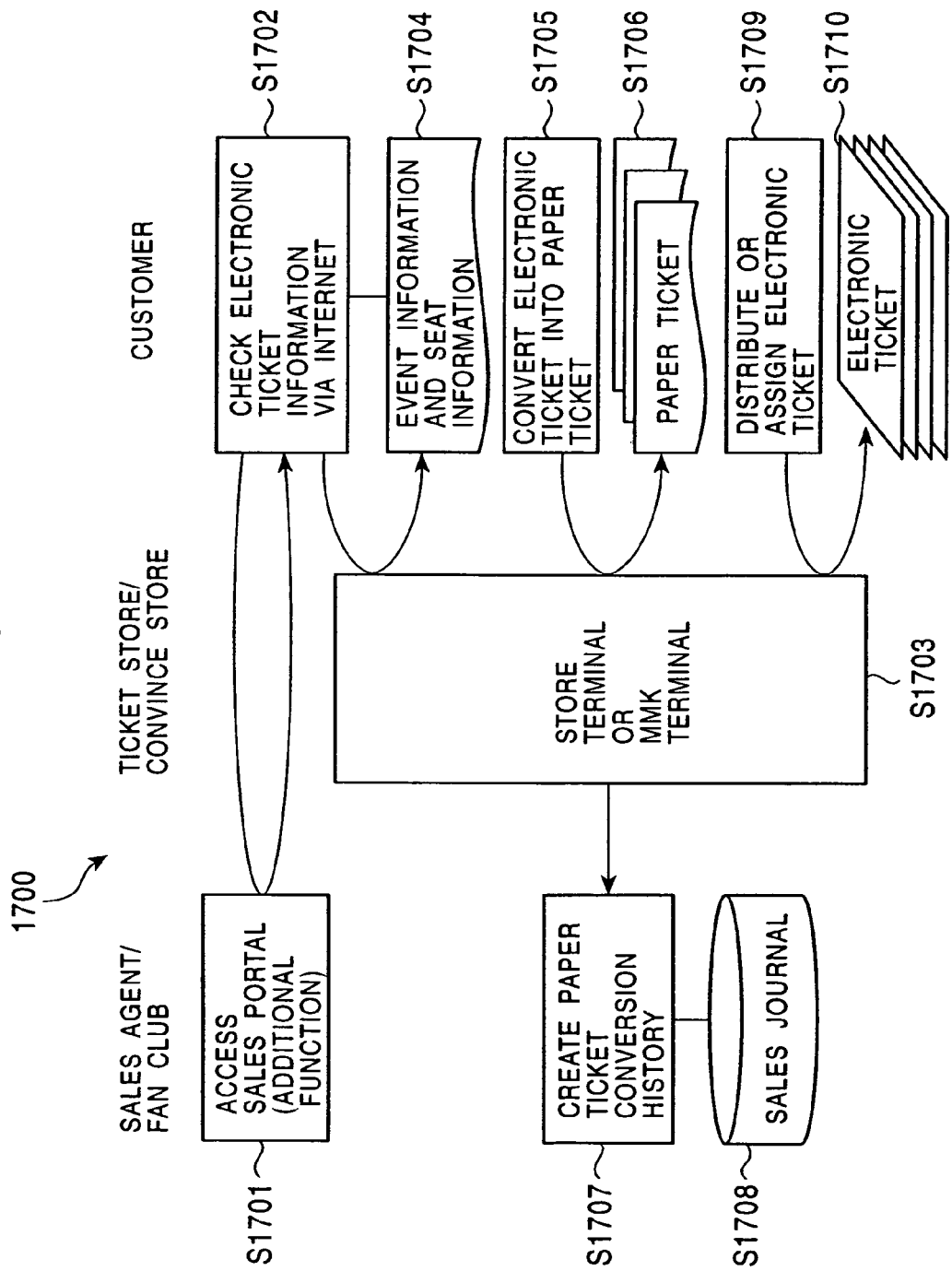
FIG. 17 is a block diagram illustrating a ticket-assignment processing flow system that is usable in the electronic ticket management system shown in FIG. 1.

FIG. 17 illustrates a ticket-assignment processing flow 1700 and also shows various services available to customers 140 who purchased electronic tickets.

In step S1701, the customer 1701 accesses the sales portal site via, for example, the Internet. Then, in step S1702, the customer 140 is able to check the electronic ticket information, such as event information and seat information. Alternatively, in step S1703, the customer 140 is able to check the electronic ticket information by using the store terminal 150 or a multimedia kiosk terminal. As a result, in step S1704, the electronic ticket information and the seat information can be obtained.

In some cases, the customer 140 may desire analog information indicated on a paper ticket rather than digital information stored in an information storage chip. In this case, in step S1705, the electronic ticket information is converted into a paper ticket. Then, in step S1706, the paper ticket is issued. If the customer 140 has converted an electronic ticket into a paper ticket, in step S1707, the electronic ticket information stored in the information storage chip is nullified, and also, a paper ticket conversion history is created in the electronic ticket seller 130. Then, in step S1708, the history log is stored in the sales journal 406.

As discussed above, the electronic ticket purchasers and the attendees do not correspond on a one-to-one basis. For example, an electronic ticket purchaser may purchase a plurality of electronic tickets and wish to assign them to another user.

However, according to a known electronic ticketing system, when information of a plurality of electronic tickets is stored in one information storage chip, information concerning the rights to possess an electronic ticket cannot be safely assigned to others. If the right to attend an event is to be assigned to others, the assignor and the assignee have to meet at the entrance of the event venue and enter the event venue together.

If information concerning only one electronic ticket is stored in one information storage chip, it is necessary for one purchaser to purchase a plurality of electronic tickets and to transfer the information storage media storing the ticket information to others in advance. With this method, the information storage media may be lost while being transferred, and also, tickets cannot be distributed speedily and reliably.

On the other hand, according to the electronic ticket assignment method of this embodiment, in step S1709, the electronic tickets can be safely and reliably distributed or assigned to other information storage chips. Details of the electronic ticket assignment method are given below.

As in the electronic ticket issuing processing, electronic tickets may be assigned via the network 170, such as the Internet, or via the store terminal 150, such as a multimedia kiosk terminal.

An electronic ticket assignment processing for transferring electronic ticket information stored in an information storage chip to another information storage chip via the network 170 is described below with reference to FIGS. 40 through 42.

According to this embodiment, a plurality of items of electronic ticket information stored in an information storage chip are assigned to another information storage chip via the network 170, such as the Internet, by using an information storage chip reader/writer connected to a client terminal.

For ensuring the security, it is preferable that the electronic ticket information stored in the information storage chip is encrypted in advance when the ticket is purchased by using the ID number unique to the information storage chip according to an encryption algorithm, and is stored in the electronic ticket platform center 110 as the electronic ticket information master.

With this arrangement, the encrypted electronic ticket information can be downloaded only to the specific information storage chip identifiable by the unique ID number.

When assigning electronic ticket information, an assignor customer logs in to the electronic ticket platform center 110, and informs the electronic ticket platform center 110 of the ID number unique to the information storage chip of an assignee customer. The electronic ticket platform center 110 verifies the downloaded electronic ticket information against the electronic ticket information stored in the information storage chip based on the stored information, and deletes the electronic ticket information from the information storage chip of the assignor customer. The electronic ticket platform center 110 also re-encrypts the electronic ticket information stored in the electronic ticket platform center 110 based on the ID number of the information storage chip of the assignee customer as free electronic ticket information.

According to the above-described processing performed by the electronic ticket platform center 110, the electronic ticket information can be downloaded only to the information storage chip of the designated assignee.

As described above, according to this embodiment, it is not necessary to specify the assignee (including deleting processing of the electronic ticket information from the information storage chip of the assignor) and to write the electronic ticket information into the information storage chip of the assignee at the same time. Thus, assignment processing for electronic ticket information can be easily performed according to the convenience of the purchaser.

The assigned electronic ticket information, the ID number of the information storage chip of the assignor, and the ID number of the information storage chip of the assignee are stored in the electronic ticket master in the electronic ticket platform center 110, and the history of the assignment process is managed until a bill for the event is settled.

Then, the electronic ticket assignment method is described below with reference to FIGS. 40 and 41.

Figure 40:
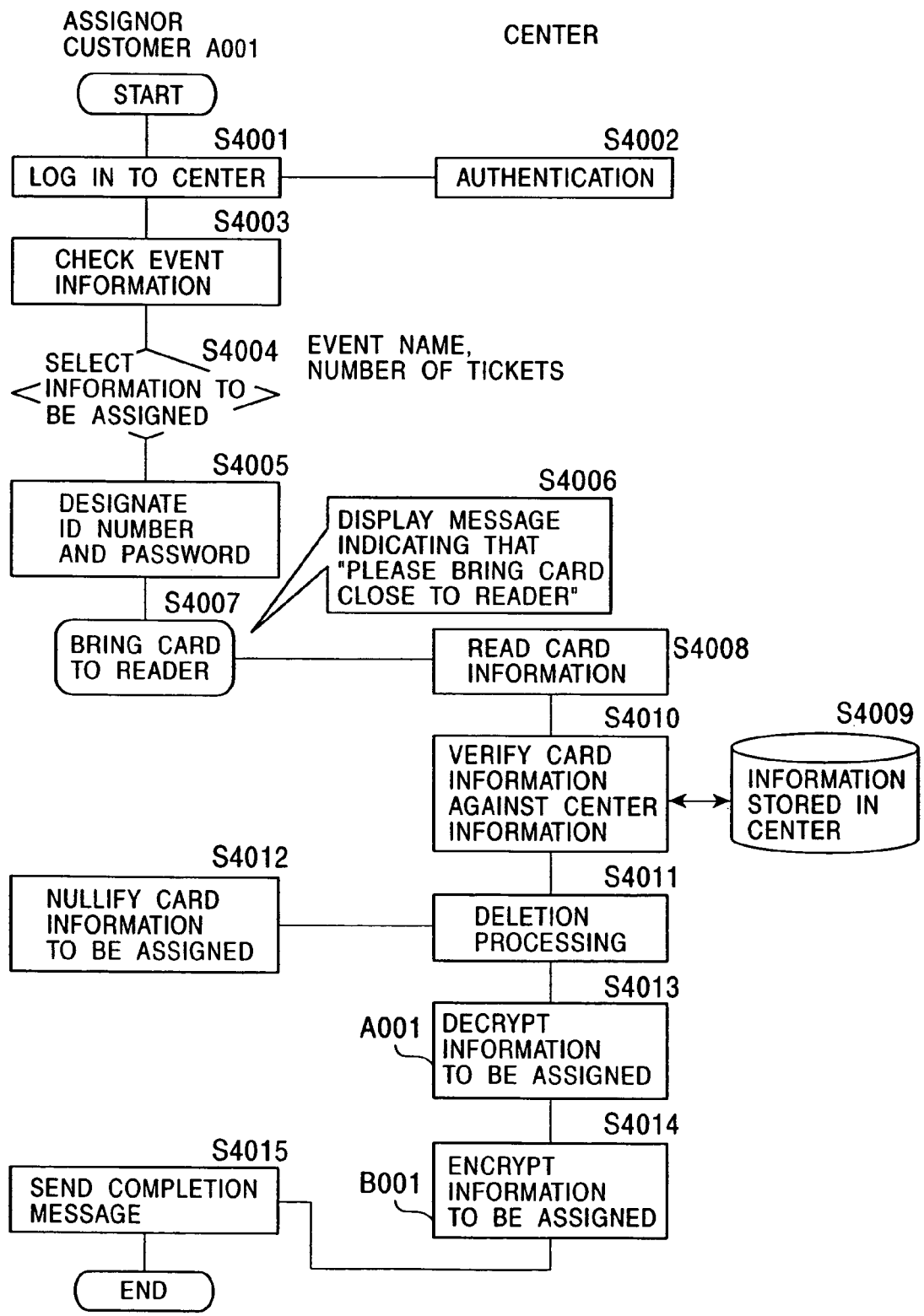
FIG. 40 is a block diagram illustrating a ticket assignment processing system that is usable in the electronic ticket management system shown in FIG. 1.

Reference is first made to FIG. 40 to discuss communication between an assignor customer 140 who owns an information storage chip having electronic ticket information therein and the electronic ticket platform center 110.

In order to assign a plurality of items of electronic ticket information stored in one information storage chip to another information storage chip, in step S4001, the assignor customer 140 first logs in to the electronic ticket platform center 110 with a predetermined ID number and password. In step S4002, the electronic ticket platform center 110 performs authentication of the logged-in ID number and the password.

After the ID number and the password are authenticated, in step S4003, the assignor customer 140 checks the electronic ticket information and the event information stored in the information storage chip by using an information storage reader connected to the assignor customer 140. Then, in step S4004, the assignor customer 140 selects information to be assigned by specifying the name of the event and the number of tickets. In step S4005, the assignor customer 140 also specifies the ID number of the information storage chip of the assignee customer 140 and the password for writing the designated electronic ticket information into the information storage chip of the assignee customer 140.

After performing the above-described operation, in step S4006, if the information storage chip is a non-contact IC card, a message indicating that, for example, "please bring your card close to the reader" is displayed. Then, in step S4007, the assignor customer 140 brings the IC card having the information storage chip therein close to the information storage chip reader. Then, in step S4008, the electronic ticket information is read by the information storage chip reader, and is sent to the electronic ticket platform center 110.

In step S4009, the electronic ticket platform center 110 then checks the masters, for example, the electronic ticket master 408 and the event master 402, and verifies the received electronic ticket information against the information stored in these masters in step S4010.

If the electronic ticket information is authenticated, in step S4011, the electronic ticket information is deleted from the information storage chip of the assignor customer 140. As a result, in step S4012, the electronic ticket information stored in the assignor customer 140 is nullified. Then, in step S4013, the masters stored in the electronic ticket platform center 110 are updated. More specifically, the information to be assigned, which is encrypted with the ID number of the information storage chip of the assignor customer 140, is decrypted. Then, in step S4014, the decrypted information is re-encrypted with the ID number of the information storage chip of the assignee customer 140, and is registered in the masters stored in the electronic ticket platform center 110. Thereafter, in step S4015, a completion message is sent to the assignor customer 140, and the electronic ticket assignment process is completed.

Figure 41:
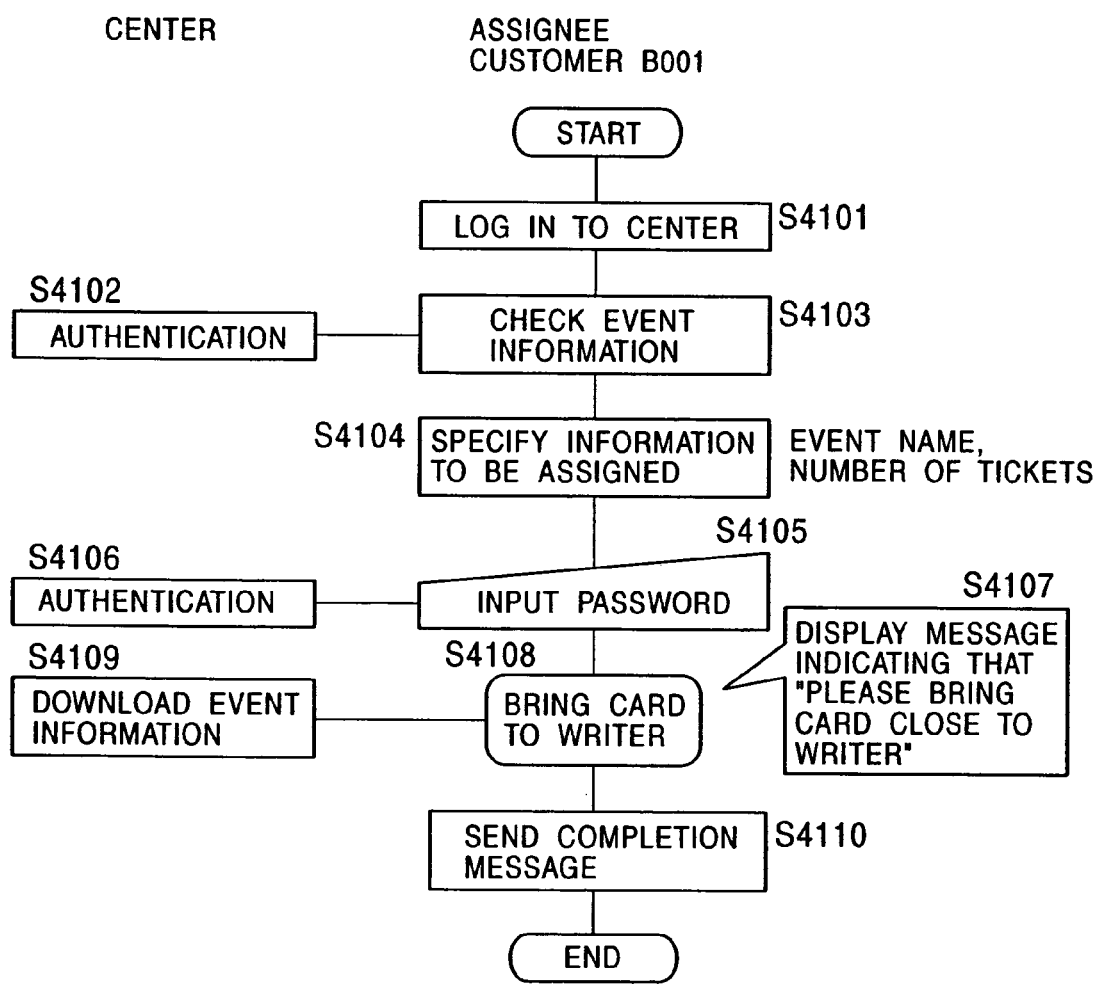
FIG. 41 is a block diagram illustrating a ticket assignment processing system that is usable in the electronic ticket management system shown in FIG. 1.

A description is now given, with reference to FIG. 41, of communication between the electronic ticket platform center 110 and the assignee customer 140 to receive electronic ticket information.

The password required for receiving electronic ticket information is sent from the assignor customer 140 to the assignee customer 140 by means of, for example, e-mail, in advance.

In step S4101, the assignee customer 140 logs in to the electronic ticket platform center 110 with a predetermined ID number and password via the client terminal provided with at least an information writing function. In step S4102, the electronic ticket platform center 110 performs authentication on the logged-in ID number and the password.

After the ID number and the password are authenticated, in step S4103, the assignee customer 140 checks the event information by using the client terminal. Then, in step S4104, the assignee customer 140 specifies the electronic ticket information to be received. Then, in step S4105, in response to a request to input the password from the electronic ticket platform center 110, the assignee customer 140 inputs the password designated by the assignor customer 140 when specifying the electronic ticket information to be assigned in step S4005 of FIG. 40.

In step S4106, the electronic ticket platform center 110 performs authentication on the input password. After the password is authenticated, in step S4107, if the information storage chip is a non-contact IC card, a message indicating that, for example, "please bring your card close to the writer" is displayed. In step S4108, the assignee customer 140 brings the IC card having the information storage chip therein close to the information storage chip writer. Then, in step S4109, the specified electronic ticket information is downloaded and written from the electronic ticket platform center 110 to the information storage chip within the IC card by the information storage chip writer. Thereafter, in step S4110, a completion message is sent to the assignee customer 140, and the assignment-receiving processing is completed.

Figure 42:
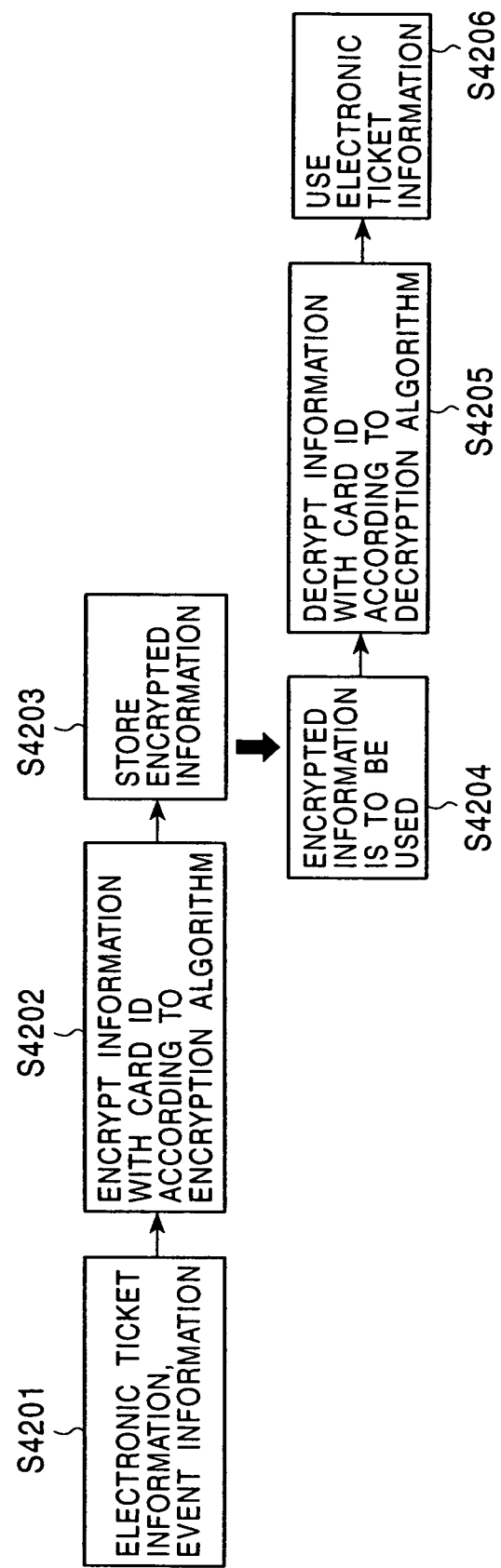
FIG. 42 is a block diagram illustrating an encryption method that is usable in the ticket assignment processing shown in FIGS. 40 and 41.

FIG. 42 illustrates an example of an encryption method usable in the electronic-ticket assignment process in this embodiment. In step S4201, the electronic ticket information and the event information are obtained. Then, in step S4202, the electronic ticket information and the event information are encrypted with the ID number unique to the corresponding information storage chip according to an encryption algorithm. Then, in step S4303, the encrypted information is stored in the electronic ticket platform center 110.

In step S4204, the encrypted electronic ticket information or the encrypted event information is used. Then, in step S4205, the encrypted information is decrypted with the ID number unique to the corresponding information storage chip according to a decryption algorithm. Thus, in step S4206, the decrypted information is used as the electronic ticket information or the event information.

The encryption method shown in FIG. 42 is only an example applicable to the electronic ticket assignment processing of this embodiment, and another encryption method may be used to ensure the security protection of the assignment process. Alternatively, instead of using an encryption algorithm, the security protection can be ensured by employing an authentication key technique.

Electronic ticket information stored in an information storage chip can be assigned to another information storage chip by using the store terminal 150. Such processing is described below with reference to FIGS. 43 and 44.

According to this embodiment, a plurality of items of electronic ticket information stored in an information storage chip can be assigned to another information storage chip by ensuring the authenticity of the assignor and the assignee by performing the assignment processing together using the store terminal 150, such as a multimedia kiosk terminal installed in a ticket store or a convenience store.

An overview of the electronic ticket assignment processing via the store terminal 150 is as follows. Information stored in an information storage chip of the assignor customer 140 is read by using the store terminal 150, and is displayed. Then, the assignor customer 140 selects information to be assigned, and the information is sent to the store terminal 150. Then, the information stored in the information storage chip of the assignor customer 140 is nullified, and the information to be assigned is written into the information storage chip of the assignee customer 140.

In the above-described assignment operation, the nullifying operation of information stored in the information storage chip of the assignor customer 140 and the writing operation of the information into the information storage chip of the assignee customer 140 are performed by using a special machine provided with a unique access key rather than a general-purpose machine, such as a computer, thereby ensuring high security.

The ID number unique to the information storage chip of the assignee customer 140 is stored in the store terminal 150 as a log, and is sent to the electronic ticket platform center 110 online or offline in real time or with predetermined timing. The ID number is then registered in the master stored in the electronic ticket platform center 110, and is managed therein. Thus, the electronic ticket assignment history (log) is centrally managed in the electronic ticket platform center 110. Accordingly, the authenticity of the assigned information can be easily verified by referring to the assignment log, which cannot be achieved in the related art.

The assigned electronic ticket information and the ID numbers of the assignor customer 140 and the assignee customer 140 are stored by the electronic ticket master 408 in the electronic ticket platform center 110, and the history of the assignment operation is managed until a bill for the event is settled.

According to this embodiment, the assignor customer 140 and the assignee customer 140 perform the assignment processing by using the same store terminal 150, thereby ensuring the authenticity of the assignment processing. However, due to an insufficient capacity of the information storage chip of the assignee customer 140, the assignment processing may not be completed.

In this case, since the assignment log is centrally managed in the electronic ticket platform center 110, the assignment processing may be restarted when the information storage chip is replaced by a new one.

If the assignment processing is discontinued, the electronic ticket information may be returned to the information storage chip of the assignor customer 140, in which case, the electronic ticket information is validated.

A specific example of the electronic ticket assignment processing via the store terminal 150 is discussed below with reference to FIGS. 43 and 44.

Figure 43:
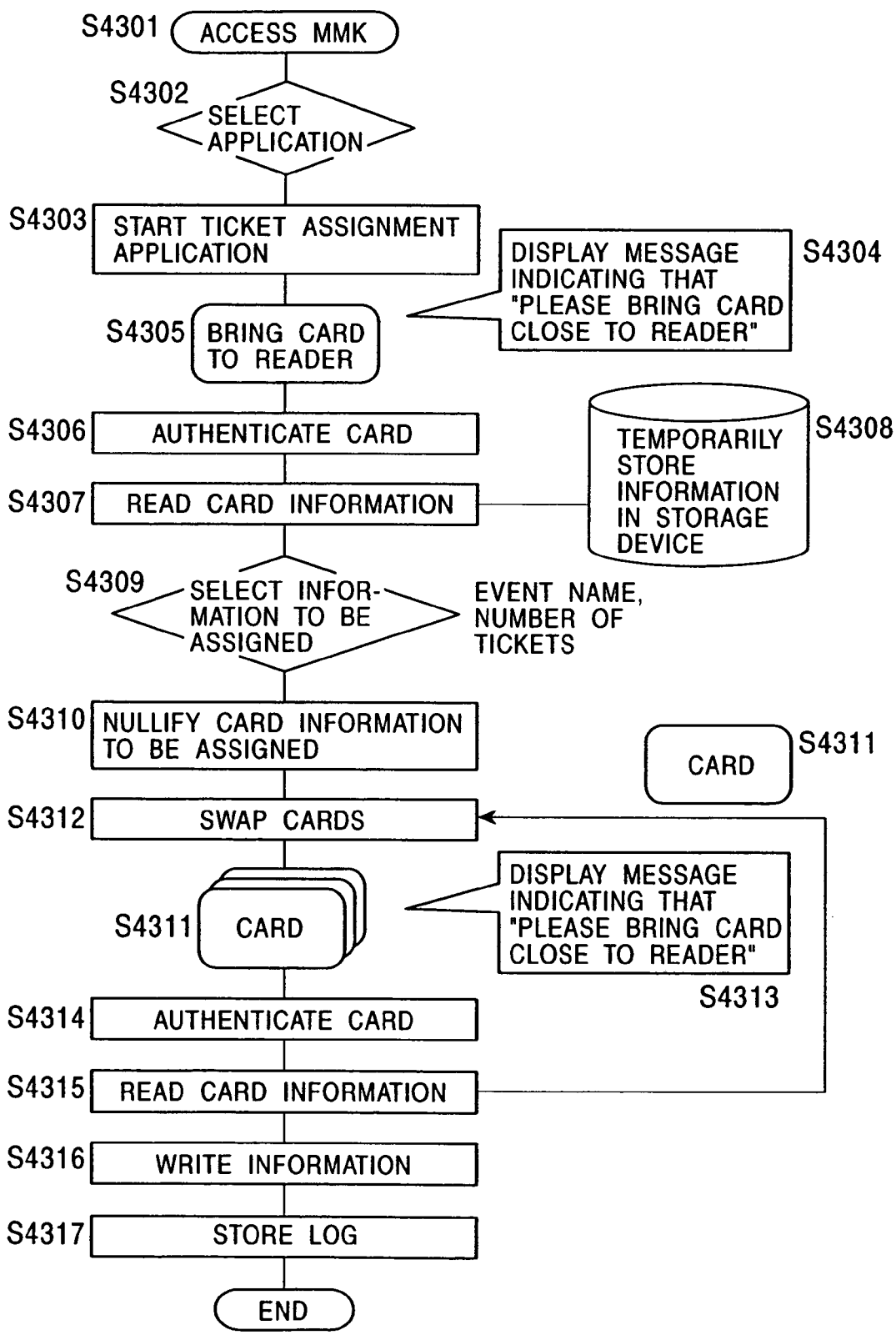
FIG. 43 is a block diagram illustrating a ticket assignment processing system that is usable in the electronic ticket management system shown in FIG. 1.

FIG. 43 is a flow chart illustrating communication and processing among the assignor customer 140, the assignee customer 140, and the store terminal 150. FIG. 44 is a flow chart illustrating communication and processing between the store terminal 150 and the electronic ticket platform center 110.

Referring to FIG. 43, in step S4301, the assignor customer 140 and the assignee customer 140 simultaneously access the store terminal 150, such as a multimedia kiosk terminal installed in a convenience store. It is assumed that the assignor customer 140 and the assignee customer 140 are different customers. However, they may be the same customer.

Then, in step S4302, the assignor customer 140 or the assignee customer 140 selects an application of the store terminal 150. In step S4303, the ticket assignment application is run. Then, in step S4304, a message indicating, for example, that "please bring your card close to the reader" is displayed. Then, in step S4305, the assignor customer 140 brings the IC card having the information storage chip with the electronic ticket information close to the information storage chip reader of the store terminal 150.

In step S4306, the store terminal 150 reads the information from the information storage chip, and performs authentication on the information storage chip. After the information storage chip is authenticated, in step S4307, the information stored in the information storage chip is read into the store terminal 150 and is displayed. In step S4308, the read information is temporarily stored in a storage unit of the store terminal 150.

In step S4309, the assignor customer 140 selects electronic ticket information to be assigned based on the information displayed on the screen. Then, in step S4310, after the assignor customer 140 has confirmed the selected information, the store terminal 150 nullifies the electronic ticket information stored in the information storage chip of the assignor customer 140.

Thereafter, in step S4311, an IC card having an information storage chip therein is prepared. In step S4312, the IC card of the assignee customer 140 is swapped for the IC card of the assignor customer 140. If the information storage chip is a non-contact IC card, in step S4313, a message indicating that, for example, "please bring your card close to the reader" is displayed. Then, the assignee customer 140 brings the IC card close to the information storage chip reader provided for the store terminal 150, and the information stored in the IC card is read.

In step S4314, the store terminal 150 performs authentication on the information storage chip of the assignee customer 140. After the information storage chip is authenticated, in step S4315, the information stored in the information storage chip is read, and a space area is checked.

If the space area required for writing the electronic ticket information to be assigned is not sufficient, the assignment processing is discontinued, and a message to exchange information storage chips is displayed. If a new information storage chip having a sufficient space area is prepared, the assignment processing is restarted. If not, the assignment processing is discontinued.

The assignment operation log is stored in the electronic ticket platform center 110. Accordingly, when a new information storage chip is prepared, the assignee customer 140 restarts the assignment processing by reading the operation log from the electronic ticket platform center 110 via the store terminal 150.

Alternatively, if the assignment processing is discontinued, the electronic ticket information temporarily stored in the store terminal 150 may be returned to the information storage chip of the assignor customer 140. In this case, when a new information storage chip is prepared, the assignee customer 140 can restart the assignment processing.

When the information stored in the information storage chip is authenticated, and there is a sufficient space area for writing the electronic ticket information, in step S4316, the electronic ticket information temporarily stored in the terminal device 150 is written into the information storage chip of the assignee customer 140. Then, in step S4317, the assignment operation log is stored in the store terminal 150.

Figure 44:
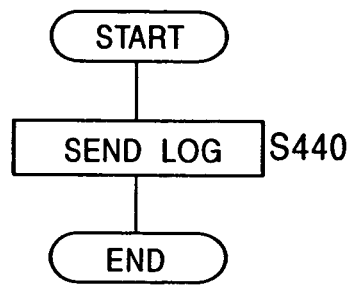
FIG. 44 is a block diagram illustrating a ticket assignment processing system that is usable in the electronic ticket management system shown in FIG. 1.

As shown in FIG. 44, in step S4401, the assignment operation log stored in the store terminal 150 is sent to the electronic ticket platform center 110, and is stored in the corresponding masters of the electronic ticket platform center 110. The assignment operation log may be sent in real time or with predetermined timing online or offline. The assignment operation log is stored in the electronic ticket platform center 110 at least until a bill for the event is settled.

In the above-described assignment processing, the electronic ticket information is assigned from the information storage chip of the assignor customer 140 to the information storage chip of the assignee customer 140 via the terminal device 150. However, in the present invention, electronic ticket information may be read from the information storage chip of the assignor customer 140 and be re-issued as a paper ticket by the store terminal 150.

As described above, according to the electronic ticket assignment processing, a plurality of items of electronic ticket information stored in one information storage chip can be easily assigned to another information storage chip.

The assignment operation log is managed in the electronic ticket platform center 110. Accordingly, in case of any problem, the cause of the problem can be tracked down by referring to the log.

It is also possible to prevent electronic tickets from being illegally distributed. Since electronic tickets do not have to be transferred to the assignee by, for example, mail, tickets can be distributed speedily and reliably. Thus, tickets can be distributed immediately before the event.

Although the electronic ticket assignment processing has been discussed through illustration of a preferred embodiment, the present invention is not limited to this embodiment. For example, electronic ticket information stored in an information storage chip can be transferred to another information storage chip in any phase via the Internet. More specifically, a plurality of items of electronic ticket information stored in an information storage chip may be partially transferred to another information storage chip. Alternatively, a one item or a plurality of items of electronic ticket information stored in an information storage chip may be wholly transferred to another information storage chip.

Additionally, instead of electronic ticket information, any type of information stored in an information storage chip may be distributed or assigned.

In the electronic ticket management system 100 of this embodiment, after performing the ticket allocation processing, electronic ticket information dynamically changes in various phases. That is, the electronic ticket seller 130 sells electronic ticket information by performing the ticket issuing processing so as to transfer the ownership of the electronic ticket information to the customer 140. The ownership of electronic ticket information is also transferred between the customers 140 by the ticket-assignment processing. Accordingly, a system for centrally managing electronic ticket information which changes in various phases in the electronic ticket platform center 110 is implemented by a sales-journal processing flow 1800.

Figure 18:
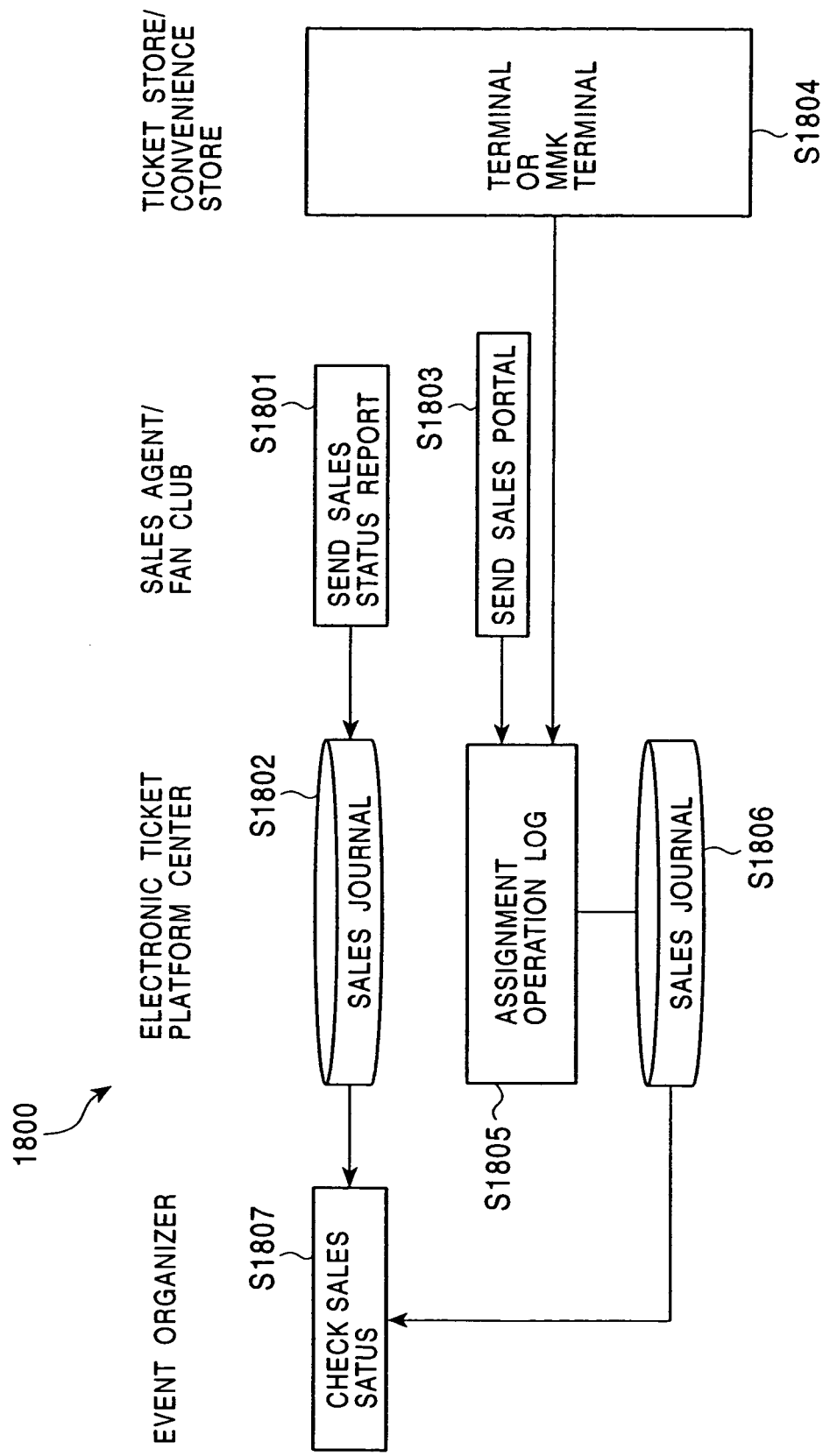
FIG. 18 is a block diagram illustrating a sales-journal processing flow system that is usable in the electronic ticket management system shown in FIG. 1.

FIG. 18 illustrates an example of the sales-journal processing flow 1800. In step S1801, the ticket issuing processing by the electronic ticket seller 130 is reported to the electronic ticket platform center 110 as a sales status report. In step S1802, the sales status report is stored in the journal master 406. Similarly, in step S1803, the sales portal site of the electronic ticket seller 130 is reported to the electronic ticket platform center 110. In step S1804, electronic ticket information assigned via the store terminal 150 is reported to the electronic ticket platform center 110. In step S1805, the assigned electronic ticket information is then sent to the assignment operation log. In step S1806, the assignment operation log is then stored in the sales journal 406.

In step S1807, the event organizer 120 is able to check the sales status by referring to the sales journal 406 if necessary.

As described above, according to the electronic ticket management system 100 of this embodiment, information concerning the transfer of the electronic ticket information is always centrally managed in the electronic ticket platform center 110 by being stored in the sales journal 406. It is thus possible to centrally manage electronic tickets.

The sales journal 406 may not be updated in real time, for example, on the day of the event. In this case, the sales status is reported from the gate terminal 180 installed in the event venue 160 after the event, thereby making it possible to update the sales journal 406.

A description is given below of a gate control system in the event venue 160 in the electronic ticket management system 100 of this embodiment. That is, the electronic ticket management system 100 can be used as the gate control system installed at the gate of the event venue 160.

Hitherto, ticket collectors check paper tickets possessed by attendees whether they can enter the event venue 160. It is however difficult to visually check illegal tickets, and also, the labor cost is not negligible for big events.

Tickets collected by ticket collectors are used for calculating the number of attendees. However, it takes time to calculate a precise number of attendees. It is also difficult to precisely analyze the characteristics of the attendees.

Special attendants are also required for assisting handicapped customers. Accordingly, it is difficult for the handicapped customers 140 to attend events by themselves without attendants.

However, according to the gate control system of this embodiment, the above-described problems can be effectively solved.

An overview of the gate control system of this embodiment is as follows.

Event information is downloaded in advance from the electronic ticket platform center 110 to the gate terminal 180 installed in the event venue 160. The gate terminal 180 then reads the electronic ticket information and the event information stored in the information storage chip, such as a non-contact IC card, and permits the attendee to enter the event venue 160 if the integrity of the read event information is verified.

Simultaneously, the attribute of the ticket holder (attendee) (for example, whether the attendee is elderly or handicapped) is determined from the attendee information contained in the electronic ticket information, and a suitable guidance is given.

Then, after the event, the electronic ticket information possessed by the attendees is analyzed and is used for future marketing.

Details of the gate control system of this embodiment are discussed below.

Figure 19:
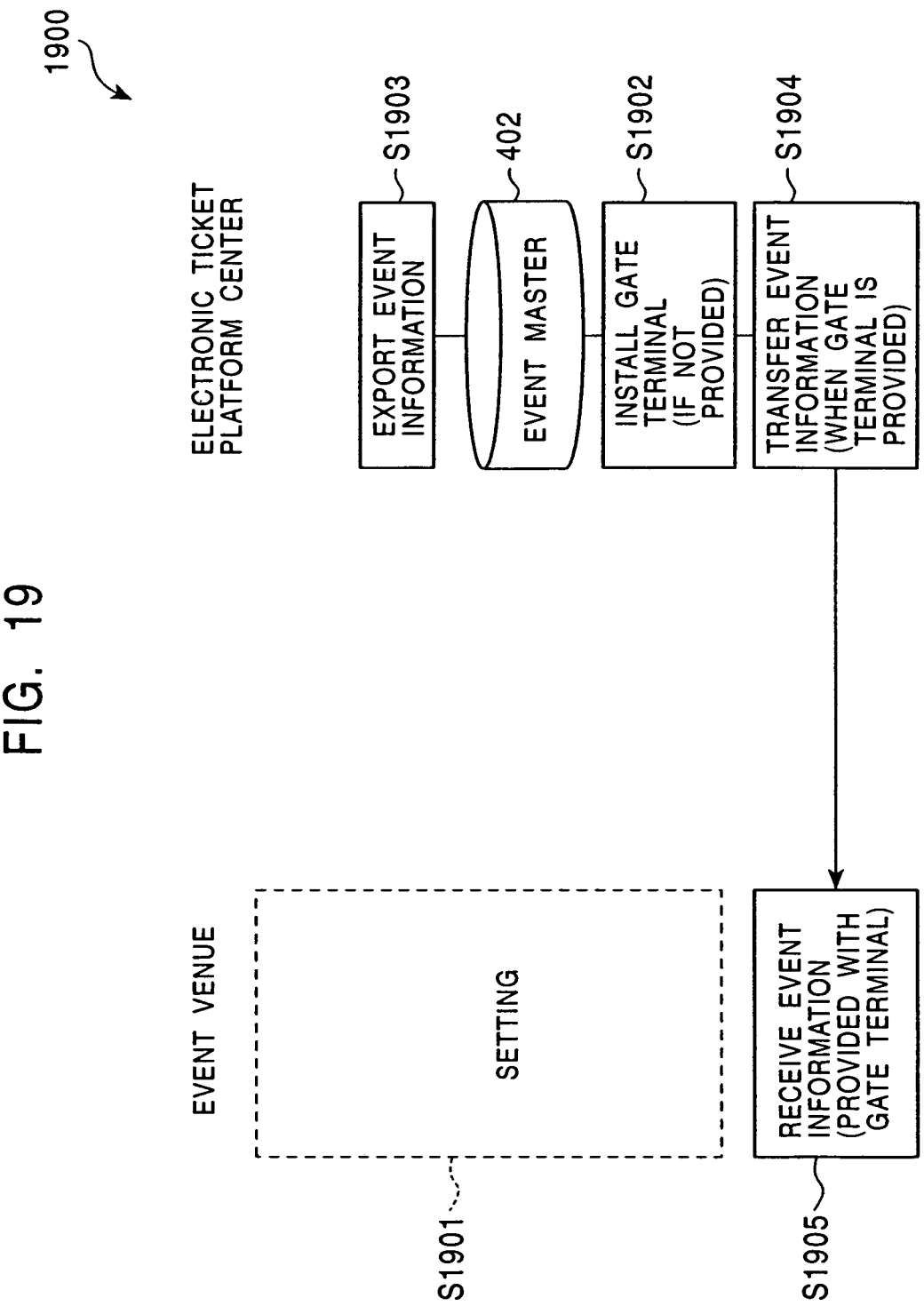
FIG. 19 is a block diagram illustrating a gate-terminal installing flow system that is usable in the electronic ticket management system shown in FIG. 1.

FIG. 19 illustrates a gate-terminal installing flow 1900 for installing a gate control system at the event venue 160.

As shown in FIG. 19, prior to the event, in step S1901, event settings are performed in the event venue 160. Then, in step S1902, the gate terminal 180 is installed in the event venue 160.

In step S1903, event information is exported from the event master 402 of the electronic ticket platform center 110 to the gate terminal 180 online or offline. Then, the gate control system of this embodiment can be used.

The above-described gate-terminal installing processing is performed when a gate terminal is not provided at the event venue 160. If a gate terminal is always set in the event venue 160, in steps S1904 and S1905, the event information is transferred from the event master 402 to the gate terminal at the event venue 160 online or offline.

Figure 45:
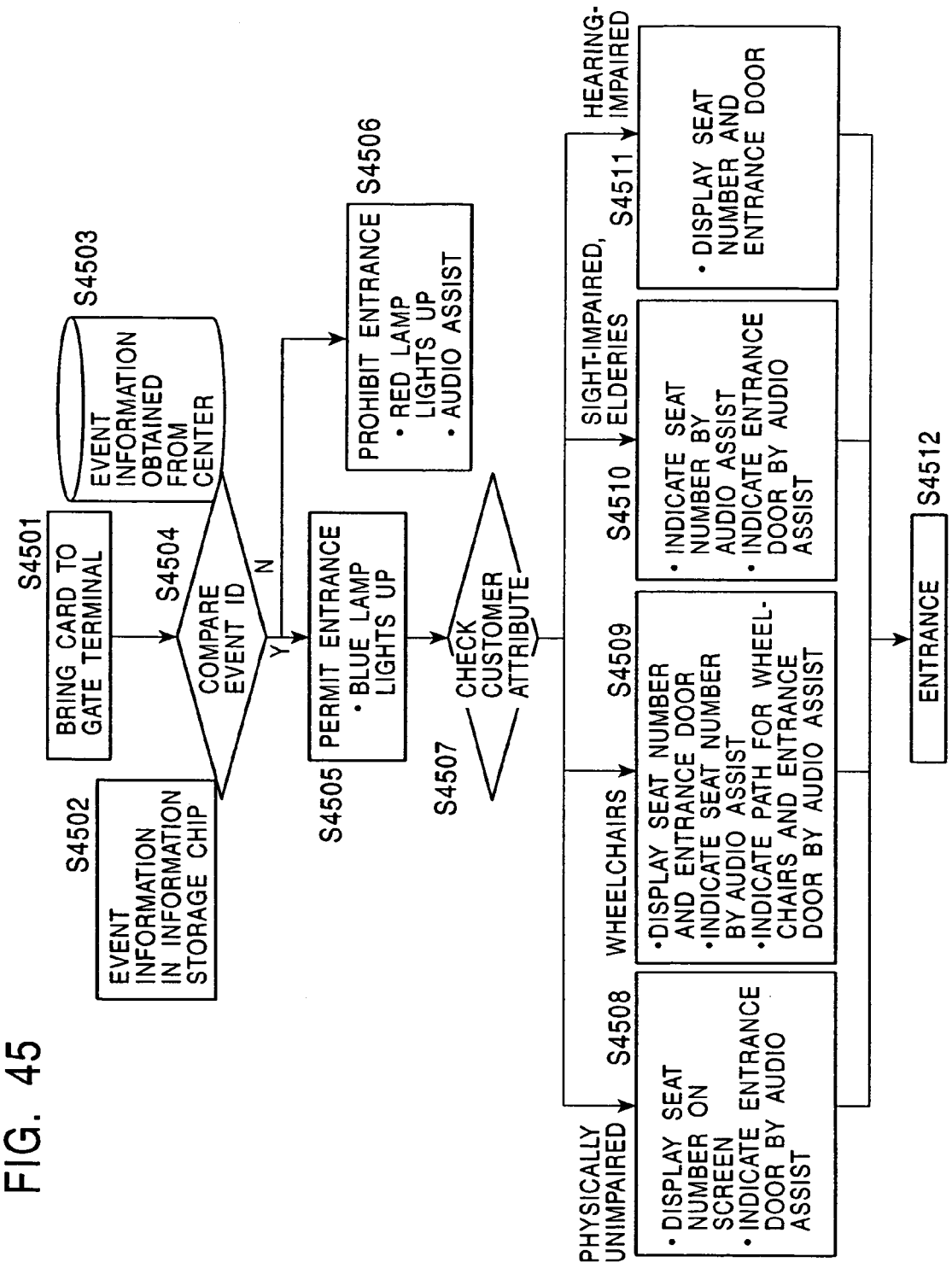
FIG. 45 is a block diagram illustrating a gate entrance processing flow system that is usable in the electronic ticket management system shown in FIG. 1.

The gate entrance processing flow in the gate control system of this embodiment is discussed below with reference to FIGS. 45 through 47. In the following description, it is assumed that a non-contact IC card is used as an information storage chip storing electronic ticket information and event information.

In step S4501, the customer 140 brings the information storage chip close to the gate terminal 180 at the gate of the event venue 160. Then, in step S4502, the event information stored in the information storage chip is obtained. In step S4503, the event information obtained from the electronic ticket platform center 110 is checked. Then, in step S4504, the event ID of the event information stored in the information storage chip is compared with that of the event information obtained from the electronic ticket platform center 110. If it is found that the integrity of the event information is verified, in step S4505, the corresponding attendee is permitted to enter the event venue 160 by, for example, causing a blue lamp to emit. If the event information stored in the information storage chip is not legal, the corresponding attendee is not permitted to enter the event venue 160 by, for example, causing a red lamp to emit or giving a corresponding audio guidance.

In step S4506, the gate terminal 180 reads electronic ticket information, such as the attendee information, from the information storage chip of the attendee who has permitted to enter the event venue 160. In step S4507, the gate terminal 180 then checks the attribute of the customer 140. Then, if the attendee is physically unimpaired, in step S4508, the seat number is indicated, as shown in FIG. 10B, and an audio guidance, such as "please enter the hall from door 2 from the left side" is given. Then, in step S4512, the attendee enters the event venue 160 according to the guidance.

In contrast, if the attendee is physically impaired, a suitable guidance is given according to the attribute of the attendee.

If it is found in step S4507 that the attendee is in a wheelchair, in step S4509, a corridor through which attendees in wheelchairs can pass is indicated on the screen or by an audio guidance. If the attendee in a wheelchair is not sight-impaired or hearing-impaired, the seat number is indicated on the screen, and an audio guidance, such as "please enter the hall from door 2 from the left side", is given. In step S4512, the attendee then enters the event venue 160 according to the guidance.

If it is found in step S4507 that the attendee is sight-impaired, in step S4510, the seat number is given by audio guidance. In step S4512, the attendee enters the event venue 160 according to the guidance.

If it is found in step S4507 that the attendee is hearing-impaired, in step S4511, the seat number and the entrance door are indicated in larger letters on the screen. In step S4512, the attendee enters the event venue 160 according to the guidance.

According to the gate control system of this embodiment, the attribute of the attendee is reported to the staff of the event venue 160 in real time. Thus, the staff is able to suitably guide the attendee to his/her seat according to the attribute.

FIG. 46 illustrates the data structure of event information and electronic ticket information stored in an information storage chip. In the example shown in FIG. 46, the event ID, the floor, the seat number, the membership number, customer name, the customer attribute, and the date of birth are stored in the information storage chip. The gate terminal 180 first reads the event ID and determines whether the corresponding attendee is permitted to enter the event venue 160. Then, the seat number is indicated based on the seat information. Then, the attribute of the attendee is determined from the customer information, and the attendee is suitably guided to his/her seat according to the attribute.

As discussed above, a lamp indicating whether the attendee is permitted to enter the venue 160, a display unit for displaying seat information on the screen, and a guidance unit for giving an audio guidance are provided for the gate terminal 180. An output unit, such as a printer for printing out seat information in response to an attendee's request, may also be provided.

Instead of a lamp, a passage gate with a flapper installed at a ticket gate at a station may be provided, and if an attendee is permitted to enter the venue 160, the flapper is opened.

An information storage chip may be mounted on a portable device having a rewritable surface, and required information may be printed on the rewritable surface. If an information storage chip is integrated in a cellular telephone or a portable terminal device provided with a display function, required event information can be displayed on the display unit.

In the event, some attendees may leave the event venue 160, for example, during an intermission. Hitherto, it is determined whether the attendees are permitted to re-enter the venue 160 by the part of the ticket kept by the attendees. However, according to the electronic ticket management system 100 of this embodiment, it is determined whether an attendee is permitted to enter the event venue 160 simply by reading event information stored in an information storage chip, and when the attendee attempts to re-enter the event venue 160, the gate entrance processing is performed.

Not only the gate terminal 180, but also a printer terminal or a display terminal for printing or displaying ticket information stored in an information storage chip may be installed in the event venue 160. Then, the congestion in the event venue 160 can be relieved. With this arrangement, when attendees are re-seated after an intermission, they can check their seats.

Figure 20:
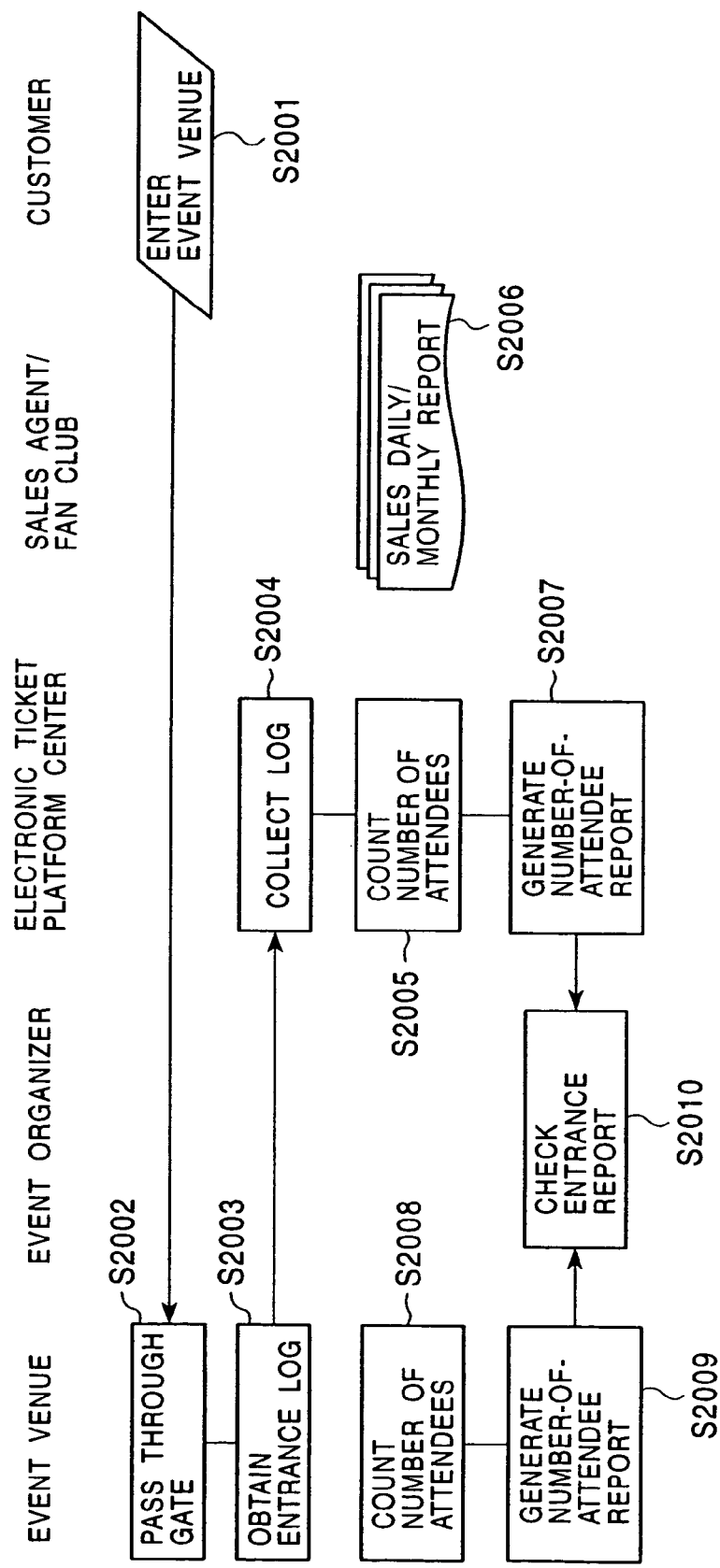
FIG. 20 is a block diagram illustrating an entrance log processing flow system that is usable in the electronic ticket management system shown in FIG. 1.

An entrance log processing flow in the gate control system of this embodiment is described below with reference to FIG. 20.

In step S2001, the customer 140 having an information storage chip in which legal event information is stored enters the event venue 160. Then, in step S2002, the gate terminal 180 permits the customer 140 to pass through the gate. In step S2003, an entrance log is obtained by the gate terminal 180 according to the customer 140. The entrance log includes not only the legal event information stored in the information storage chip, but also the electronic ticket information, such as the customer information.

Figure 47:
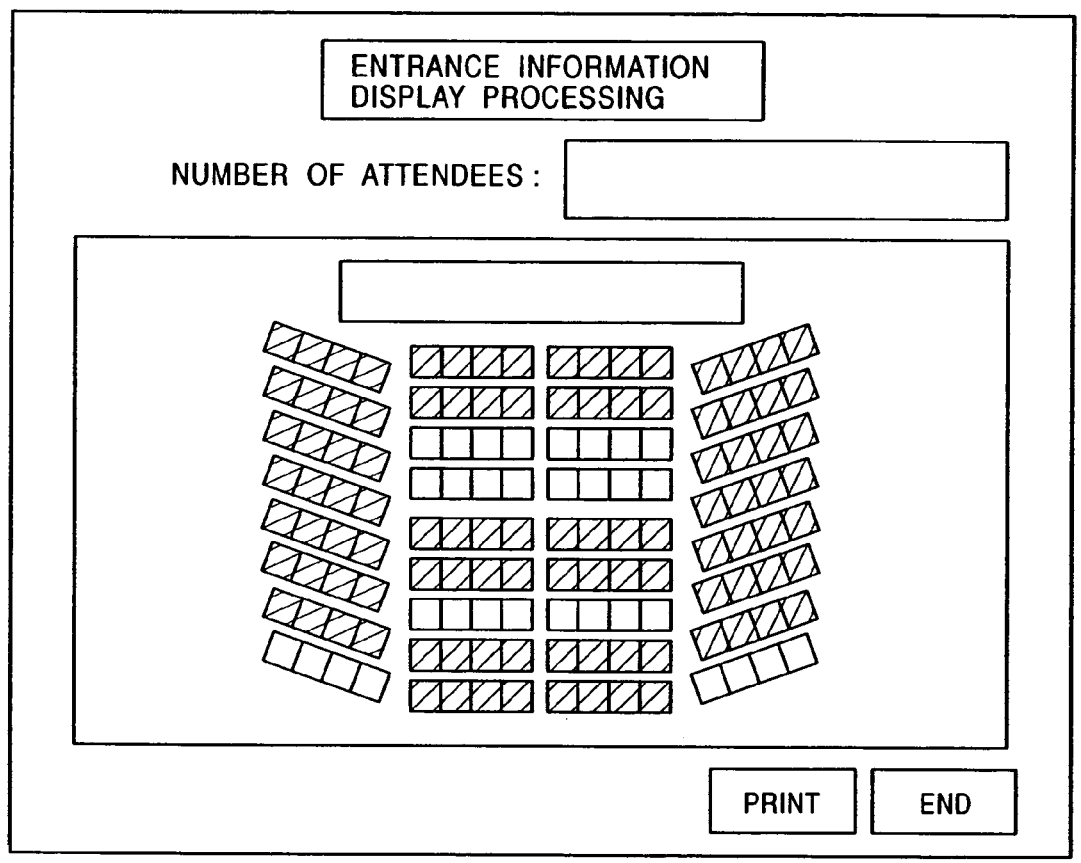
FIG. 47 is a schematic diagram illustrating an entrance information display processing system that is usable in the electronic ticket management system shown in FIG. 1.

FIG. 47 illustrates an example of the entrance information processing screen.

As discussed above, the entrance log collected by the gate terminal 180 is sent to the venue control terminal, and is displayed, as shown in FIG. 47, on the screen as a graphical image. Thus, the venue manager is able to monitor the entrance situation on the screen in real time. For example, if a predetermined number of attendees have not yet arrived in the venue place 160 immediately before the event, it can be considered that they may have been delayed due to a traffic accident or a bad weather. Thus, the performance time can be delayed until a predetermined number of attendees have arrived at the event venue.

Referring back to FIG. 20, in step S2004, the entrance log collected in the gate terminal 180 is sent to the electronic ticket platform center 110 in real time or with predetermined timing. In step S2005, the entrance log is analyzed after the event, for example, the number of attendees is calculated. In step S2006, the calculated number of attendees is sent to the electronic ticket seller 130, and the electronic ticket seller 130 creates a daily/monthly report. In step S2007, a number-of-attendee report is also created in the electronic ticket platform center 110 based on the calculated number of attendees. Similarly, in step S2008, the number of attendees is also counted in the event venue 160, and in step S2009, an entrance report is created. Then, in step S2010, the event organizer 120 is able to check the entrance report created by the event venue 160 or the electronic ticket platform center 110.

As described above, according to the gate control system of this embodiment, it is determined at the entrance gate whether attendees are permitted to enter the event venue 160 according to the integrity of the event information stored in the information storage chip. Thus, tickets which have been purchased immediately before the event can also be validated. It is thus possible to maximize the sales opportunities.

A determination as to whether attendees are permitted to enter the event venue 160 is made by the gate terminal 180 rather than by ticket collectors. Accordingly, the determination can be made correctly and speedily. As a result, it is possible to exclude illegal tickets, and also, the labor cost can be reduced.

According to an audio guidance or a displayed message, attendees can find their ways to their seats. Simultaneously, a barrier-free system can be implemented so that handicapped attendees can easily enter the event venue 160 without the need for special attendants.

Additionally, electronic ticket information stored in information storage chips can be collected in real time at the gate terminal 180 and analyzed. Thus, the number of attendees can be identified in real time at the venue management terminal. It is thus possible to easily handle the event at the event venue 160.

Figure 21:
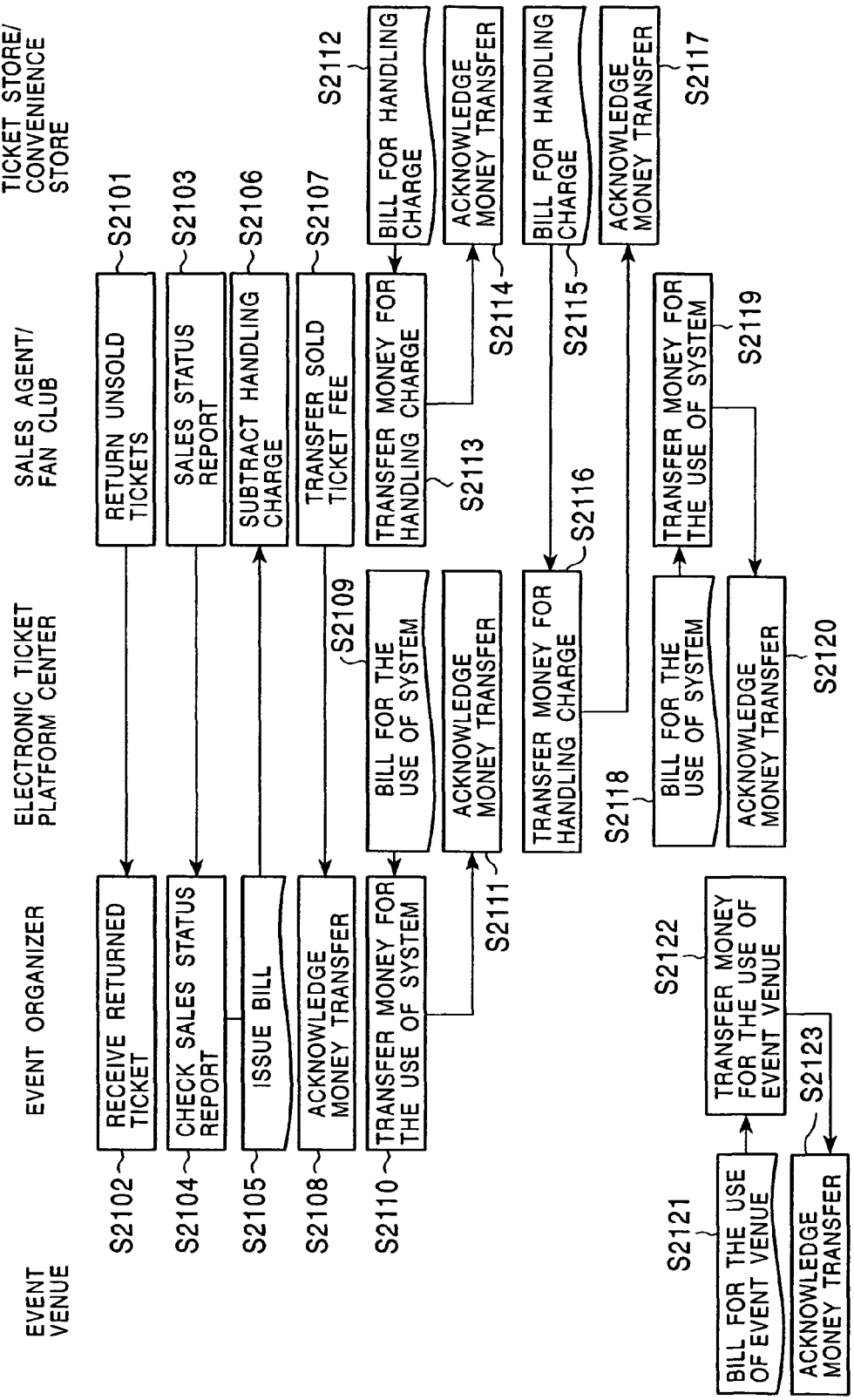
FIG. 21 is a block diagram illustrating a billing processing flow system that is usable in the electronic ticket management system shown in FIG. 1.

A description is now given, with reference to FIG. 21, of a billing processing flow in the electronic ticket management system 100 of this embodiment.

Bill processing between the customer 140 and the electronic ticket seller 130 can be performed by a credit settlement or an electronic money settlement, as in a known settlement processing flow. Accordingly, details of such bill processing are omitted.

A description is thus mainly given of details of a billing processing flow performed among the event venue 160, the negotiator, the electronic ticket platform center 110, the electronic ticket seller 130/fan club, the ticket store/convenience store after the event.

In step S2101, ticket returning processing for returning unsold tickets is performed between the electronic ticket seller 130/fan club and the event organizer 120. In step S2102, the returned tickets are received by the event organizer 120.

The ticket returning processing between the electronic ticket seller 130 and the event organizer 120 is performed, for example, online. In step S2103, a final sales status report is issued in the electronic ticket seller 130/fan club. In step S2104, the event organizer 120 receives and checks the sales status report. Thereafter, in step S2105, the event organizer 120 issues a bill based on the sales status report.

In step S2106, the electronic ticket seller 130/fan club subtracts a handling charge from the issued bill, and transfers money for the sold ticket fee in step S2107. In step S2108, the event organizer 120 acknowledges the money transfer. Then, the billing processing flow between the electronic ticket seller 130/fan club and the event organizer 120 is completed.

Subsequently, in step S2109, the electronic ticket platform center 110 sends a bill for the use of the system to the event organizer 120. Then, in step S2110, the event organizer 120 transfers money for the use of the system. In step S2111, the electronic ticket platform center 110 acknowledges the money transfer. Then, the billing processing between the event organizer 120 and the electronic ticket platform center 110 is completed.

In step S2112, the ticket store/convenience store sends a bill for a handling charge to the electronic ticket seller 130/fan club. In step S2113, the electronic ticket seller 130/fan club transfers money for the handling charge. Then, in step S2114, the ticket store/convenience store acknowledges the money transfer. Then, the billing processing flow between the electronic ticket seller 130/fan club and the ticket store/convenience store is completed.

In step S2115, the ticket store/convenience store sends a bill for a handling charge to the electronic ticket platform center 110, and in step S2116, the electronic ticket platform center 110 transfers money for the handling charge. Then, in step S2117, the ticket store/convenience store acknowledges the money transfer. Then, the billing processing flow between the electronic ticket platform center 110 and the ticket store/convenience store is completed.

Similarly, in step S2118, the electronic ticket platform center 110 sends a bill for the use of the system to the electronic ticket seller 130/fan club. In step S2119, the electronic ticket seller 130/fan club transfers money for the use of the system. Then, in step S2120, the electronic ticket platform center 110 acknowledges the money transfer. Then, the billing processing flow between the electronic ticket platform center 110 and the electronic seller 130/fan club is completed.

In step S2121, the event venue 160 sends a bill for the use of the venue to the event organizer 120, and in step S2122, the event organizer 120 transfers money for the use of the venue. In step S2123, the event venue 160 acknowledges the money transfer. Then, the billing processing flow between the event venue 160 and the event organizer 120 is completed.

Examples of the billing processing flows generated in the electronic ticket management system 100 of this embodiment have been discussed. Other types of billing processing flows may also be generated according to the configuration of the system, though details thereof are not given.

Figure 39:
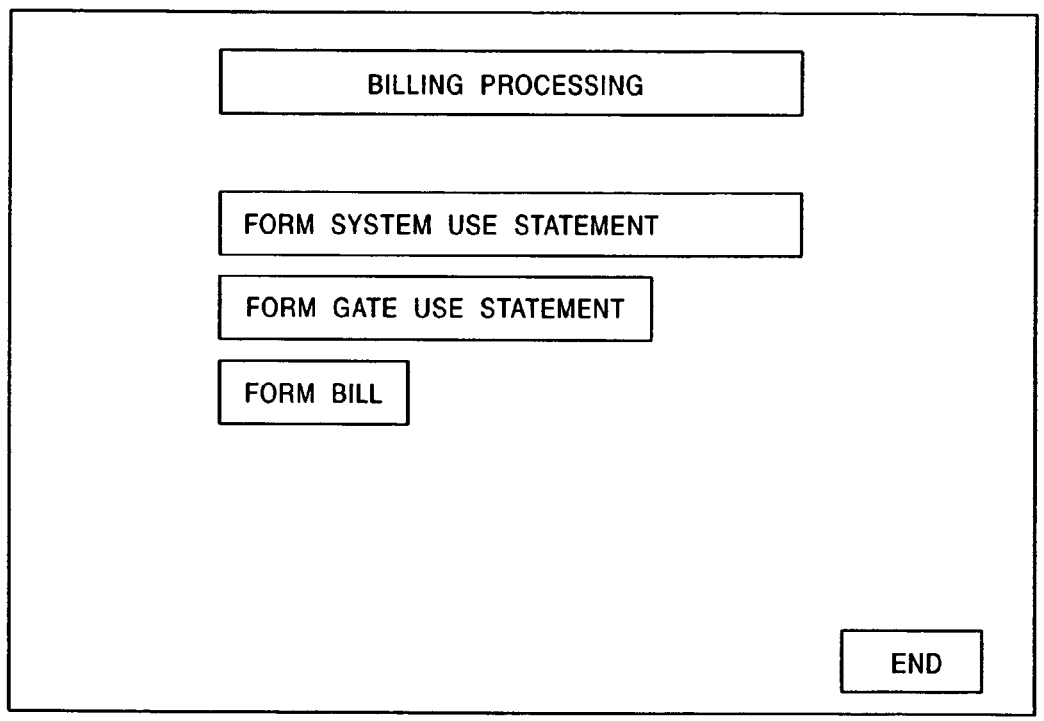
FIG. 39 is a schematic diagram illustrating a billing processing screen that is usable in the electronic ticket management system shown in FIG. 1.

FIG. 39 illustrates an example of the billing processing screen. As shown in FIG. 39, a bill and a statement are issued according to the number of issued electronic tickets. For example, if a system-use-statement frame is selected, a statement according to the use of the system is displayed or printed out in both the event organizer 120 and the electronic ticket seller 130. If a gate-use-statement frame is selected, a fee for the use of the gate according to the number of electronic tickets of each event is displayed or printed out. If a bill-forming frame is selected, a bill based on the statement is displayed or printed out.

In the electronic ticket management system 100 of this embodiment, it is possible to collect digital data concerning electronic ticket holders in various phases. The collected digital data is useful for future marketing, and post-processing is suitably performed by, for example, analyzing the collected data.

Figure 22:
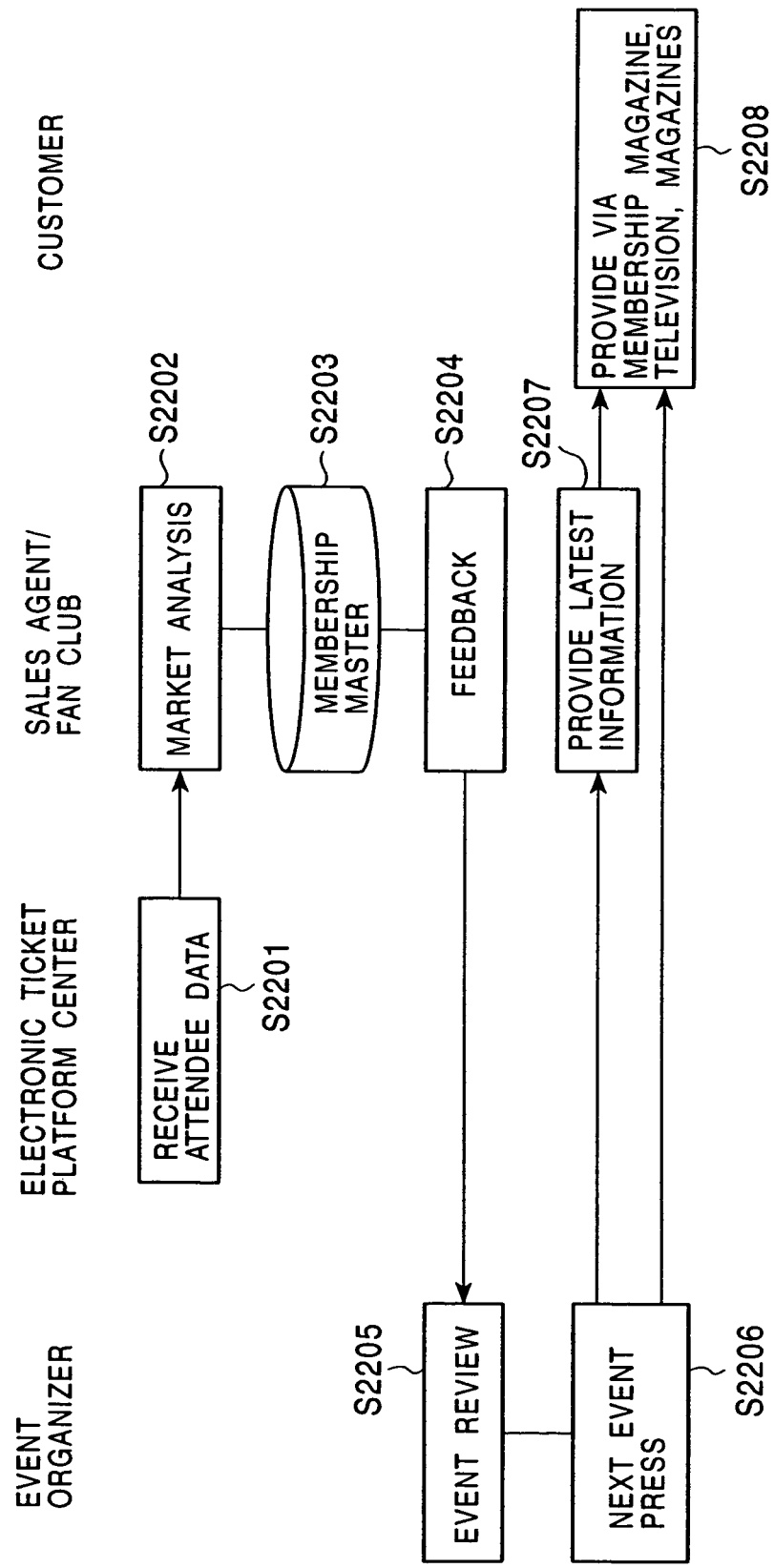
FIG. 22 is a block diagram illustrating a post-processing flow system that is usable in the electronic ticket management system shown in FIG. 1.

FIG. 22 illustrates an example of the post-processing flow in the electronic ticket management system 100 of this embodiment.

As shown in FIG. 22, information concerning electronic ticket holders in various phases is sent and received among the event organizer 120, the electronic ticket seller 130/fan club, and the customer 140 via the electronic ticket platform center 110. The data post-processing is discussed below in the context of an analysis of attendee data. In step S2201, the electronic ticket platform center 110 obtains the attendee data from the gate terminal 180 of the event venue 160.

Then, in step S2202, the attendee data is sent from the electronic ticket platform center 110 to the electronic ticket seller 130/fan club, and a market analysis is conducted on the attendee data in view of various aspects. In step S2203, an analysis result is stored in the membership master. In step S2204, the analysis result is fed back to, for example, the event organizer 120.

In step S2205, the event organizer 120 conducts an event review, and, in step S2206, the event review can be used for the subsequent event. In step S2207, the subsequent event news is provided to the electronic ticket seller 130/fan club via the press of the event organizer 120 as the latest information. In step S2208, the subsequent event news is also provided to the customers 140 via a membership magazine, television, or general magazines.

In the above-described example, a market analysis is conducted by the electronic ticket seller 130/fan club. However, it may be performed by the event organizer 120, the electronic ticket platform center 110, or a third party.

In the foregoing embodiment, the electronic ticket management system 100 is run by the individual functions, such as the event venue 160, the event organizer 120, the electronic ticket platform center 110, the electronic ticket seller 130/fan club, the ticket store/convenience store, and the customer 140. However, the above-described elements may be combined or separated in various ways.

For example, the event venue 160 may serve the functions of the event organizer 120 and the electronic ticket platform center 110. Alternatively, the event organizer 120 may serve the functions of the electronic ticket platform center 110. Alternatively, the electronic ticket seller 130/fan club may serve the function of the electronic ticket platform center 110.

The electronic ticket management system 100 of the present invention may be combined with a known ticket sales system. For example, it is possible to construct a system in which the ticket allocation processing is performed manually between the event organizer 120 and the electronic ticket seller 130, as in the related art, and the ticket issuing processing and the gate control processing are centrally managed by the electronic ticket platform center 110.

In the electronic ticket management system 100 of this embodiment, electronic tickets are generated by an information storage chip writer. However, it may be difficult to provide an information storage chip writer for each terminal. Thus, information storage chips having event information therein may be distributed to electronic ticket purchasers, and the gate control processing used in the above-described embodiment is performed.

Similarly, in the foregoing embodiment, event information is read from information storage chips by an information storage chip reader so that the time and date and the venue of the event can be identified. However, it may be difficult to employ a simple viewer, such as an information storage chip reader. Thus, the customer 140 may access the sales portal site to authenticate the predetermined ID number and password and to download the seat information of the electronic ticket, and print it out.

Additionally, the number of items of electronic ticket information which can be stored in an information storage chip is limited. Accordingly, if all the seats of an event are reserved for one group, the electronic ticket information purchased by the customer 140 may be temporarily stored in the electronic ticket platform center 110.

While the present invention has been described with reference to what are presently considered to be a preferred embodiment, it is to be understood that the invention is not limited to the disclosed embodiment. It is clear that those who are skilled in the art conceive various changes and modifications within the scope of the appended claims. The invention is intended to cover such modifications and equivalent arrangements.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An electronic ticket management method comprising:
   (a) providing:
      (i) an event organizer apparatus;
      (ii) an electronic ticket platform center which is separate from the event organizer apparatus; and
      (iii) an electronic ticket distribution authentication apparatus;
   (b) causing the event organizer apparatus to form event information unique to an event;
   (c) causing the event organizer apparatus to form seller information authorizing the electronic ticket distribution authentication apparatus to sell electronic tickets to the event;
   (d) causing the event organizer apparatus to register the event information and the seller information in the electronic ticket platform center;
   (e) causing the electronic ticket distribution authentication apparatus to receive a request to distribute electronic ticket information concerning a plurality of electronic tickets for the event from a first user of a first information storage chip, which is mounted on a first portable device;
   (f) causing the electronic ticket distribution authentication apparatus to determine whether the electronic ticket information is to be distributed to the first user by performing distribution authentication processing;
   (g) causing the electronic ticket distribution authentication apparatus to register an authentication result in the electronic ticket platform center as ticket issuing information;
   (h) causing the electronic ticket platform center to form an electronic ticket information master based on the event information registered by the event organizer apparatus;
   (i) causing the electronic ticket platform center to relate the ticket issuing information registered by the electronic ticket distribution authentication apparatus to the electronic ticket information master; and
   (j) causing the electronic ticket platform center to write the electronic ticket information concerning a plurality of electronic tickets for attending the event into the first information storage chip based on the ticket issuing information by performing ticket issuing processing; and
   (k) causing the electronic ticket platform center to:
      (i) receive identification information of a second information storage chip, which is designated at the first information storage chip as specified by the first user of the first information storage chip, and receive a password, which is designated at the first information storage chip as specified by the first user of the first information storage chip to be entered by a second user of the second information storage chip, for writing at least one of the plurality of electronic tickets from the first information storage chip mounted on the first portable device into the second information storage chip which is separate from the first information storage chip and mounted on a second portable device which is different from the first portable device;
      (ii) assign the at least one of the plurality of electronic tickets from the first information storage chip to at least the second information storage chip;
      (iii) delete or nullify the at least one of the plurality of electronic tickets from the first information storage chip in response to said at least one of the plurality of electronic tickets being assigned from the first information storage chip to the second information storage chip; and
      (iv) write the at least one of the plurality of electronic tickets to the second information storage chip after the user of the second information storage chip enters the password specified by the user of the first information storage chip and after the electronic ticket platform center authenticates the user of the second information storage chip using the password and the identification information specified by the user of the first information storage chip,
   wherein the first information storage chip is mounted on the first portable device that performs non-contact communication, and the second information storage chip is mounted on the second portable device that performs non-contact communication.

2. The electronic ticket management method of claim 1, wherein the seller information:
   (a) authorizes a plurality of electronic ticket distribution authentication apparatuses; and
   (b) includes the number of electronic tickets to be handled by each of the plurality of electronic ticket distribution authentication apparatuses.

3. The electronic ticket management method of claim 1, which includes distributing the first information storage chip as a membership card according to a membership registration via the electronic ticket distribution authentication apparatus.

4. The electronic ticket management method of claim 1, which includes providing a predetermined time period between the distribution authentication processing performed by the electronic ticket distribution authentication apparatus and the ticket issuing processing performed by the electronic ticket platform center.

5. The electronic ticket management method of claim 1, which includes:
   (a) sending the request to distribute the electronic ticket information from the first user; and
   (b) causing the electronic ticket platform center to perform the ticket issuing processing via a network.

6. The electronic ticket management method of claim 1, which includes:
   (a) sending the request to distribute the electronic ticket information from the first user; and
   (b) causing the electronic ticket platform center to perform the ticket issuing processing via an electronic ticket information distribution store terminal.

7. The electronic ticket management method of claim 1, which includes causing the electronic ticket platform center to require authentication processing when the electronic ticket information is written into the first information storage chip.

8. The electronic ticket management method of claim 1, wherein the plurality of electronic tickets written to the first information storage chip correspond to a plurality of consecutive seats for the same event.

9. The electronic ticket management method of claim 1, further comprising:
   before assigning the at least one of the plurality of electronic tickets from the first information storage chip to the second information storage chip, causing the electronic ticket platform center to:
   (b) request the second user of the second information storage chip to input an authentication password for writing the at least one of the plurality of electronic tickets into the second information storage chip;
   (c) receive the authentication password;
   (d) authenticate the authentication password input by the second user of the second information storage chip with the password specified by the first user of the first information storage chip.

10. The electronic ticket management method of claim 1, further comprising:
   before receiving the identification information of the second information storage chip specified by the first user of the first information storage chip, and before receiving the password, specified by the first user of the first information storage chip, for writing the at least one of the plurality of electronic tickets into the second information storage chip, causing the electronic ticket platform center to:
   receive a login ID and a login password associated with first information storage chip, and
   authenticate the login ID and the login password associated with the first information storage chip,
   wherein the login ID is separate from the identification information of the second information storage chip specified by the first user of the first information storage chip, and the login password is separate from the password, specified by the first user of the first information storage chip, for writing the at least one of the plurality of electronic tickets into the second information storage chip.

* * * * *